(12) United States Patent
Bradley et al.

(10) Patent No.: US 8,858,089 B2
(45) Date of Patent: Oct. 14, 2014

(54) SINGLE-FIBER CONNECTORS FOR OPTICAL FIBER CABLES

(75) Inventors: Kelvin B. Bradley, Lawrenceville, GA (US); Jinkee Kim, Norcross, GA (US); Gregory A. Sandels, Buford, GA (US); Willard C. White, Suwanee, GA (US)

(73) Assignee: OFS Fitel, LLC, Norcross, GA (US)

( * ) Notice: Subject to any disclaimer, the term of this patent is extended or adjusted under 35 U.S.C. 154(b) by 239 days.

(21) Appl. No.: 13/468,495

(22) Filed: May 10, 2012

(65) Prior Publication Data
US 2012/0219254 A1    Aug. 30, 2012

Related U.S. Application Data

(63) Continuation-in-part of application No. 13/049,780, filed on Mar. 16, 2011, and a continuation-in-part of application No. 13/049,794, filed on Mar. 16, 2011.

(60) Provisional application No. 61/314,165, filed on Mar. 16, 2010.

(51) Int. Cl.
  *G02B 6/36* (2006.01)
  *G02B 6/38* (2006.01)
  *G02B 6/02* (2006.01)

(52) U.S. Cl.
  CPC .......... *G02B 6/3885* (2013.01); *G02B 6/02042* (2013.01); *G02B 6/3851* (2013.01); *G02B 6/3893* (2013.01)
  USPC .................................. 385/60; 385/72; 385/78

(58) Field of Classification Search
  None
  See application file for complete search history.

(56) References Cited

U.S. PATENT DOCUMENTS

| | | | | |
|---|---|---|---|---|
| 5,706,380 A | * | 1/1998 | Le Noane et al. | 385/95 |
| 6,154,594 A | * | 11/2000 | Fiacco et al. | 385/126 |
| 2003/0059195 A1 | * | 3/2003 | Brennan et al. | 385/146 |
| 2003/0190130 A1 | * | 10/2003 | Welker et al. | 385/126 |
| 2010/0195965 A1 | * | 8/2010 | Sasaoka | 385/126 |
| 2012/0251045 A1 | * | 10/2012 | Budd et al. | 385/33 |
| 2013/0044978 A1 | * | 2/2013 | DeDobbelaere et al. | 385/33 |

FOREIGN PATENT DOCUMENTS

JP        2010-286548 A  * 12/2010

* cited by examiner

*Primary Examiner* — Mike Stahl
(74) *Attorney, Agent, or Firm* — Daniel Kim, Esq.

(57) ABSTRACT

An optical fiber cable connector includes a ferrule with a guide hole that is shaped to closely receive a multicore fiber having a flat side indicative of the rotational orientation of the cores of the multicore fiber. The ferrule includes a flat surface at one side of the guide hole, corresponding in position to the flat side of the multicore fiber. Installing the multicore fiber into the guide hole with its flat side abutting the flat surface along the side of the guide hole provides alignment of the cores with respect to an optical component to which the multicore fiber endface is to be connected.

10 Claims, 35 Drawing Sheets

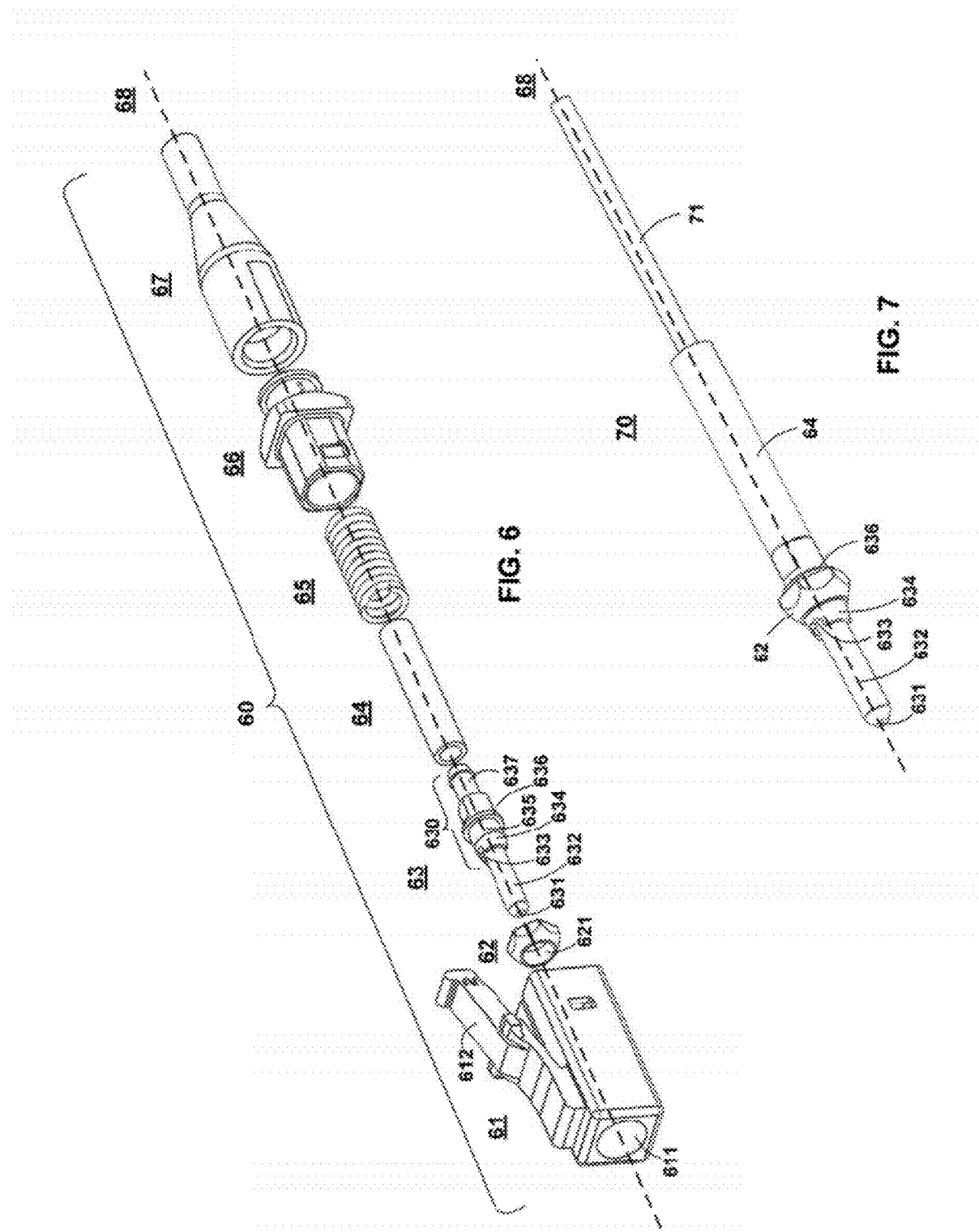

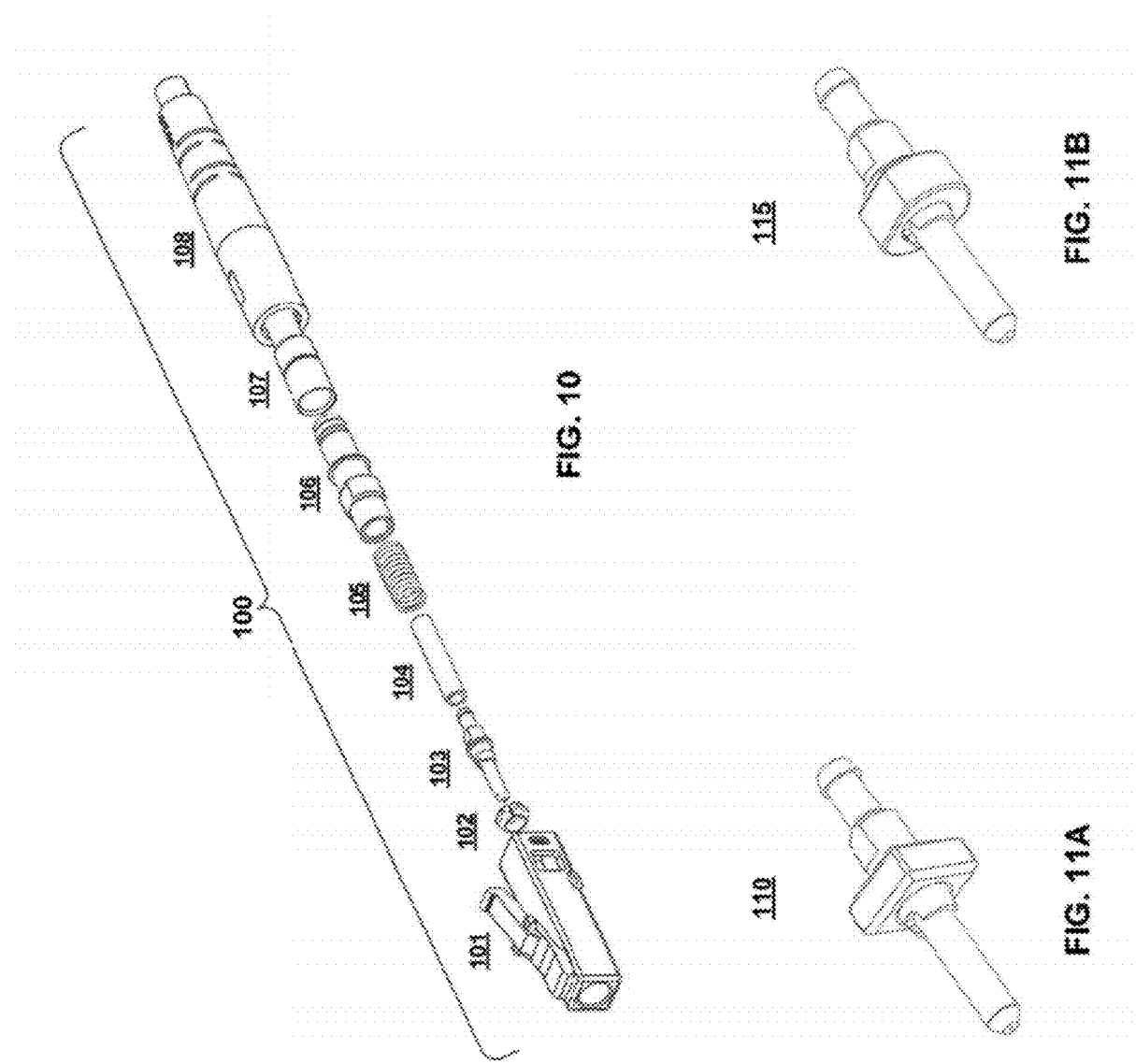

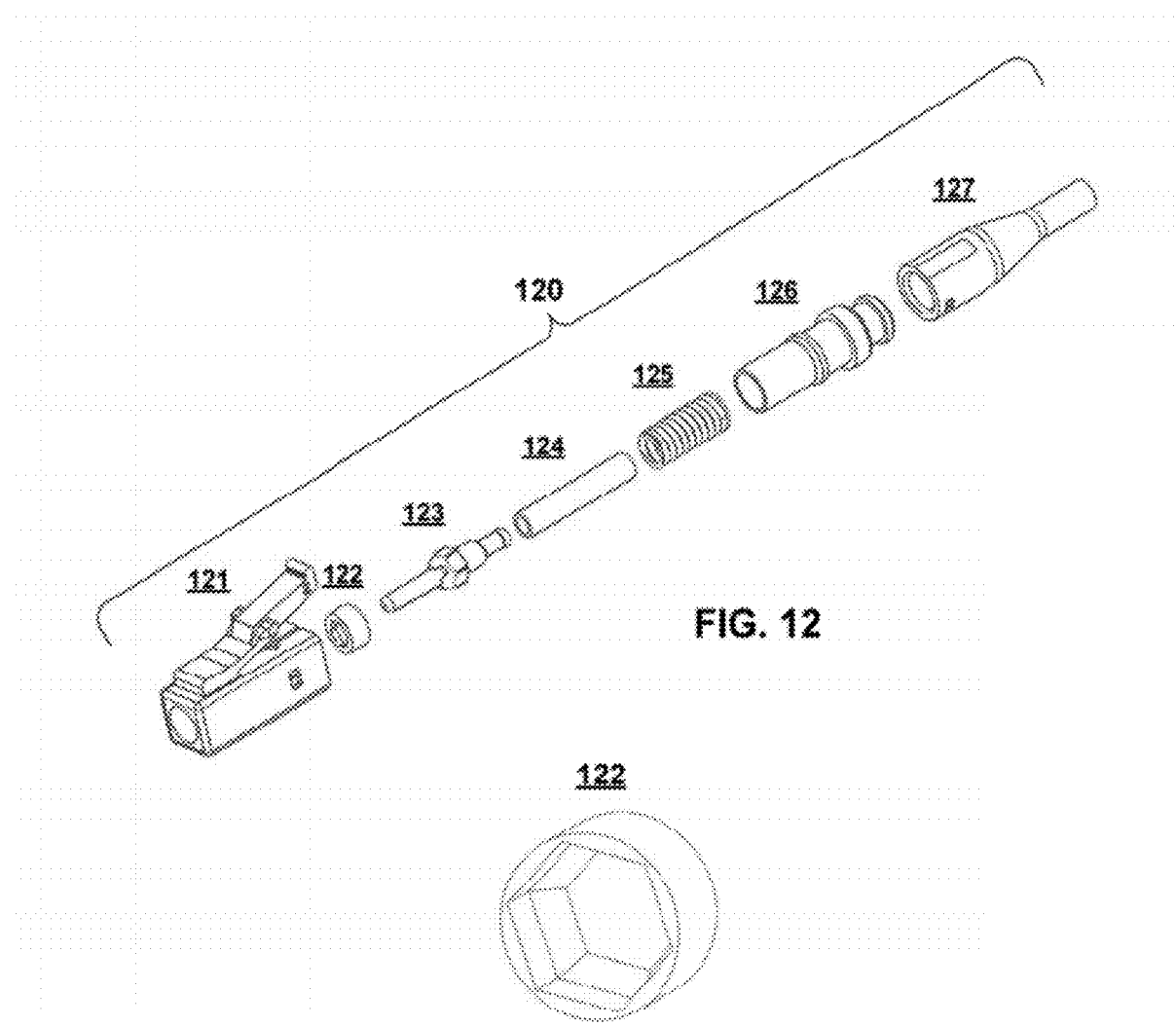
FIG. 12
FIG. 13
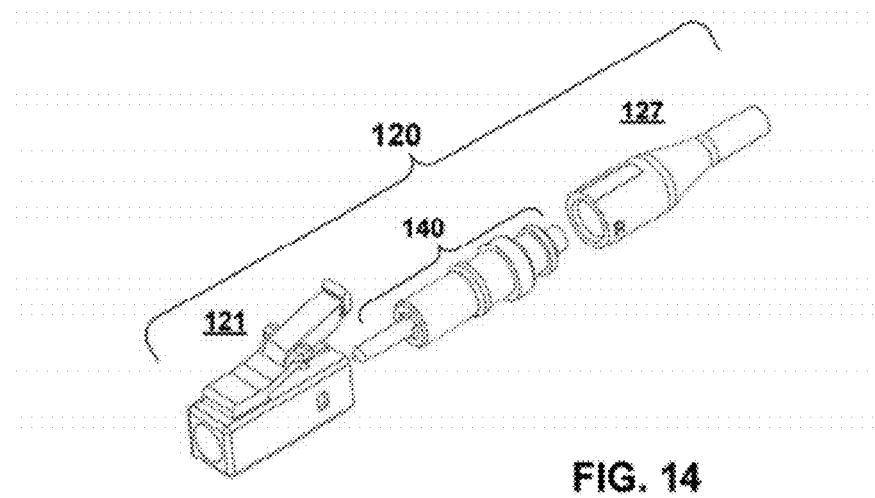
FIG. 14

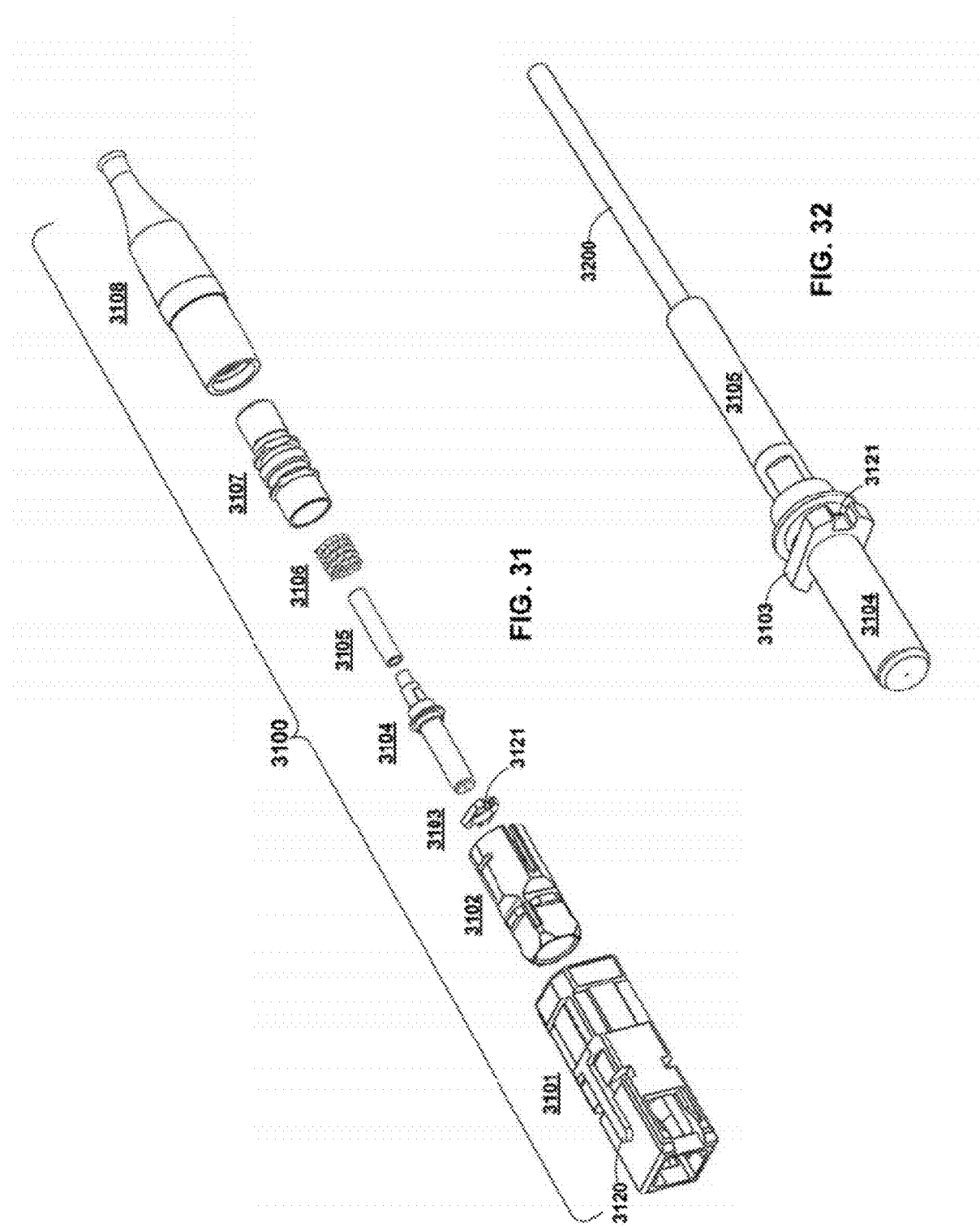

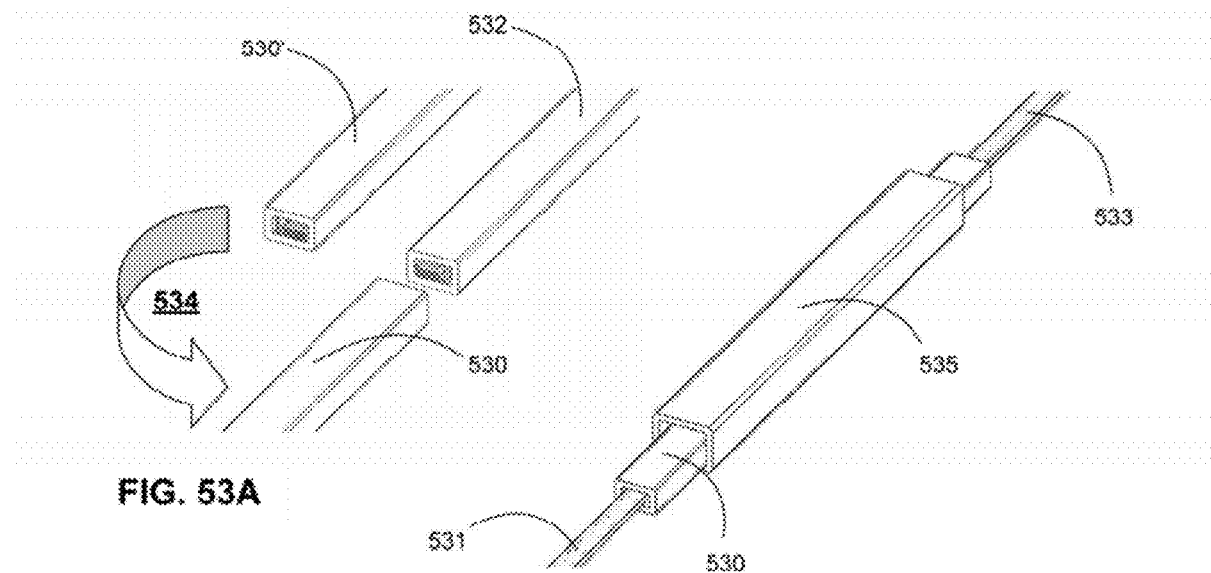
FIG. 53A
FIG. 53B
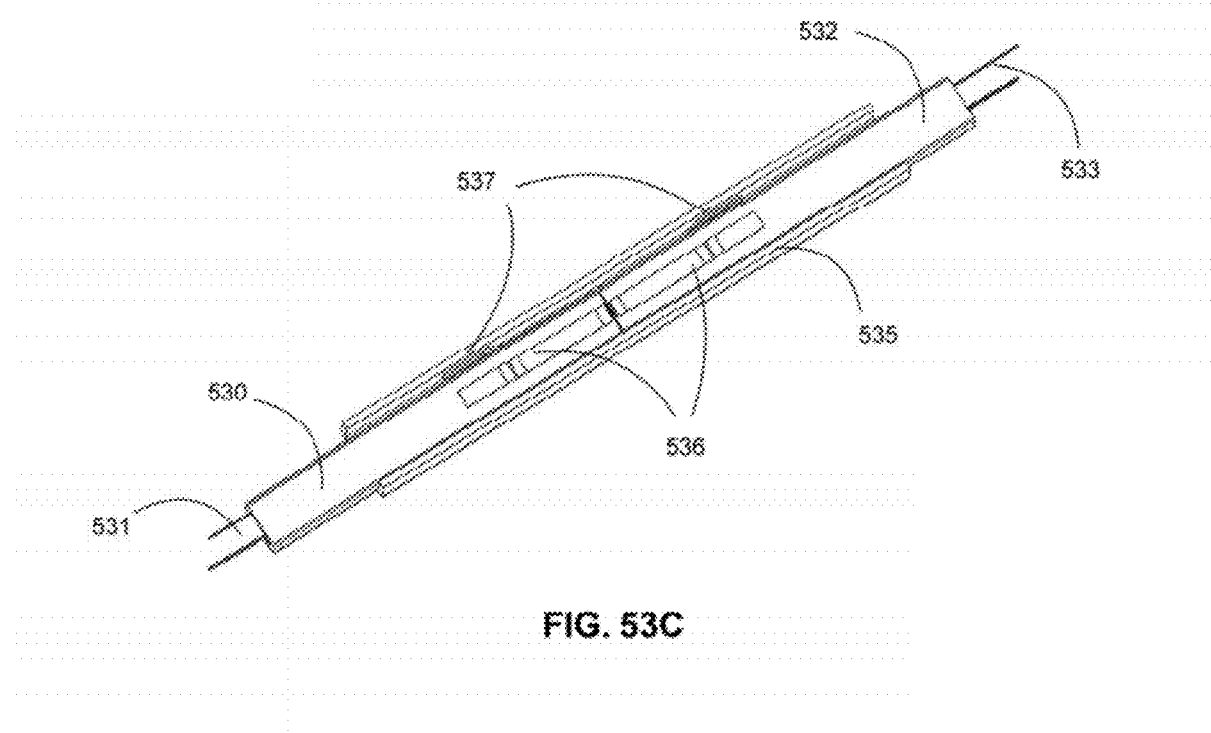
FIG. 53C

SINGLE-FIBER CONNECTORS FOR OPTICAL FIBER CABLES

CROSS REFERENCE TO RELATED APPLICATIONS

The present application is a continuation-in-part of co-pending U.S. patent application Ser. No. 13/049,780, filed on Mar. 16, 2011, and co-pending U.S. patent application Ser. No. 13/049,794, also filed on Mar. 16, 2011.

U.S. patent application Ser. No. 13/049,780 and U.S. patent application Ser. No. 13/049,794 both claim the priority benefit of U.S. Provisional Patent Application Ser. No. 61/314,165, filed on Mar. 16, 2010.

The above applications are owned by the assignee of the present application, and are incorporated herein by reference in their entirety.

BACKGROUND OF THE INVENTION

1. Field of the Invention

The present invention relates generally to the field of fiber optics, and in particular to improved connectors for multicore optical fiber cables.

2. Background Art

The ever increasing demand for high-density, high-speed parallel optical data links for super computers, data centers, and the like, has spawned significant interest in passive optical devices designed to facilitate reliable, cost-effective deployment. In multi-channel parallel links for super computers and data centers, thousands of optical links may be utilized, commonly operating at transmission rates in the range of 1 Gb/s to 10 Gb/s.

In conventional configurations, one-dimensional parallel optical links typically utilize a 1×12 multimode linear array of fibers, with each fiber serving as a separate channel. In this arrangement, the fibers, which are typically on a 250-μm pitch within a ribbon, are terminated into a molded multi-fiber ferrule, such as a mechanical transfer (MT) ferrule. The MT-terminated fibers are then used to make connections between multi-channel VSCEL and PiN photodetector arrays. For applications requiring a more rugged assembly, jacketed fibers, typically in a ribbon configuration, are terminated within MT ferrules that are then placed inside MT-RJ, MPO, MTP™, or MPX Connector Housings, to produce robust patch cords.

For even higher densities, manufacturers terminate fibers into 2D-array MT16, MT24, MT48, MT60, or MT72 ferrules. However, high-density configurations assembled using standard single-core fibers have proven to be extremely expensive to produce, since achieving physical contact between all of the fibers, when two connectors are mated, requires very precise control of the polishing process to ensure co-planarity, particularly in variants having a large number of fibers, such as a 72-fiber ferrule.

As an alternative, to provide the high densities required, a multicore fiber (MCF), can be used in connectivity products (i.e. simplex connectors, multi-fiber connectors, and V-groove arrays) instead of single-core fibers. Using multicore fibers allows the number of channels to be increased significantly, while optimizing space and minimizing component costs. However, aligning the cores of fibers with circular cross sections can present a challenge, requiring relatively expensive continuously tunable connectors or special alignment methods.

SUMMARY OF THE INVENTION

An aspect of the invention provides an optical fiber cable connector including a ferrule with a guide hole that is shaped to closely receive a multicore fiber having a flat side indicative of the rotational orientation of the cores of the multicore fiber. The ferrule includes a flat surface at one side of the guide hole, corresponding in position to the flat side of the multicore fiber. Installing the multicore fiber into the guide hole with its flat side abutting the flat surface along the side of the guide hole provides alignment of the cores with respect to an optical component to which the multicore fiber endface is to be connected.

A further aspect of the invention is directed to an alignment housing having a guide hole that is shaped to closely receive a multicore fiber having a flat side indicative of the rotational orientation of the cores of the multicore fiber. The alignment housing includes one or more inner reference surfaces, and biasing means for urging corresponding surfaces of a loaded fiber against the references, thereby aligning the fiber cores with a desired rotational orientation. A further aspect of the invention provides a mating adapter for connecting first and second alignment housings.

Further aspects of the invention are directed to techniques relating to the above connector structures.

BRIEF DESCRIPTION OF THE DRAWINGS

FIG. 6 shows an exploded view of a BTW LC connector, according to an aspect of the invention, in which a rotatable collar is used to provide continuous rotational alignment of a multicore fiber mounted to the connector.

FIG. 7 shows a close-up view of a rotatable ferrule subassembly, as used in the FIG. 6 connector.

FIG. 10 shows a jumper LC connector, according to a further aspect of the invention.

FIGS. 11A-11B contains examples of alternative geometries for a rotatable collar suitable for use in the connectors shown in FIGS. 6 and 10.

FIG. 12 contains an exploded view of a BTW LC connector according to a further aspect of the invention, in which a ferrule subassembly is housed within a frame that is rotatable as a unit within the assembled connector.

FIG. 13 shows a close-up view of a retainer element, as used in the FIG. 12 connector.

FIG. 14 shows an exploded view of the FIG. 12 connector, partially assembled.

FIG. 31 shows an exploded view of a BTW SC connector, according to an aspect of the invention, wherein a rotatable collar is used to provide rotational alignment of a multicore fiber mounted to the connector.

FIG. 32 shows a close-up view of the ferrule subassembly from the FIG. 31 connector, installed onto a buffered fiber.

FIGS. 53A-53C are a series of diagrams illustrating a further aspect of the invention, according to which a mating adapter is used to connect first and second multicore fibers that have been installed into alignment housings of the type shown in FIGS. 52A-52E.

DETAILED DESCRIPTION

Aspects of the invention are directed to connectors for use with multicore fiber cables. As used herein, the term "multicore fiber" (MCF) refers generally to an optical fiber having a plurality of individual cores that extend longitudinally through a common cladding, thereby providing a corresponding plurality of parallel data transmission channels. Various exemplary MCFs are depicted herein, having different cross-sectional profiles, characterized by the number of cores, the configuration of cores in a one-dimensional or two-dimensional array, and the shape of the fiber's outer perimeter. It will be appreciated that the structures and techniques described herein may be implemented using MCFs having configurations different from those specifically depicted herein.

The present specification is divided into two sections:

Section A describes connector structures and techniques that are applicable to MCFs having circular cross-sectional profiles, as well as to MCFs having other types of cross-sectional profiles. Section A has been taken from U.S. patent application Ser. No. 13/049,780, from which the present application claims priority.

Section B describes connector structures and techniques that are used in conjunction with an MCF having one or more flat sides. The structures and techniques described in Section B may be practiced in combination with, or in addition to, structures described in Section A.

Section A

Section A is directed to simplex (i.e., single-fiber) connectors for use with single-mode and multimode multicore fibers. As discussed below, a connector of the type described herein is mounted to the end of a multicore fiber cable. The connector provides plug-in connectivity between the multicore fiber cable and an optical transmission device having a mating socket. When the connector is plugged into the socket, an endface of the cabled multicore fiber is urged against a corresponding surface within the socket. Alternately, the multicore fiber could be connected to another multicore fiber, via a pass-through adapter, with connectors installed into opposing ends of the adapter.

One application for simplex connectors of the type described herein is in a multi-channel transmission system, in which segments of multicore fiber are butt-coupled with specially designed 2-dimensional VCSEL and PiN photo detector arrays to facilitate simultaneous transmission over several cores, within each fiber. Such a transmission system is described in U.S. Prov. Pat. App. Ser. No. 61/314,184, filed on Mar. 16, 2010, which is owned by the assignee of the present application, and which is incorporated herein by reference in its entirety.

Figure 1A:
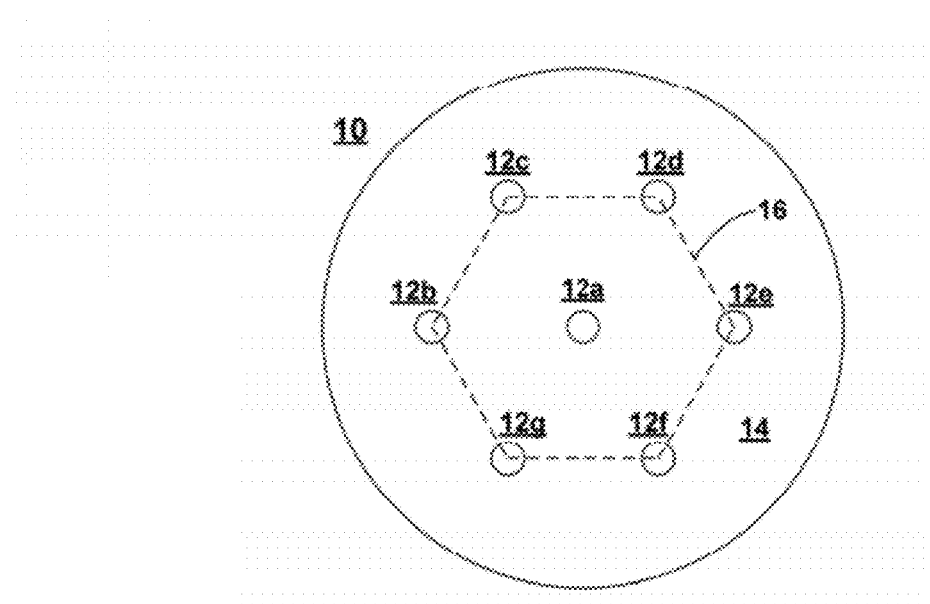
FIGS. 1A and 1B show, respectively, cross section and isometric diagrams of an exemplary 7-core multicore fiber (MCF) design described in a co-pending patent application owned by the assignee of the present application.
Figure 1B:
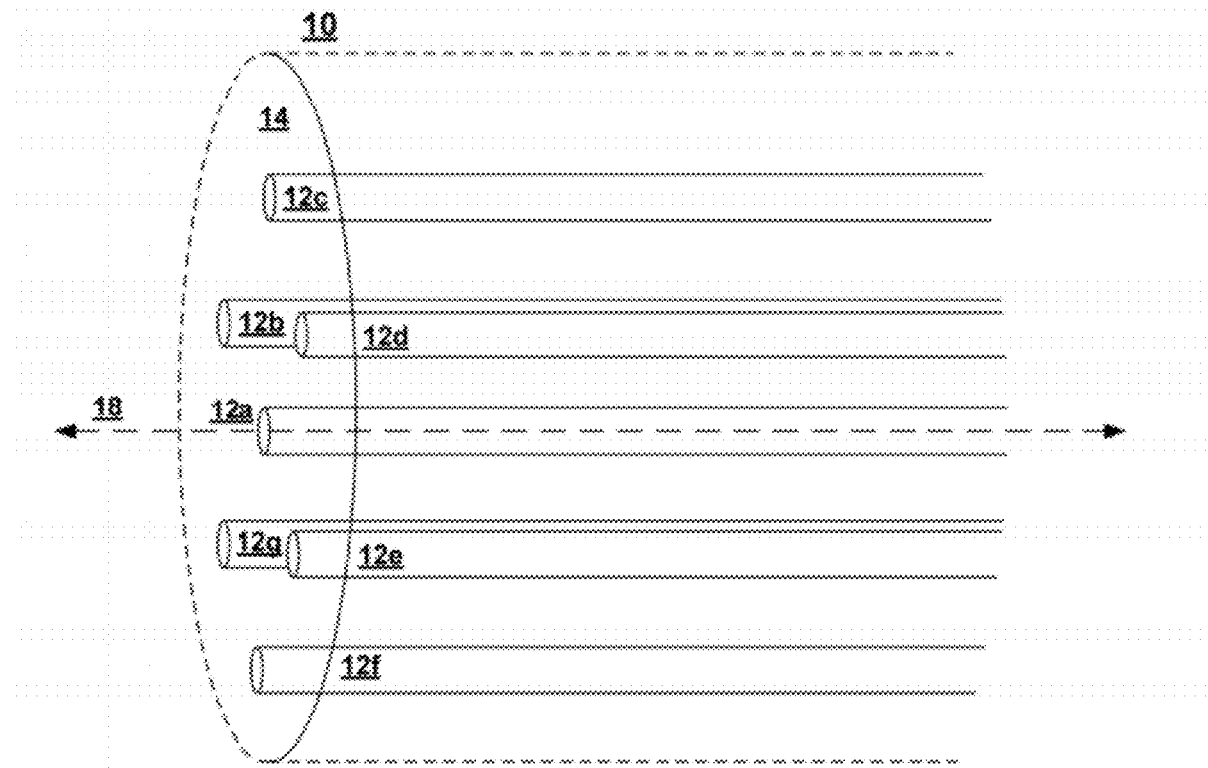

FIGS. 1A and 1B show, respectively, cross section and isometric diagrams of an exemplary 7-core MCF 10, described in U.S. Prov. Pat. App. Ser. No. 61/314,181, filed on Mar. 16, 2010, which is owned by the assignee of the present application, and which is incorporated herein by reference in its entirety. MCF 10 comprises an array of seven core regions 12a-g within a common cladding region 14. A first core region 12a is located at the center of the fiber. Six of the core regions 12b-g are arranged as a hexagon 16 surrounding central core 12a. The seven core regions 12a-g are configured to carry respective light transmissions down the length of MCF 10 along a longitudinal axis 18 thereof.

MCF 10 is fabricated, using a stack-and-draw technique, from seven graded-index LaserWave fiber core rods arranged in a hexagonal array. The drawn fiber has 26-μm core diameters, a 39-μm core-to-core pitch, and a circular outer cladding having a diameter of 125 μm, which is compatible with conventional optical connectivity products. It will be appreciated that the present description of aspect of the invention is also applicable to single-mode multicore fibers, as well as to multicore fibers having different outer diameters and outer cladding shapes. For example, while the outer cladding shown in FIGS. 1A-1B has a circular cross section, the structures and techniques described herein could also be used in conjunction with fibers having elliptical cross sections. (Indeed, a circle can be viewed as a special case of an elliptical geometry.)

Figures 2A, 2B:
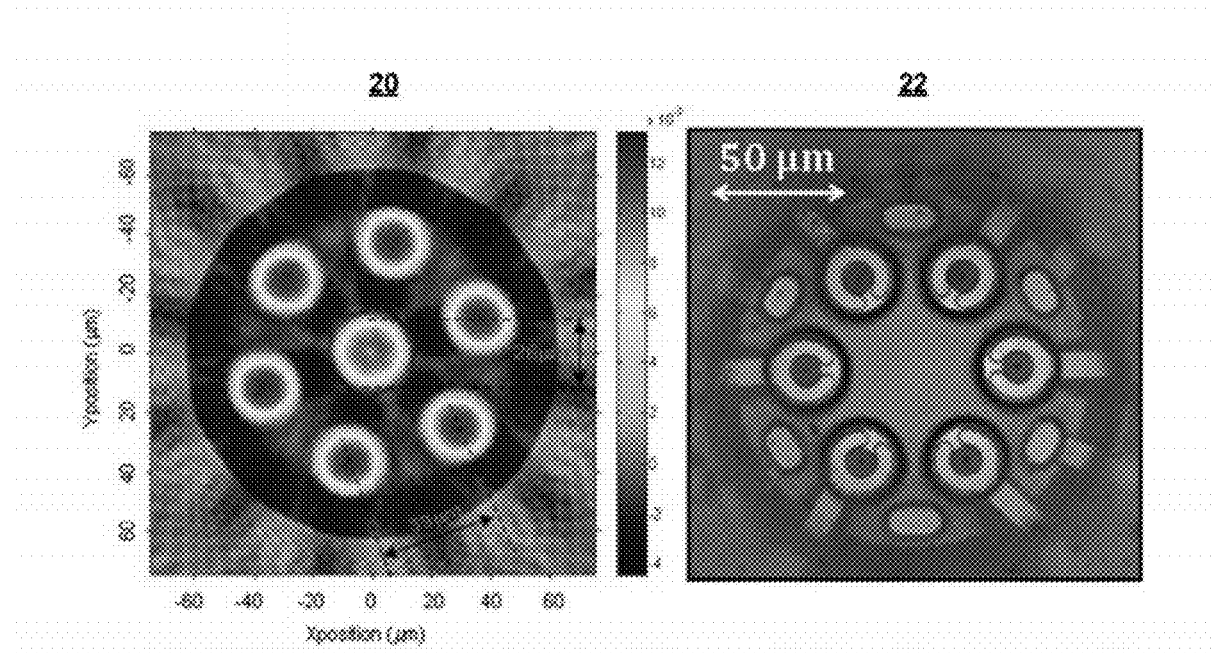
FIG. 2A shows a tomographic refractive index profile of the 7-core MCF shown in FIGS. 1A and 1B.
FIG. 2B shows an image of a hexagonally arranged VCSEL array that can be used to interface with the outer six cores of the MCF shown in FIGS. 1A and 1B.
Figure 2C:
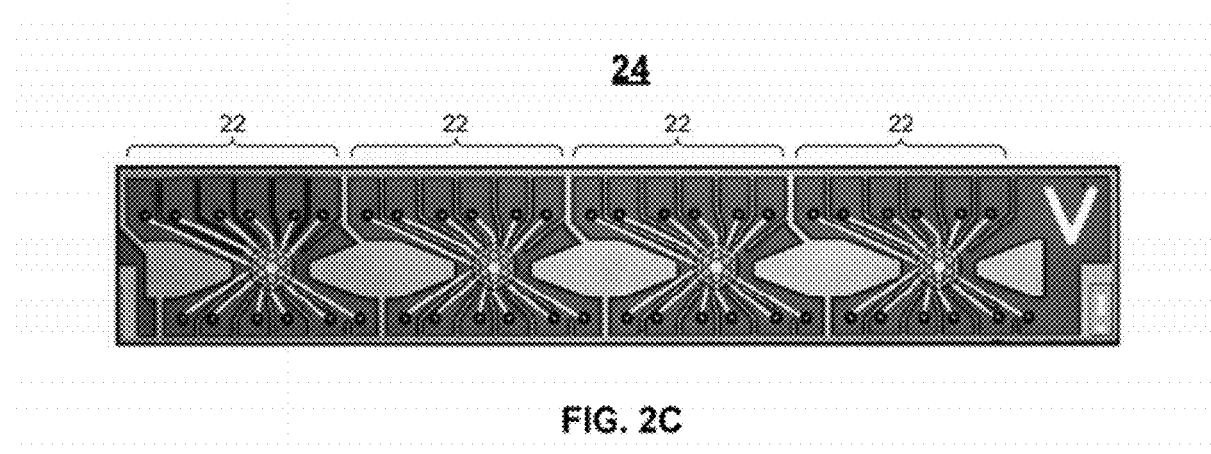
FIG. 2C shows an image of a transmitter subassembly, comprising four side-by-side VCSEL arrays of the type shown in FIG. 2B.

FIG. 2A shows a tomographic refractive index profile 20 of the 7-core MCF 10. FIG. 2B shows an image of a hexagonally arranged VCSEL array 22 that can be used to interface with the outer six cores of the MCF. FIG. 2C shows an image of a transmitter subassembly 24, comprising four side-by-side VCSEL arrays 22, each array comprising six VCSELs. Such a device could be used to transmit through the six outer cores of a 7-core multicore fiber. Of course, other core counts and VCSEL configurations are possible, e.g., 2×2, etc.

According to an aspect of the invention, described below, a multicore fiber is terminated within the cylindrical ferrule of a simplex connector, such as an LC, FC, MU, ST, or SC connector, or the like. Using a 2-dimensional VCSEL array, such as array 22 shown in FIG. 2B, it is possible to realize parallel transmission down multiple channels in the same space required to conduct single-channel transmissions via a conventional single-core fiber. Of course, since multicore fibers with any number of cores can be produced, multicore connectors with various channel counts are possible.

In order to facilitate signal transmission, each core in the simplex connector has to be precisely aligned with a corresponding VCSEL of an active device. For mated connectors, the corresponding cores (i.e. transmission paths) of the multicore Fiber must terminate at precisely aligned locations within the opposing connector.

Aspects of the invention are directed to multicore fiber connectors that facilitate core-to-device and core-to-core alignment. As described below, a connector system according to an aspect of the invention provides continuous rotational alignment of a multicore fiber with respect to a second element by providing a ferrule frame assembly in which an end of the multicore fiber is rotatably mounted. According to a further aspect of the invention, after alignment, the rotational orientation of the multicore fiber is then fixed relative to the ferrule axis. Rotational alignment structures according to aspects of the invention are described in the context of LC-type and SC-type connectors. Both behind-the-wall (BTW) and jumper (i.e., patch cord) variants are presented.

The optical performance of a connection between mated multicore connectors depends, in large part, on the accuracy with which the corresponding cores of the two multicore Fiber endfaces are aligned. A number of conditions affect the alignment of the multicore fiber endfaces, including lateral offset, angular offset, and longitudinal offset.

Contributing factors to lateral and angular offset include: ferrule outside diameter tolerances, ferrule-capillary concentricity relative to the ferrule outside diameter, ferrule-capillary angularity relative to the ferrule outside diameter, fiber diameter to ferrule-capillary clearance, fiber core positional error, and core orientation relative to connector keying features. These factors are addressed via tight dimensional control of the ferrule and fiber geometries, and the application of the rotatable connector components and associated structures and techniques described herein.

Longitudinal offset between the multicore fiber cores is influenced by a number of factors, including: axial force on the multicore fiber endfaces (e.g., due to spring-loading), radius of curvature of the ferrules, apex offset of the spherical ferrule endfaces, and fiber protrusion or undercut from the ferrule endfaces. To ensure that all cores of the mated multicore connectors physically contact, assuming rotational alignment has been achieved, it is imperative that both the ferrule contact force and endface geometry of the connectors be controlled.

After polishing, the multicore fibers will have a convex shape; therefore, the contact force must be sufficient to mate the cores with some minimal force. The radius of curvature of the ferrule endfaces should typically be greater than 7 mm, the fiber protrusion should typically range from −0.125 μm to +4.0 μm, the apex offset of the endface should typically be less than 70 μM, and the contact force on the ferrules should be greater than 4.1 N, to ensure core-to-core contact is maintained during operation.

For the purposes of the present discussion, it is assumed that the described connectors are used in conjunction with an optical fiber cable containing a single multicore fiber. However, it will be apparent that the described structures and techniques may also be used in conjunction with optical fiber cable containing a plurality of fibers and fiber types.

It will be appreciated that the present examples of various practices of the invention are illustrative, rather than limiting, and that the described structures and techniques may be applied, with suitable modification as needed, to other types of optical fiber cables and connectors.

The description of aspects of the invention is organized into the following sections, in which a number of different practices of the invention are presented:

1. Multicore Simplex Connectors: LC-Type
1.1 Prior-Art LC Connectors
1.2. LC Connector with Rotatable Flange Collar
    1.2.1. Polygonal-Shaped Collar
    1.2.2. Other Collar Geometries
1.3. LC Connector with Rotatable Frame
    1.3.1. Rotatable Frame with Front-End Press-Fit Retainer
    1.3.2. Rotatable Frame with Bayonet-Style Retainer
    1.3.3. Rotatable Frame with Rear-End Press-Fit Retainer
1.4. LC Connector with Extended Flange
2. Multicore Simplex Connectors: SC-Type
2.1. Prior-Art SC Connectors
2.2. SC Connector with Rotatable Flange Collar
    2.2.1. Collar with Keyways or Keys
    2.2.2. Other Collar Geometries
2.3. SC Connector with Rotatable Cable Retention Member
    2.3.1. Rotatable Retention Member with Keys
3. Techniques
1. Multicore Simplex Connector: LC-Type
1.1. Prior-Art LC Connectors Section 1.1 has been included in order to provide context for the sections that follow.

Generally speaking, an optical fiber connector is a mechanical device that is mounted to an end of an optical fiber cable in order to provide an easy way to connect the cable end to, and disconnect the cable end from, a device having a suitably shaped socket.

The mounting of a connector to the end of an optical fiber cable is a multistep process. First, an end of the optical fiber cable is prepared by stripping away the outer protective layers to expose a length of bare optical fiber. The bare fiber is then threaded down the length of a capillary extending longitudinally through a ferrule subassembly, with the end of the bare fiber positioned at the tip of the ferrule.

The ferrule subassembly is loaded into a plug housing, which is shaped to "snap" into a suitably shaped socket, bringing the optical fiber endface at the ferrule tip into operational proximity to a corresponding surface contained within the socket (such as, for example, the above-described array of optical devices) or into direct contact with the optical fiber endface of another connector.

Figures 3, 4, 5:
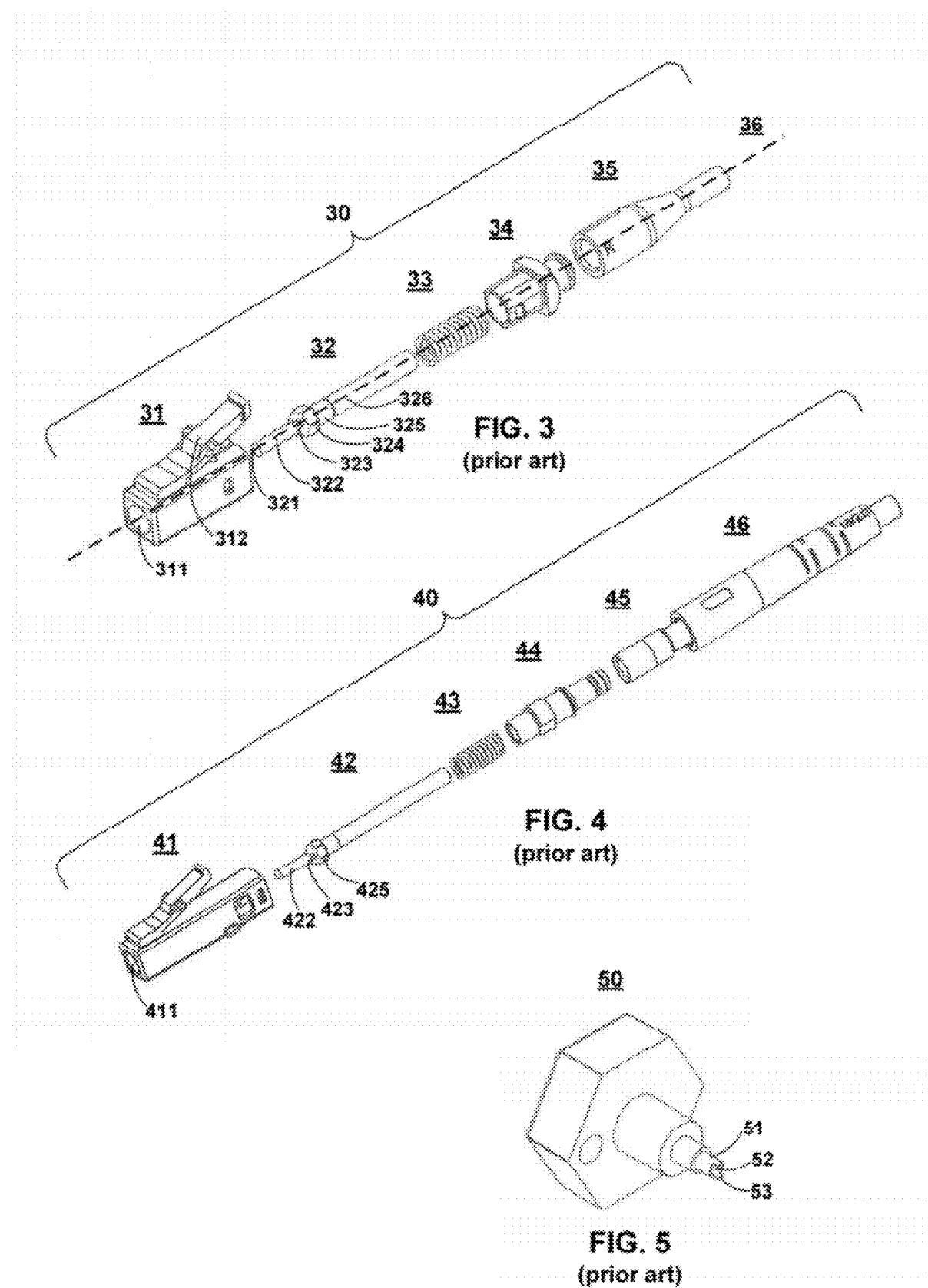
FIG. 3 shows an exploded view of a behind-the-wall (BTW) LC connector according to the prior art.
FIG. 4 shows an exploded view of a jumper LC connector according to the prior art.
FIG. 5 shows a perspective view of a tuning wrench of a type suitable for use in conjunction with the connectors shown in FIGS. 3 and 4.

FIG. 3 shows an exploded view of a behind-the-wall (BTW) LC connector according to the prior art. LC connector 30 comprises the following components, from left to right: plug housing 31; ferrule subassembly 32; spring 33; extender 34; and buffer boot 35. For the purposes of the present discussion, the adjectives "front" and "lead" refer to the plug end of a connector (i.e., the left side of FIG. 3). The adjectives "rear" and "tail" refer to the boot end of a connector (i.e., the right side of FIG. 3). Components 31-35 share a common longitudinal axis 36.

In the assembled connector 30, the ferrule subassembly 32, the cable end mounted thereto, "floats" along longitudinal axis 36 within an enclosure comprising plug housing 31, extender 34, and buffer boot 35. Spring 33 provides spring-loading of the ferrule subassembly 32 within the enclosure, such that the ferrule-flange assembly 32 is biased toward the front end of plug housing 31. Boot 35 relieves mechanical strain on the optical fiber cable.

Ferrule subassembly 32 includes a ferrule 322, a receptacle 325, and tubing 326. The ferrule 322 has a precision hole extending down its length along axis 36. The hole is shaped to closely receive a bare optical fiber from a stripped end of an optical fiber cable (not shown). The bare fiber is trimmed at the ferrule tip 321 and polished, resulting in an exposed fiber endface having a convex perimeter. Receptacle 325 includes a hexagonal flange 324 having a pair of slots 323 in its perimeter.

When connector 30 is fully assembled, the ferrule tip 324 is accessible through an opening 311 at the front of the plug housing 31. The plug housing 31 includes a latch arm 312 that is used to releasably lock the connector into a corresponding socket (not shown).

When connector 30 is fully assembled, the hexagonal flange 324 is seated in a corresponding hexagonal cavity within plug housing 31, thereby preventing rotation of the flange/ferrule assembly 32 around axis 36.

FIG. 4 shows an exploded view of a jumper LC connector 40 according to the prior art. LC connector 40 comprises the following elements, from left to right: plug housing 41, ferrule subassembly 42; spring 43; cable retention member 44; crimp/sleeve subassembly 45; and strain-relief boot 46. It will be seen that the components of jumper LC connector 40 generally correspond to the components of BTW LC connector 30, shown in FIG. 1. In particular, it will be seen that the above description of the elements of plug housing 31 and ferrule subassembly 32 in BTW LC connector 30 apply equally to plug housing 41 and ferrule subassembly 42 in jumper LC connector 40.

FIG. 5 shows a perspective view of a tuning wrench 50 that can be used to rotate the ferrule subassembly 32, 42 around its longitudinal axis in an assembled connector 30, 40, in order to improve core alignment. As shown in FIG. 5, tuning wrench 50 includes a hollow shaft 51 having an opening 52 therein that fits through the plug housing opening 311, 411, and around the ferrule 322, 422. Teeth 53 engage flange slots 323, 423.

In use, tuning wrench 50 pushes the ferrule subassembly 32, 42 along its longitudinal axis toward the tail end of the assembled connector 30, 40, such that spring 33, 43 is depressed, and such that hexagonal flange 325, 425 is unseated from its receiving cavity in plug housing 31, 41. Once the flange 325, 425 is unseated, the ferrule subassembly 32, 42 can then be freely rotated around its longitudinal axis. Releasing the tuning wrench 50 causes the hexagonal flange 325, 425 to be reseated in its receiving cavity. It will be appreciated that the ferrule subassembly 32, 42 can be only rotated to one of six orientations (i.e., 60-degree positional tuning) relative to the plug housing 31, 41, corresponding to the six possible rotations of the flange 325, 425 within its corresponding hexagonal cavity.

1.2. LC Connector with Rotatable Flange Collar
1.2.1. Polygonal-Shaped Rotatable Flange Collar FIG. 6 shows an exploded view of a BTW LC connector 60 according to an aspect of the invention. Connector 60 comprises the following components (from left to right): plug housing 61 with opening 611 and latch arm 612; rotatable flange collar 62; ferrule subassembly 63; tubing 64; spring 65; extender 66; and buffer boot 67. Components 61-67 share a common longitudinal axis 68.

Ferrule subassembly 63 comprises ferrule 632, which is mounted into the front end of receptacle 630. Ferrule 632 includes a precision hole along longitudinal axis 68. This hole is dimensioned to closely receive a bare optical fiber from a stripped end of an optical cable.

Receptacle 630 includes a tapered lead end 634 with an opening therein into which ferrule 632 is seated, and a plurality of slots 633, which are configured to be engaged by a tuning wrench of the type shown in FIG. 5. Receptacle 630 further includes a cylindrical barrel section 635 and a flange 636.

Figure 9:
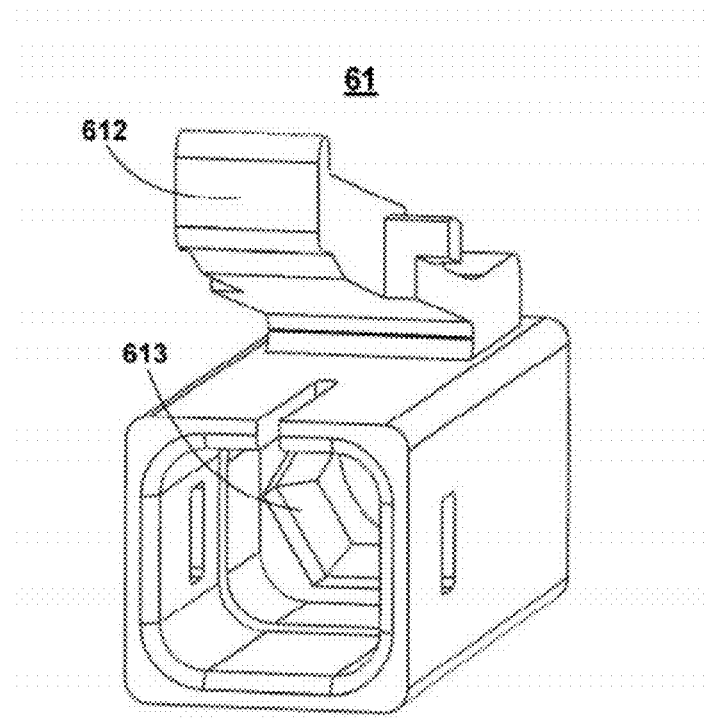
FIG. 9 shows a rear perspective view of the plug housing of the FIG. 6 connector.

Collar 62 has an opening therein 621 that is dimensioned to fit closely around barrel section 635, while allowing ferrule subassembly 63 to be rotated within collar opening 621, around longitudinal axis 68. In the assembled connector 60, collar 62 butts up against flange 636. In addition, in the assembled connector 60, collar 62 is seated into a correspondingly shaped cavity within plug housing 61. An example of such a cavity is shown in FIG. 9, discussed below. Thus, collar 62 provides a mechanical interface between the ferrule subassembly 63 and the plug housing 61.

FIG. 7 shows a close-up view of an assembled ferrule subassembly 70, comprising collar 62, ferrule subassembly 63, tubing 64, and an installed buffered multicore fiber 71. From FIG. 7, it can be seen that when assembled, ferrule 632 and tapered lead end 634 of receptacle 630, including slots 633, protrude through the opening in collar 62. In accordance with the above discussion, the outer layers of fiber 71 are stripped away to expose a bare multicore fiber that is threaded through a precision hole in ferrule 632 and held in position using epoxy or other suitable adhesive. The end of the fiber is trimmed and polished to create a convex fiber endface at ferrule tip 631.

Figure 8:
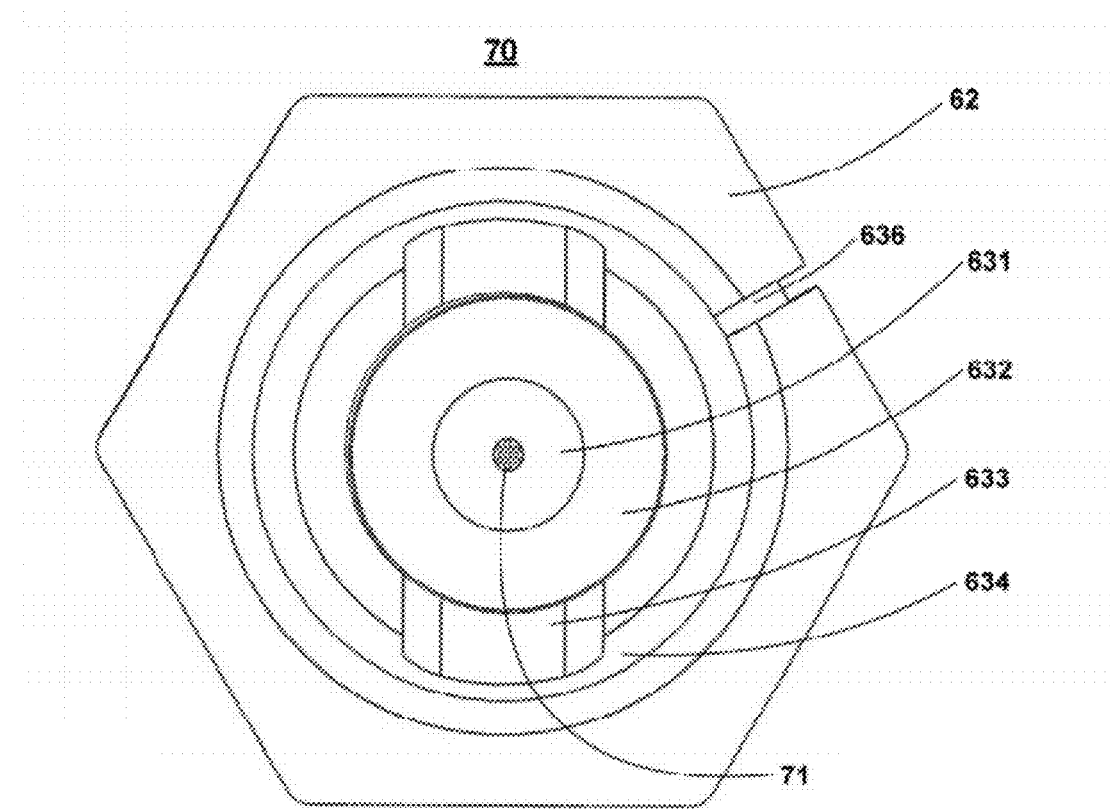
FIG. 8 shows an end view of the rotatable ferrule subassembly shown in FIG. 7.

Once the fiber is terminated and polished, the collar 62 can be rotated relative to assembly 63, to allow the cores of the multicore fiber to be aligned in the desired orientation. FIG. 8 shows an end view of assembled ferrule subassembly 70, in which the collar 62 is positioned so that a particular core of fiber 71 is directly adjacent to one of the flat sides of the hexagonal collar 62.

In one scenario, the hex collar 62 is held fixed in a fixture while the ferrule subassembly 63 is rotated within the collar 62. Once the collar 62 is in the desired position relative to the ferrule subassembly 63, it can be held in position with epoxy or other suitable adhesive. Alternatively, the collar 62 can be configured to provide a light press fit onto the flange barrel section 635, which would inhibit rotation after orientation. Once the flange collar 62 is oriented, the flange/ferrule assembly can be installed into the connector plug housing 61.

FIG. 9 shows a rear perspective view of plug housing 61, the interior of which includes a tightly toleranced internal hexagonal cavity 613. The hex collar 62 holds the ferrule subassembly 63 in the desired orientation, relative to the connector cantilever latch 612 located on the top of the housing 61.

Alternatively, the ferrule subassembly 63 and the other connector components (i.e. housing, spring, extender, etc.) can be fully assembled and a special LC tuning wrench, like that shown previously in FIG. 5, could be used to orient the ferrule subassembly 63 relative to the collar 62. The tuning wrench engages slots 633 and allows the user to rotate the ferrule flange barrel relative to the hex collar (and housing).

FIG. 10 shows the jumper LC connector 100 employing the above-described structures. LC connector 100 comprises the following elements, from left to right: plug housing 101; rotatable collar 102; ferrule subassembly 103; tubing 104; spring 105, cable retention member 106; crimp/sleeve subassembly 107; and strain-relief boot 108.

The above-described orientation techniques with respect to BTW connector 60 (FIG. 6) are equally applicable to jumper connector 100. Jumper components (i.e., cable-retention member 106, crimp-sleeve subassembly 107, and strain-relief boot 108) are used in place of their BTW counterparts.

1.2.2. Other Collar Geometries

Other collar geometries are also feasible. The hexagonal shape is just one of many possible polygonal shapes, including, for example, square, rectangular, triangular, and the like. The rotatable collar could also be D-shaped or double-D shaped. The internal geometry of the plug housing would be changed to match the collar geometry. FIGS. 11A-11B contains examples of alternate collar geometries 110, 115.

1.3. LC Connector with Rotatable Frame 1.3.1. Rotatable Frame with Front-End Press-Fit Retainer FIG. 12 contains an exploded view of a BTW LC connector 120 according to a further aspect of the invention, in which a ferrule subassembly is housed within a frame that is rotatable as a unit within the assembled connector. Connector includes the following elements (left to right): plug housing 121; retainer 122; ferrule subassembly 123; tubing 124; spring 125; rotatable frame 126; and buffer boot 127. Frame 126 has a substantially cylindrical shape, and has a cavity therein shaped to receive the ferrule subassembly 123.

FIG. 13 shows a close-up view of a retainer 122, which is press-fit into the mouth of frame 126 to retain the ferrule subassembly 123, tubing 124, and spring 125 within the frame 126. The retainer has an internal geometry (e.g., hex, square, rectangular, D, double-D, etc.) which matches the shape of the ferrule subassembly 123.

FIG. 14 shows an exploded view of connector 120, in which the ferrule subassembly 123, tubing 124, and spring 125 have been loaded into frame 126, and in which press-fit retainer 122 has been seated in the mouth of frame 126 to form a unit 140 having a front end that fits into housing 121 and a rear end that fits into buffer boot 127.

Once the connector 120 has been assembled onto a multicore fiber, the fiber cores can be oriented relative to the latch arm on the housing by rotating frame 126 relative to the housing 121. Once the fiber cores are in the desired position relative to the connector housing 121, the frame 126 can be held in position with epoxy.

Figure 15:
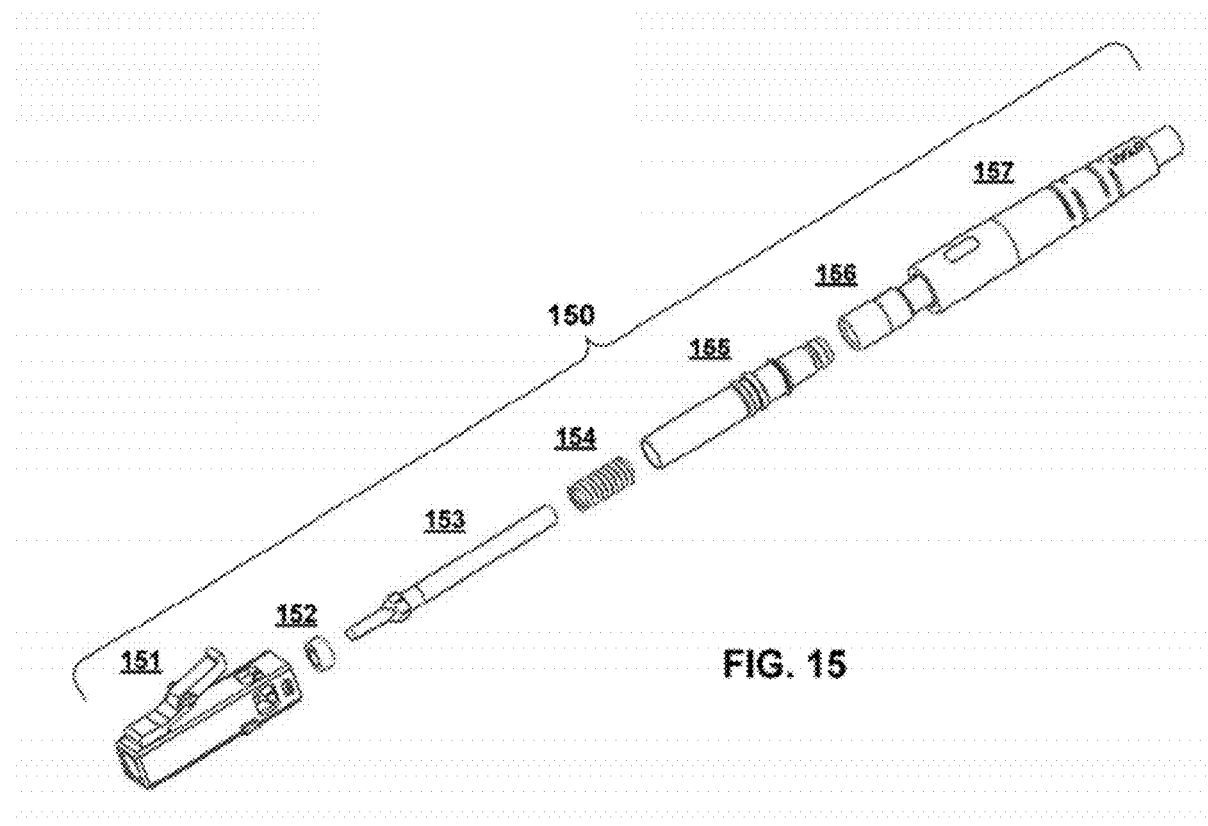
FIG. 15 shows an exploded view of an LC jumper version of the FIG. 12 connector.

FIG. 15 shows an exploded view of the LC Jumper version of the rotatable frame assembly concept. Connector 150 includes the following elements (left to right): plug housing 151: retainer 152; ferrule subassembly 153; spring 154; rotatable frame 155; crimp/sleeve subassembly 156 and buffer boot 157. Frame 126 has a substantially cylindrical shape, and has a cavity therein shaped to receive the ferrule subassembly 123.

Figure 16:
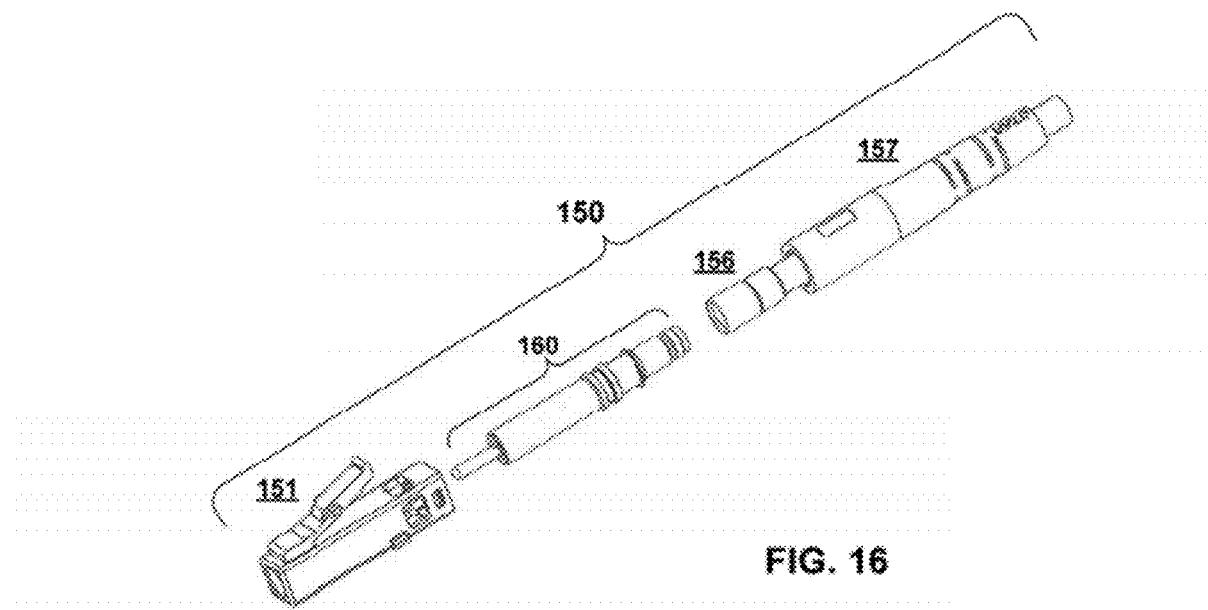
FIG. 16 shows an exploded view of the FIG. 15 connector, partially assembled.

FIG. 16 shows partially assembly connector 150, including the assembled rotatable frame assembly 160, comprising components 152-155, with the press-fit retainer 52 in place. The orientation method is the same as that employed for the BTW connector 120 (FIGS. 12-14) discussed above; however, LC jumper components are used.

1.3.2. Rotatable Frame with Bayonet-Style Retainer

Figure 17:
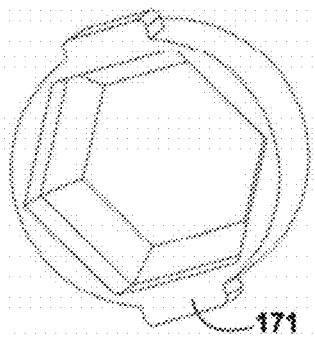
FIG. 17 shows a perspective view of a retainer element according to a further aspect of the invention, in which the retainer element is provided with a plurality of bayonet elements.

FIG. 17 shows a perspective view of a retainer 170 according to a further aspect of the invention, in which the retainer 170 is provided with a plurality of bayonet elements (e.g., retainer tabs) 171 that are configured to lock into mating bayonet elements (e.g., receiving slots) on a rotatable frame of the type described above.

Figure 18:
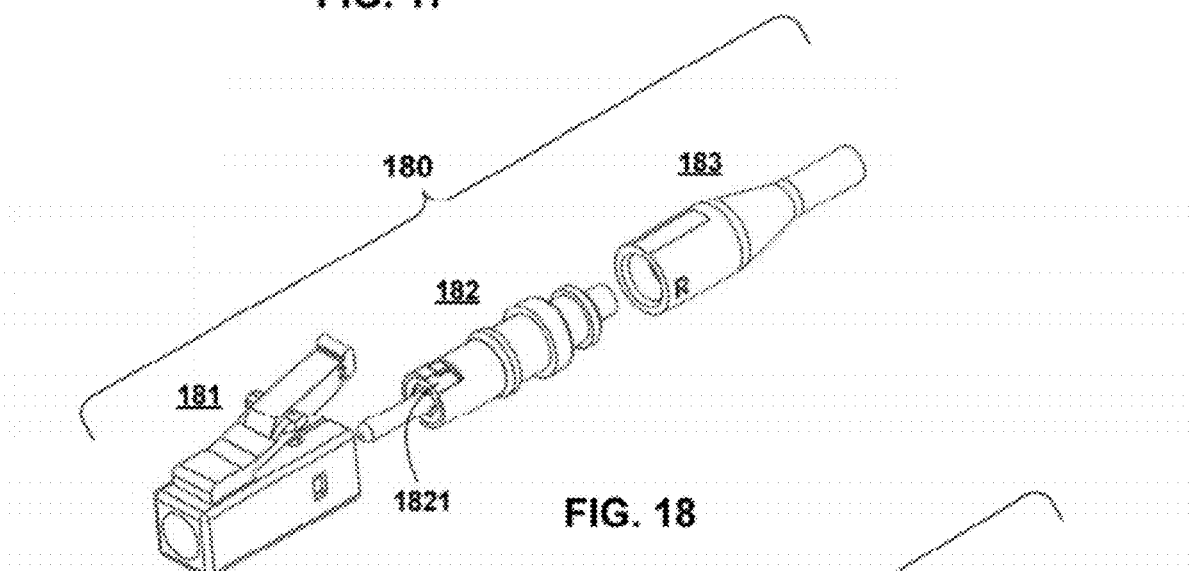
FIGS. 18 and 19 show, respectively, perspective views of a BTW LC connector and jumper connector, in which a retainer element of the type shown in FIG. 17 is used to hold a ferrule subassembly within a rotatable frame.
Figure 19:
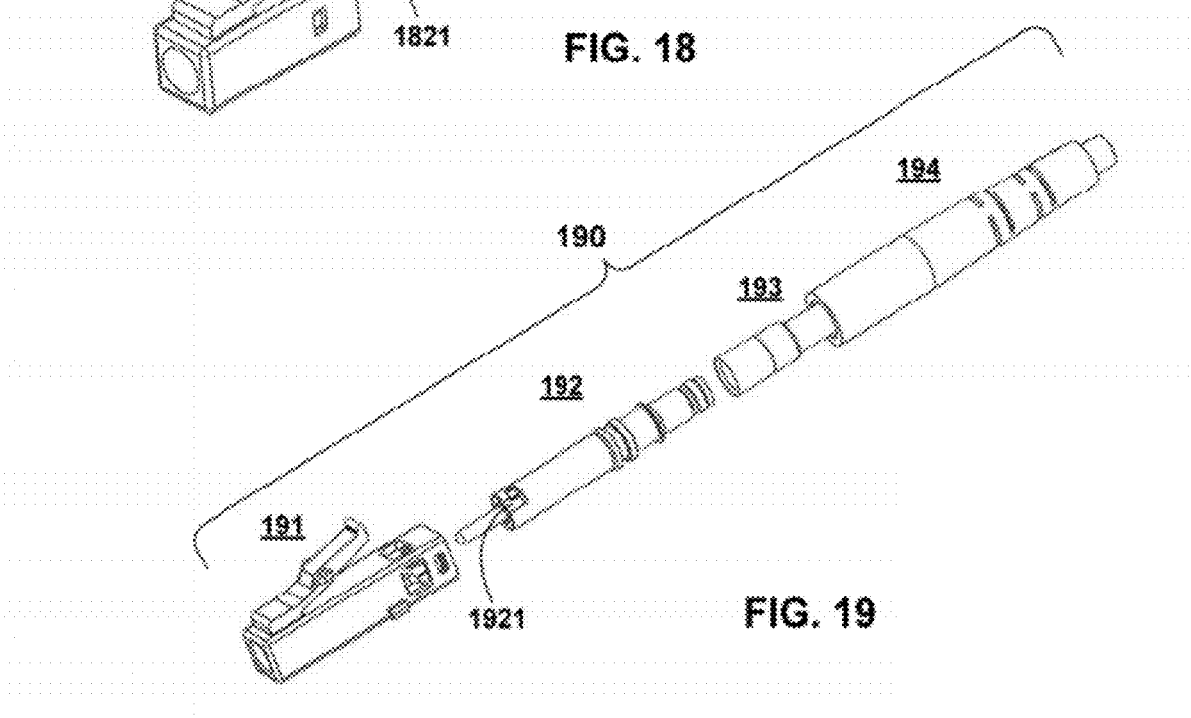

FIGS. 18 and 19 show, respectively, perspective views of a BTW connector 180 and jumper connector 190. Connectors 180, 190 include a unit 182, 192 comprising a rotatable frame into which a ferrule subassembly has been loaded, and into which a bayonet-style retain of the type shown in FIG. 17 has been inserted and rotated, with retainer tabs captured by corresponding bayonet slots 1821, 1921.

The retainer captures the ferrule subassembly within the rotatable frame, thus performing the function of the press-fit retainer described above.

The front end of the assembled unit 182, 192 is inserted into the plug housing 181, 191, and the rear end of the assembled unit 182, 192 is inserted into boot 183 in connector 180 and into crimp/sleeve subassembly 193 and boot 194 in connector 190.

1.3.3. Rotatable Frame Assembly with Rear-End Press-Fit Retainer

In an alternate embodiment, the ferrule subassembly and spring are captured within the rotatable frame assembly by a press-fit retainer installed at the rear end.

Figure 20:
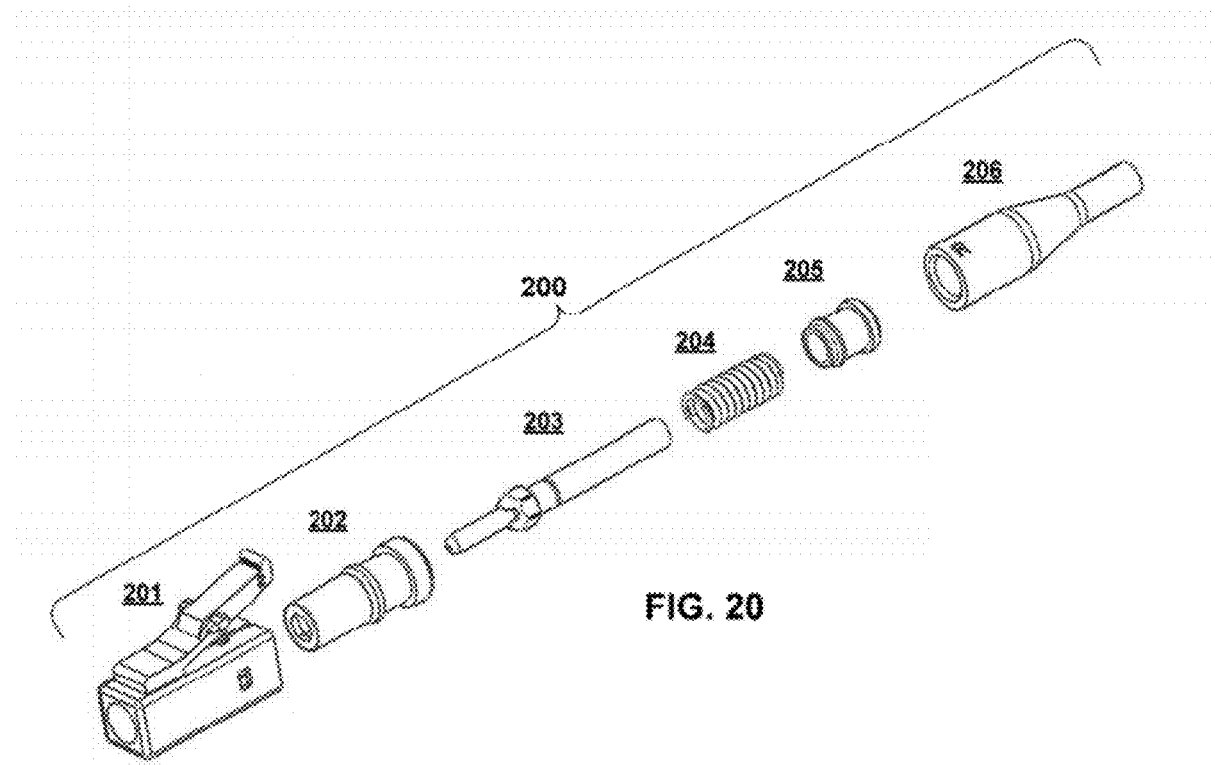
FIG. 20 shows an exploded view of a BTW LC connector according to a further aspect of the invention, in which a rear-end retainer element is used to hold a ferrule subassembly within a rotatable frame.

FIG. 20 shows an exploded view of a BTW connector 200 according to this aspect of the invention. Connector 200 comprises the following components: plug housing 201; rotatable frame 202; ferrule subassembly 203; spring 204; press-fit retainer 205; and buffer boot 206.

Figure 21:
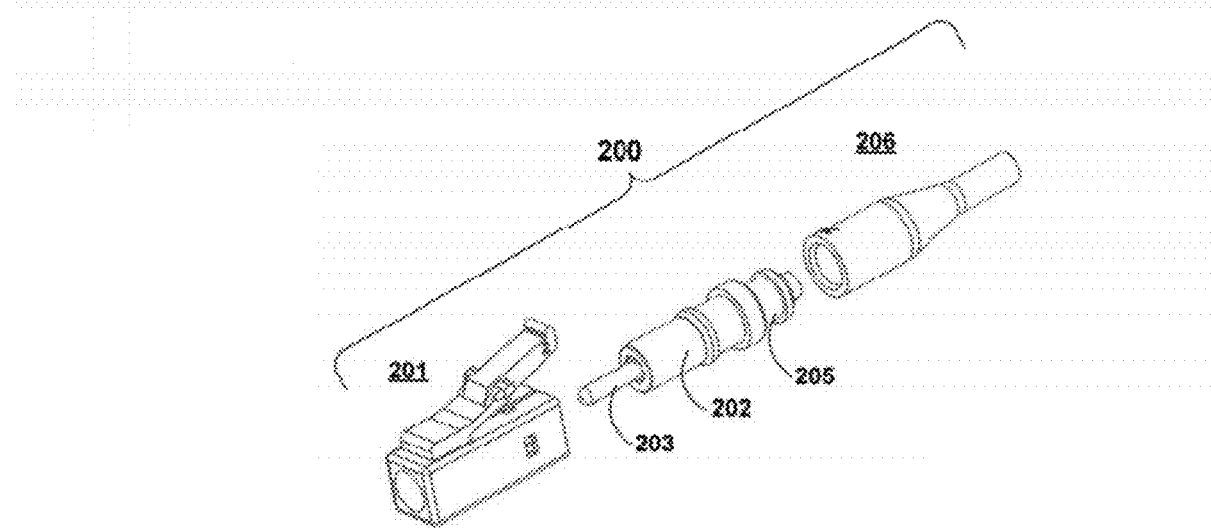
FIG. 21 shows the FIG. 20 connector, partially assembled, with the rear-end retainer pressed into position.

FIG. 21 shows an exploded view of connector 200, in which rotatable frame 202, ferrule subassembly 203, spring 204, and press-fit retainer 205 have been assembled together into a single unit.

Figure 22:
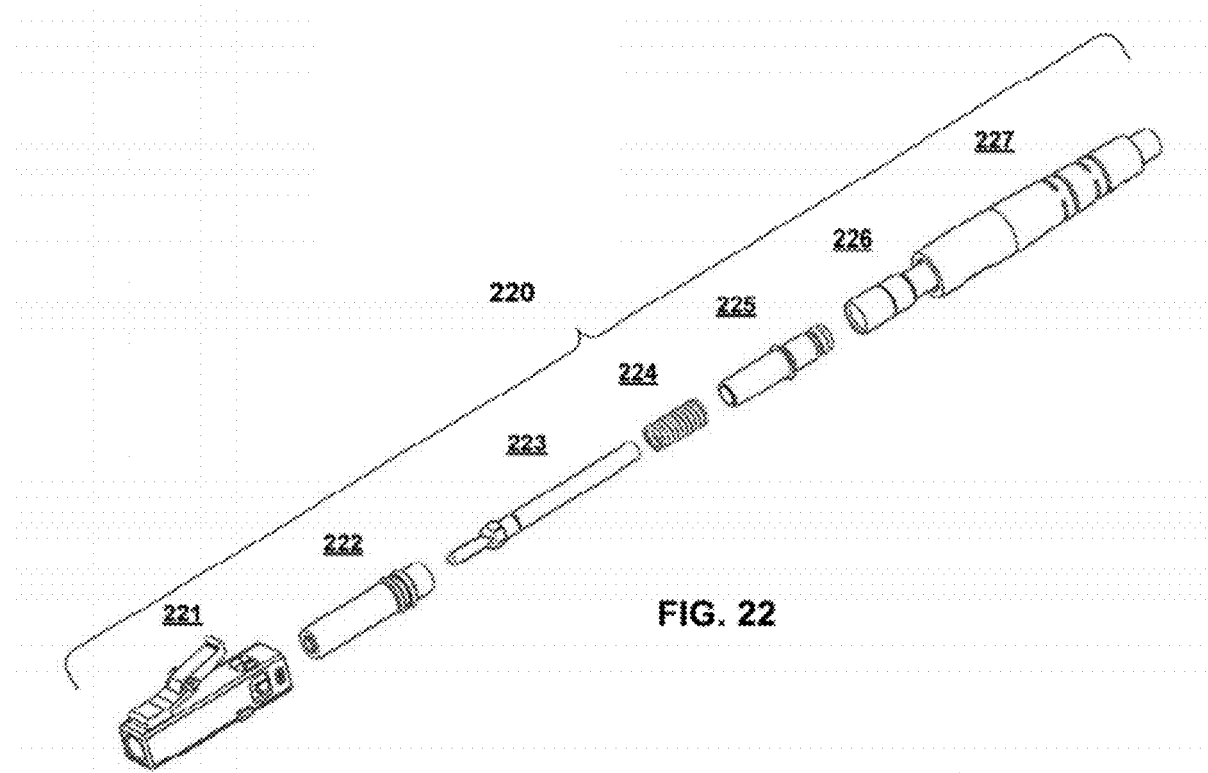
FIG. 22 shows an exploded view of a jumper LC connector, according to a further aspect of the invention, in which a rear-end retainer element is used to hold a ferrule subassembly within a rotatable frame.

FIG. 22 shows an exploded view of a jumper LC connector 220 according to this aspect of the invention. Connector 220 comprises the following components: plug housing 221; rotatable frame 222; ferrule subassembly 223; spring 224; press-fit retainer 225; crimp/sleeve subassembly 226; and strain-relief boot 227.

Figure 23:
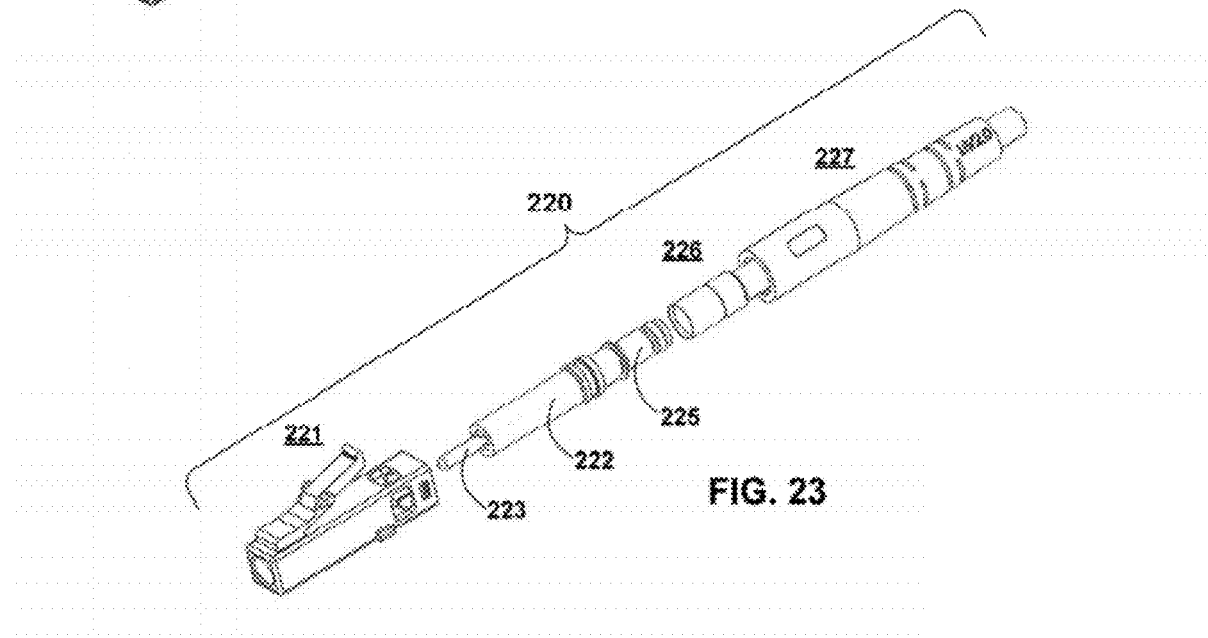
FIG. 23 shows an exploded view of the FIG. 22 connector, partially assembled.

FIG. 23 shows an exploded view of connector 220, in which rotatable frame 222, ferrule subassembly 223, spring 224, and press-fit retainer 225 have been assembled together into a single unit.

1.4. LC Connector with Extended Flange

According to a further aspect of the invention, an extended ferrule/flange and a rotatable extender are used to provide continuous rotational alignment of the ferrule subassembly within a multicore fiber cable connector. As described below, the use of an extended ferrule flange and rotatable extender allows the rotational alignment of the ferrule subassembly to be controller from the boot end of the connector.

Figure 24:
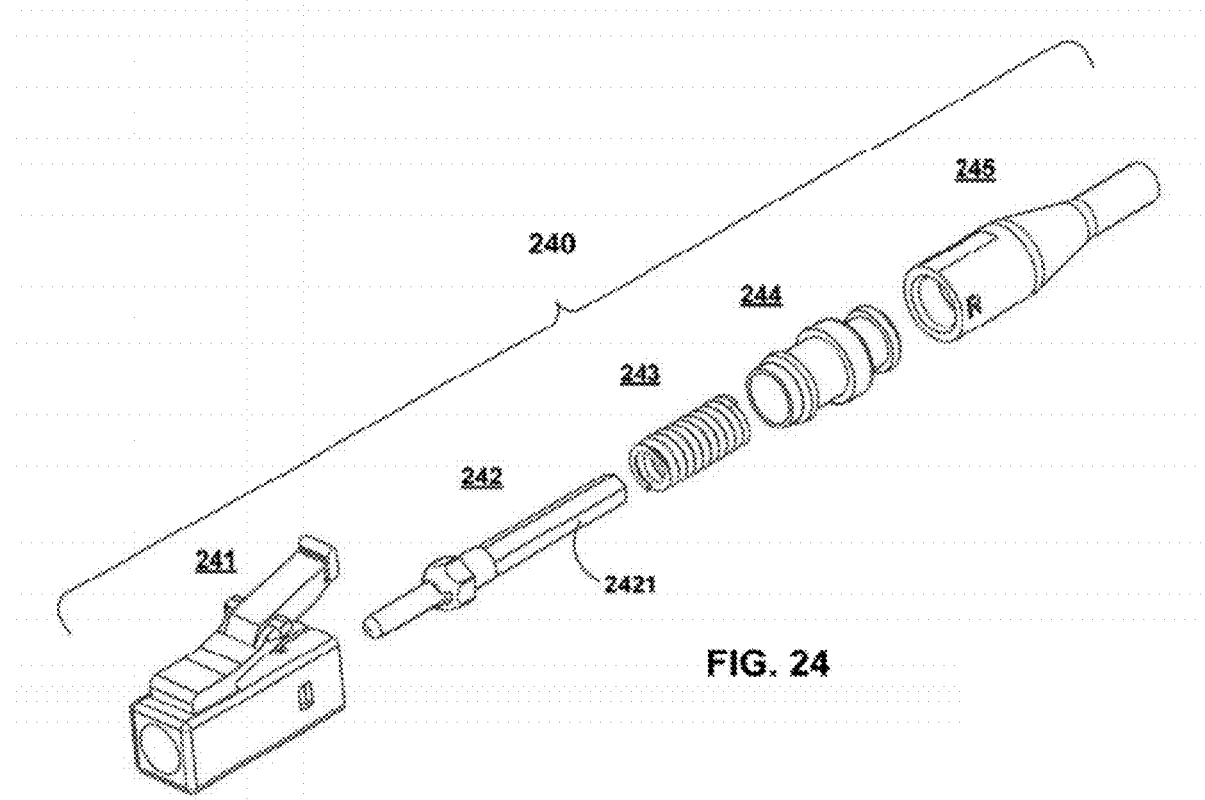
FIG. 24 shows an exploded view of a BTW LC connector, according to a further aspect of the invention, wherein a flange extending member and an extender are used to provide rotational alignment of a multicore fiber mounted into the connector.

FIG. 24 shows an exploded view of a BTW LC connector 240 according to a further aspect of the invention. From left to the right, the connector 240 comprises the following elements: plug housing 241, extended ferrule subassembly 242, spring 243, rotatable extender 244, and boot 245.

Ferrule subassembly 242 includes at its rear end a flange extension member 2421, which has an opening 2422 (FIG. 25) therethrough that is dimensioned to receive the lead end of a buffered fiber.

In the depicted example, the flange extension member 2421 has a hexagonal outer perimeter, but other polygonal shapes could also be used, e.g., square, rectangle, or the like. The flange extension member 2421 could also have a D-shaped or double D-shaped perimeter. Further, the flange extension member 2421 could be fabricated as a single unit with other components of subassembly 242.

The internal geometry 2441 of rotatable extender 244 comprises a closely toleranced hole, having the same shape as the outer perimeter of the flange extension member 2421, allowing a slip fit between the two components.

Figure 25:
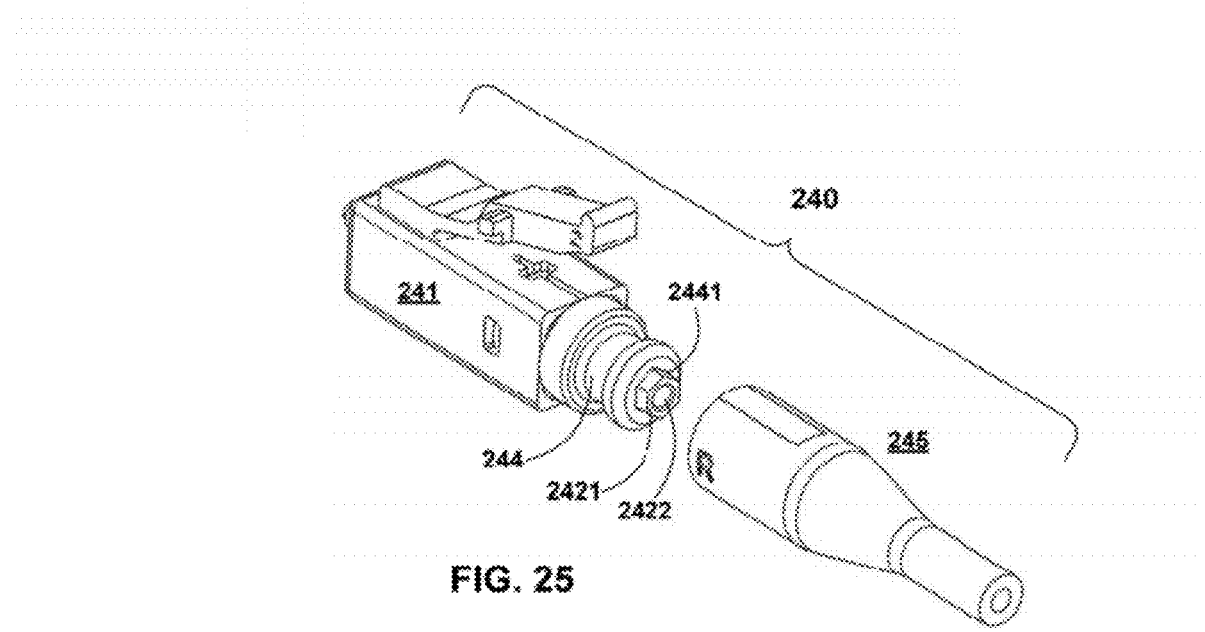
FIG. 25 shows a perspective rear view of the connector shown in FIG. 24, after partial assembly.

FIG. 25 shows a perspective rear view of the partially assembled connector 240, illustrating how the flange extension 2421 fits into the rotatable extender 244. It will be seen that the rotatable extender 244, the flange extension member 2421, and the ferrule subassembly 242 rotate as a unit relative to the plug housing 241.

Once the fiber is terminated and polished, the rotatable extender 244 can be rotated relative to the plug housing 241, which causes the flange extension member 2421 to rotate around the ferrule axis, allowing the cores of the multicore fiber to be aligned in the desired rotational orientation. Once the fiber cores are in the desired position relative to the latch arm on the connector housing 241, the extender 244 can be held in position with epoxy.

Figure 26:
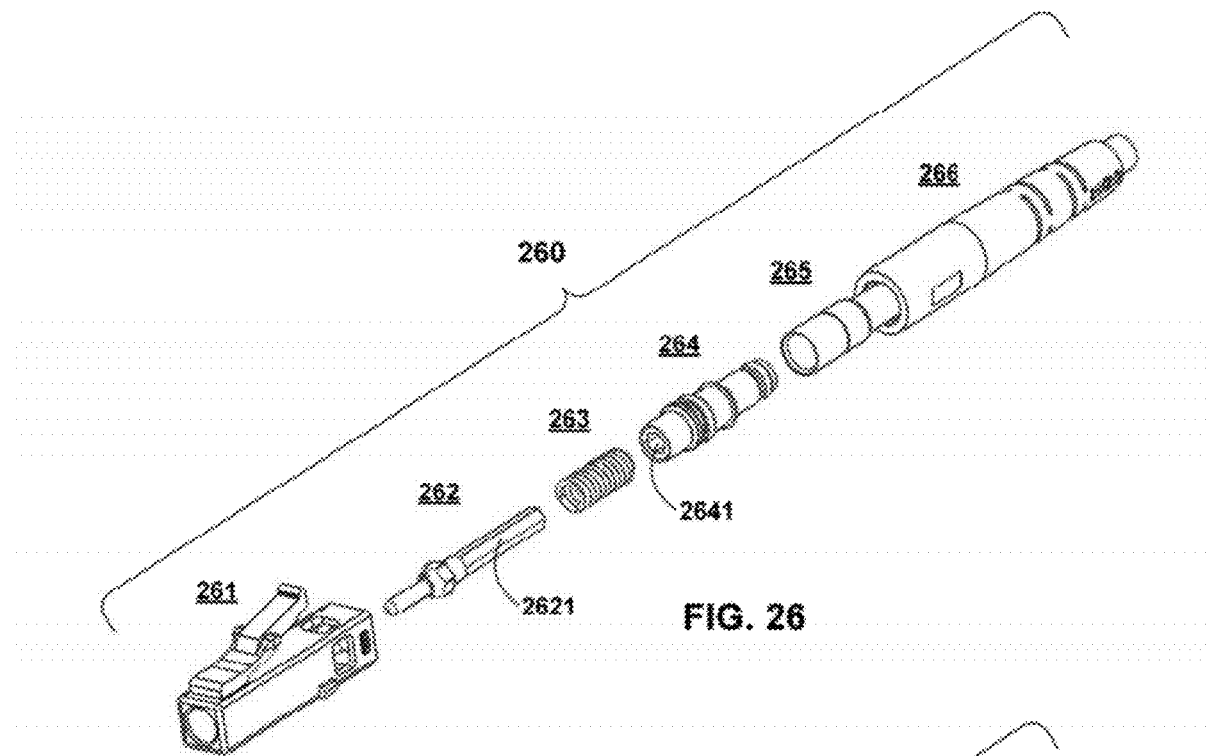
FIG. 26 shows an exploded view of a jumper LC connector, according to a further aspect of the invention, wherein a flange extending member and an extender are used to provide rotational alignment of a multicore fiber mounted into the connector.

FIG. 26 shows an exploded view of a jumper LC connector 260 incorporating the above-described flange extension and rotatable extender. Connector 260 comprises: plug housing 261; ferrule subassembly 262 with extension member 2621; spring 263; cable-retention rotatable extender 264 with opening 2641; crimp/sleeve subassembly 265; and strain-relief boot 266.

Figure 27:
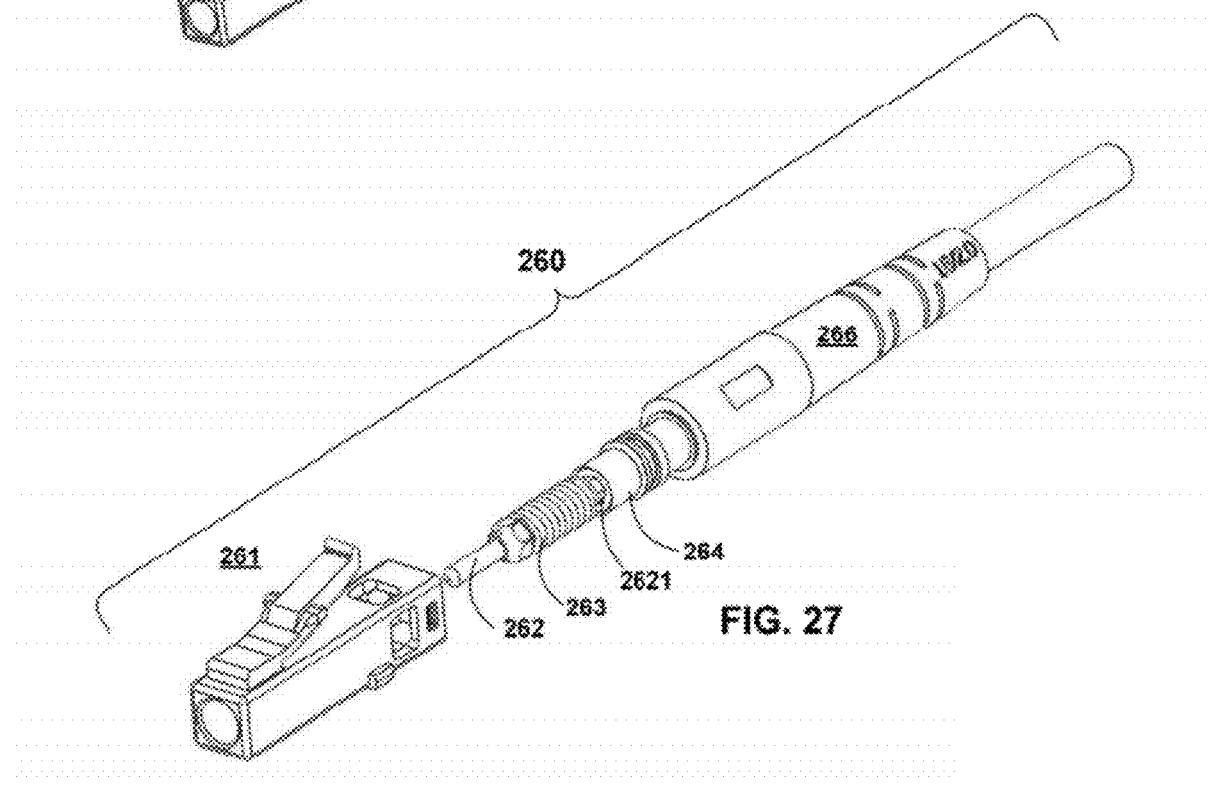
FIG. 27 shows an exploded view of the connector shown in FIG. 26, after partial assembly.

FIG. 27 shows an exploded view of jumper LC connector 260, after partial assembly, in which the extension member 2621 engages the hexagonal internal opening 2641 of the rotatable extender 264.

When the cable-retention rotatable extender 264 is rotated relative to the plug housing 261, the ferrule subassembly 262 and extension member 2621 will also rotate. Therefore, the orientation technique basically the same as that employed for the BTW connector 240 (FIG. 24) discussed above.

Figure 28:
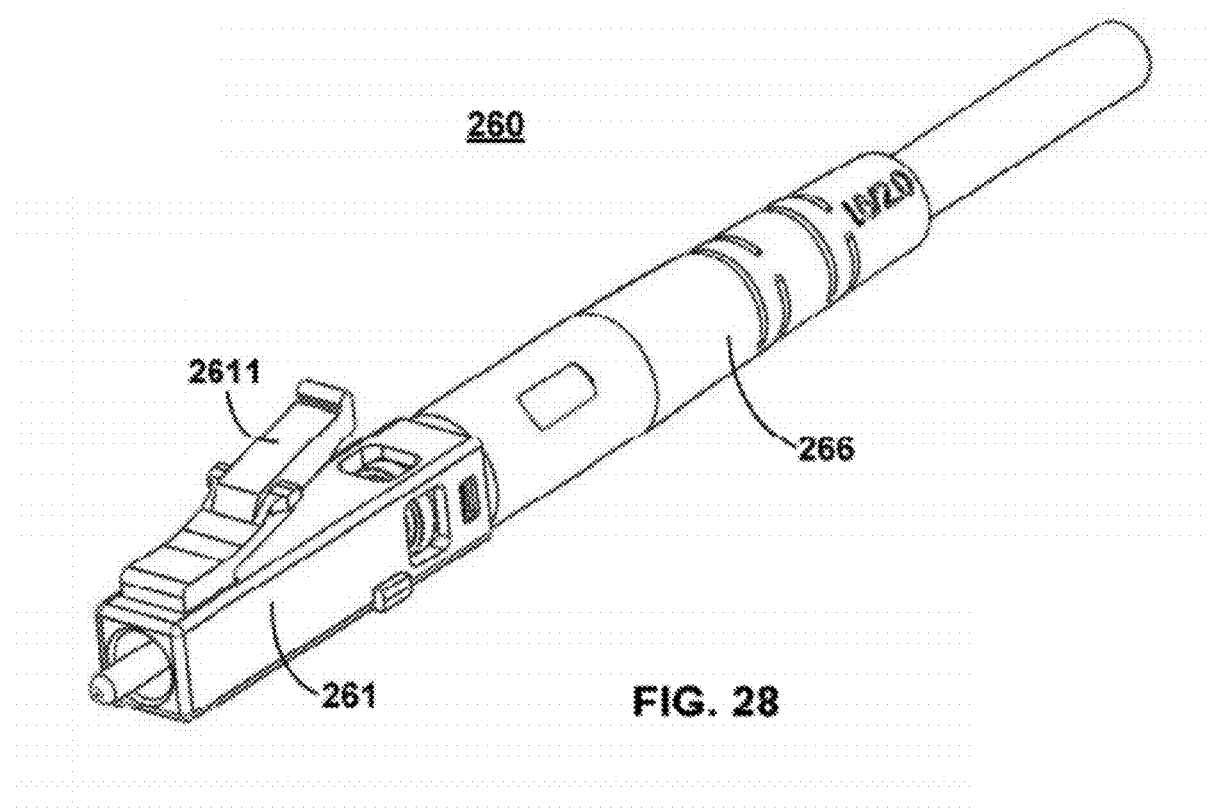
FIG. 28 shows a perspective view of the connector shown in FIG. 26, after full assembly.

FIG. 28 shows a perspective view of connector 260, after full assembly. With the crimp/sleeve subassembly 265 and strain-relief boot 266 permanently installed, the fiber cores can be oriented relative to the latch arm 2611 on the plug housing 261 by rotating the boot 266 relative to the housing 261. Once the cores are in the desired orientation, the rotatable extender 264 can be fixed relative to the housing 261 using epoxy.

2. MULTICORE SIMPLEX CONNECTORS: SC-TYPE

The above-described structures and techniques are also applicable to SC-type connectors. A brief description of prior-art SC connectors is provided for context, followed by a discussion of a number of designs according to various aspects of the invention.

2.1. Prior-Art SC Connectors

Figure 29:
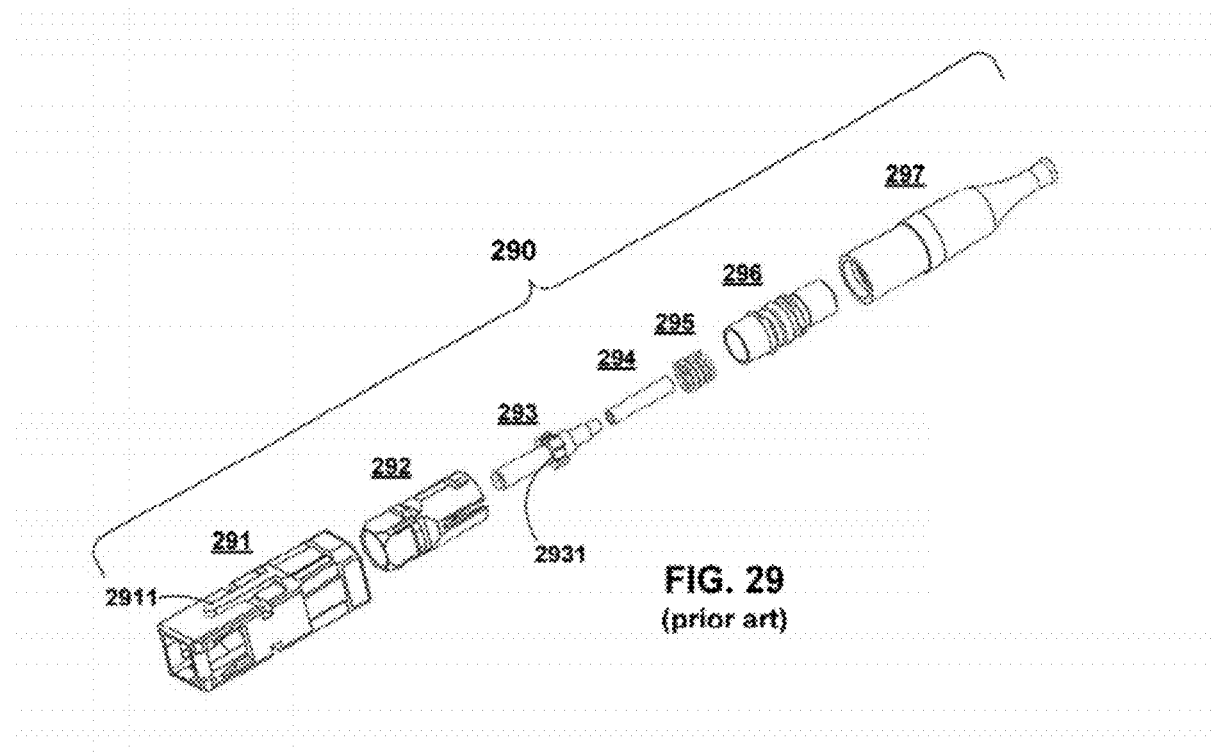
FIG. 29 shows an exploded view of a standard BTW SC connector according to the prior art.

FIG. 29 shows an exploded view of a standard BTW SC connector 290 according to the prior art. Connector 290 comprises the following elements, listed from left to right: grip 291; plug housing 292; ferrule subassembly 293; tubing 294; spring 295; cable retention member 296; and buffer boot 297.

Ferrule subassembly 293, comprises a ferrule and a receptacle having a flange with at least one keyway 2931. Ferrule subassembly 293 sits within plug housing 292 which has matching internal keys 3121 (FIG. 34), to inhibit rotation of the ferrule subassembly 293 relative to the plug housing 292. Some SC ferrule flange designs utilize up to four keyways, allowing the ferrule subassembly 293 to be installed in one of four positions (i.e. 90-degree positional tuning), relative to the plug housing 292, to improve core-to-core alignment.

Figure 30:
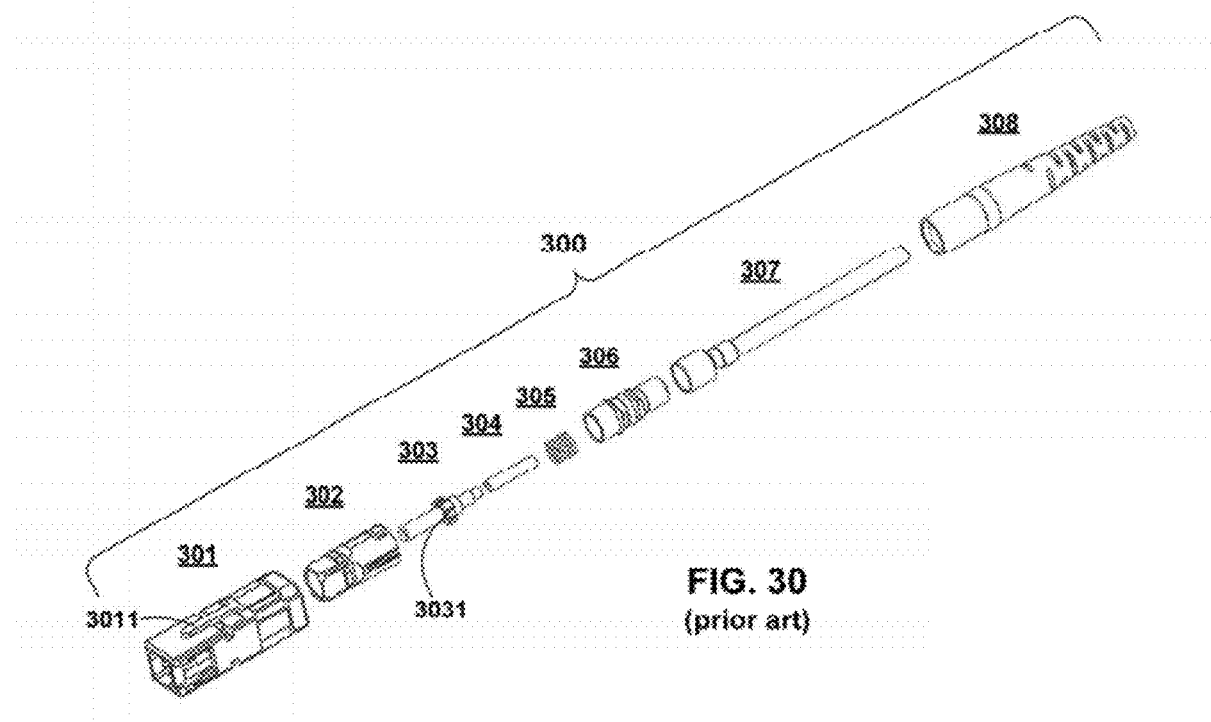
FIG. 30 shows an exploded view of a standard jumper SC connector according to the prior art.

FIG. 30 shows an exploded view of a standard jumper SC connector 300 according to the prior art. Connector 300 comprises the following elements, listed from left to right: grip 301 (including key(s) 3011); plug housing 302; ferrule subassembly 303; tubing 304; spring 305; cable retention member 306; crimp/sleeve subassembly 307; and strain-relief boot 308.

2.2. SC Connectors with Rotatable Flange Collar 2.2.1. Collar with Keyways or Keys FIG. 31 shows an exploded view of a BTW SC connector 3100 according to a further aspect of the invention. Connector 3100 comprises the following elements, from left to right: grip 3101 with key(s) 3120; plug housing 3102; rotatable collar 3103; ferrule subassembly 3104; tubing 3105; spring 3106; cable retention member 3107; buffer boot 3108.

In the embodiment shown, the rotatable collar 3103 features two keyway cutouts 3121. Alternative versions, with only one keyway or several keyways, are also feasible.

FIG. 32 shows a close-up of collar 3103, ferrule subassembly 3104, and tubing 3105, installed onto a buffered fiber 3200. Once the fiber 3200 is terminated and polished, the ferrule subassembly 3104 can be rotated relative to the collar 3103, to allow the cores of the multicore fiber 3200 to be aligned in the desired orientation.

Figure 33:
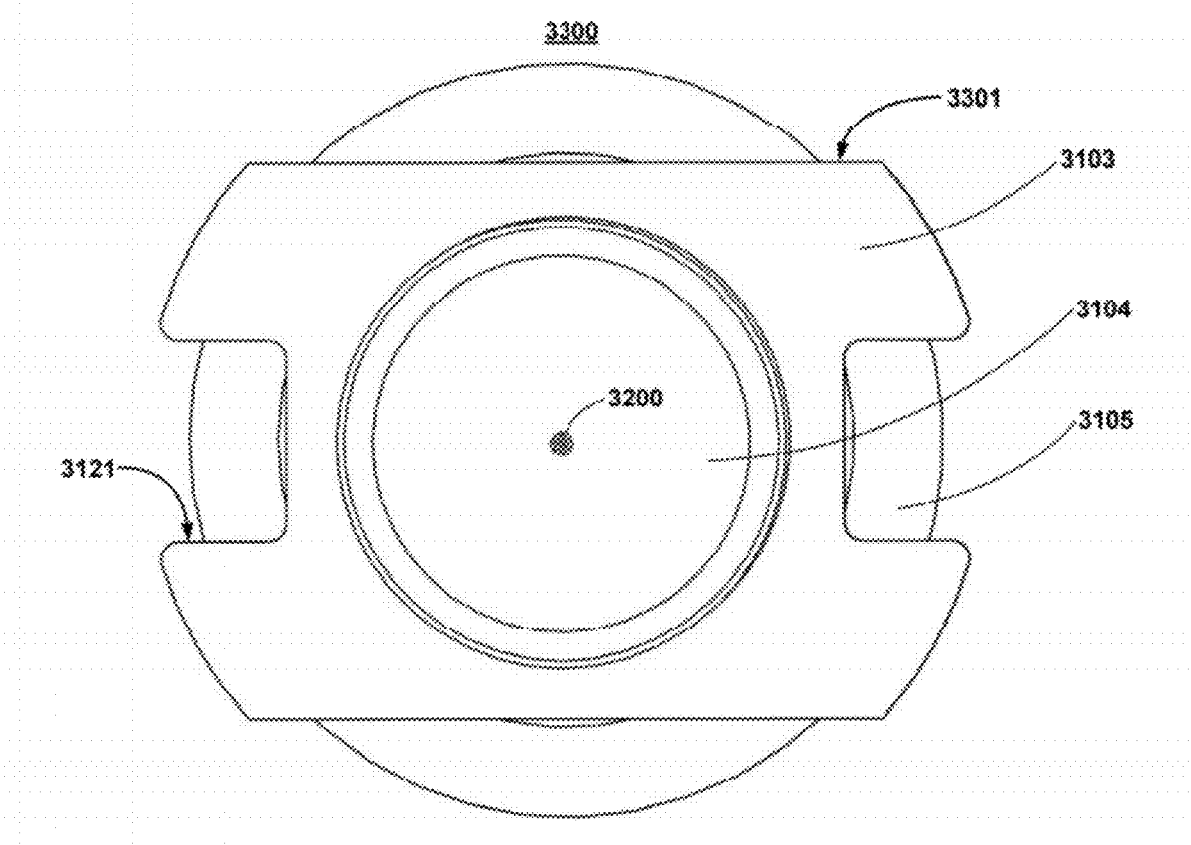
FIG. 33 shows an end view of the ferrule subassembly shown in FIG. 32.

FIG. 33 shows an end view of a unit 330 comprising the assembled collar 3103, ferrule subassembly 3104, tubing 3105, and fiber 3200. Collar 3103 is positioned so that a particular core of multicore fiber 3200 is directly adjacent to one of the collar flats 3301. In one likely scenario, the rotatable collar 313 is held fixed in a fixture while the ferrule flange barrel is rotated within the collar 313. Once the collar 313 is in the desired position relative to the ferrule flange barrel, it can be held in position with epoxy. Alternatively, the collar 313 could be designed to provide a light press fit onto the ferrule, which would inhibit rotation after orientation.

Figure 34:
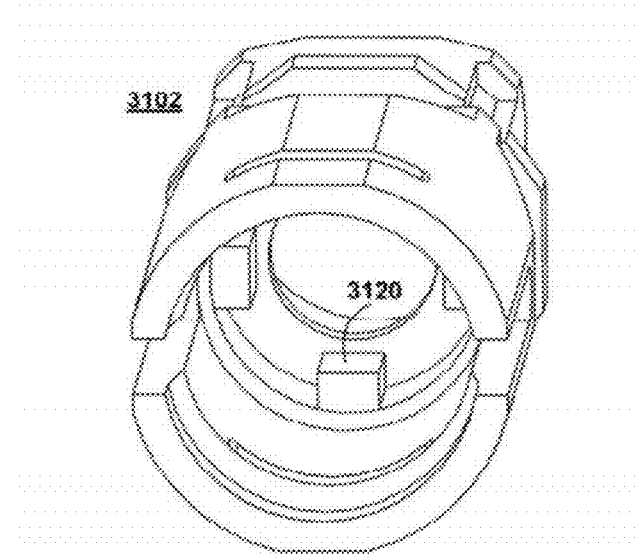
FIG. 34 shows a rear view of the plug frame from the FIG. 31 connector.

FIG. 34 shows a rear view of the plug housing 312. Once the flange collar 313 is oriented, the flange assembly can be installed into the plug housing 312, which features keys 3120, which mate with the keyways of the rotatable flange collar. The internal keys hold the flange assembly in the desired orientation, relative to the plug housing. After the connector is completely installed onto the fiber cable, the SC grip, which has a key 3111 on top, is installed to complete keying of the connector.

Figure 35:
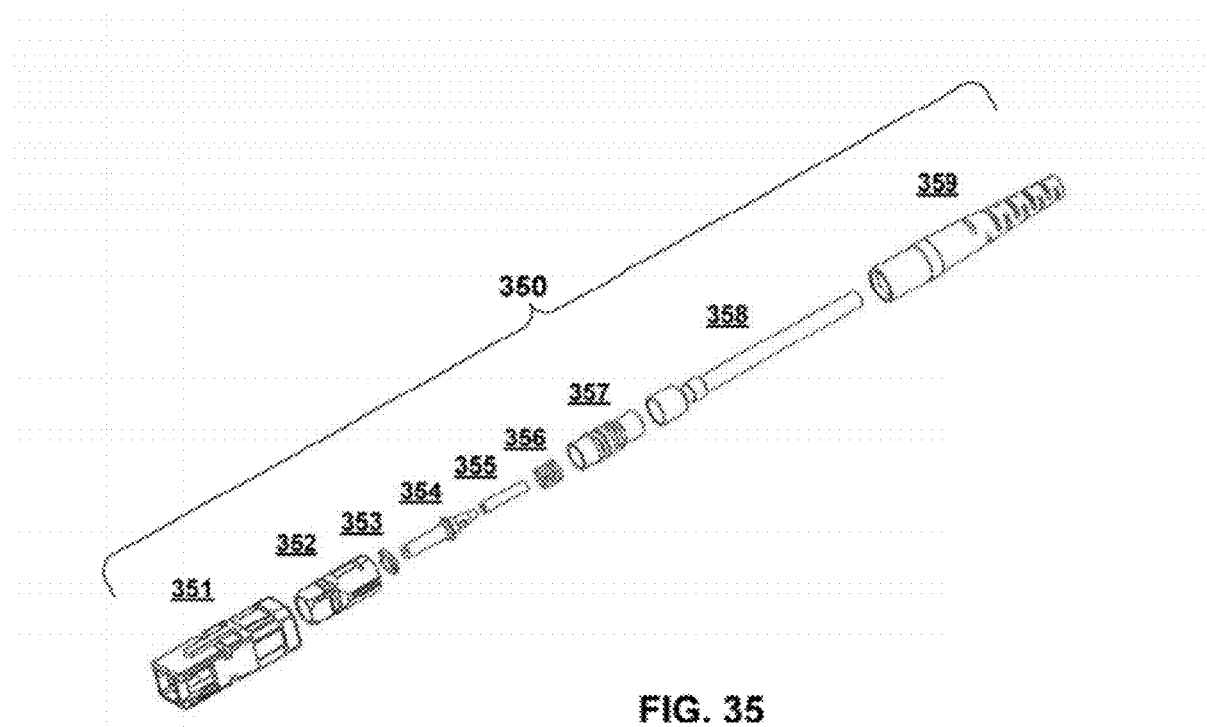
FIG. 35 shows an exploded view of a jumper SC connector, according to a further aspect of the invention, incorporating a rotatable collar of the type used in the FIG. 31 connector.

FIG. 35 shows an exploded view of a jumper SC connector 350 incorporating the above-described rotatable collar. Connector 350 comprises the following elements, from left to right: grip 351 with key(s); plug housing 352; rotatable collar 353; ferrule subassembly 354; tubing 355; spring 356; cable retention member 357; crimp/sleeve subassembly 358; and buffer boot 359.

The orientation technique is the same as that employed for the BTW connector; however, SC jumper components are used.

2.2.2. Other Collar Geometries

Alternative collar geometries are also feasible. The flange collar with keyways is just one of many possible configurations. In alternate embodiments, the flange collar could feature keys and matching keyways could be placed in the plug housing. Also, it is feasible to use flange collars having other polygonal shapes, e.g., square, rectangular, triangular, and the like. The collar could also be D-shaped or double-D shaped. Here again, the internal geometry of the plug housing would be changed to match the collar geometry.

Figures 36A, 36B:
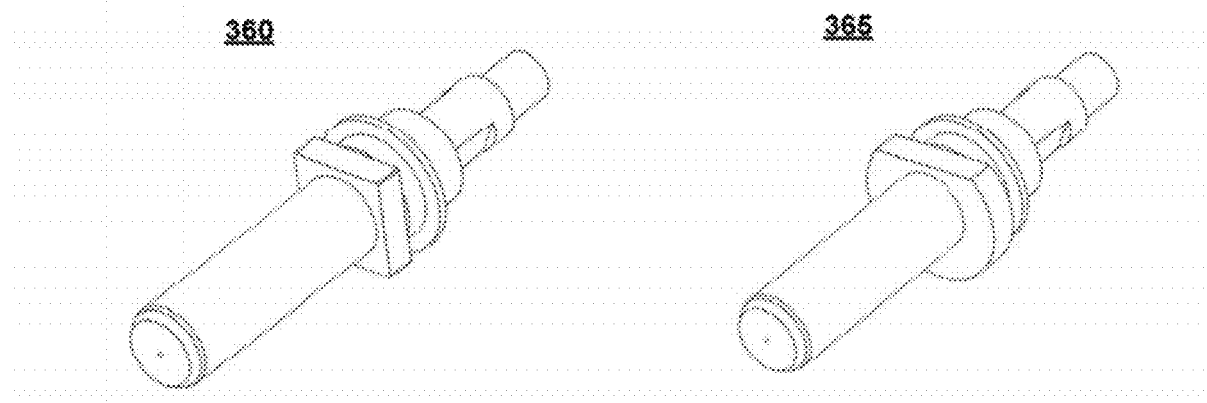
FIGS. 36A-36B show perspective views of other possible geometries for a rotatable collar suitable for use in conjunction with connectors of the type shown in FIGS. 31 and 35.

FIGS. 36A and 36B show perspective views of other possible collar geometries 360, 365.

Figure 37:
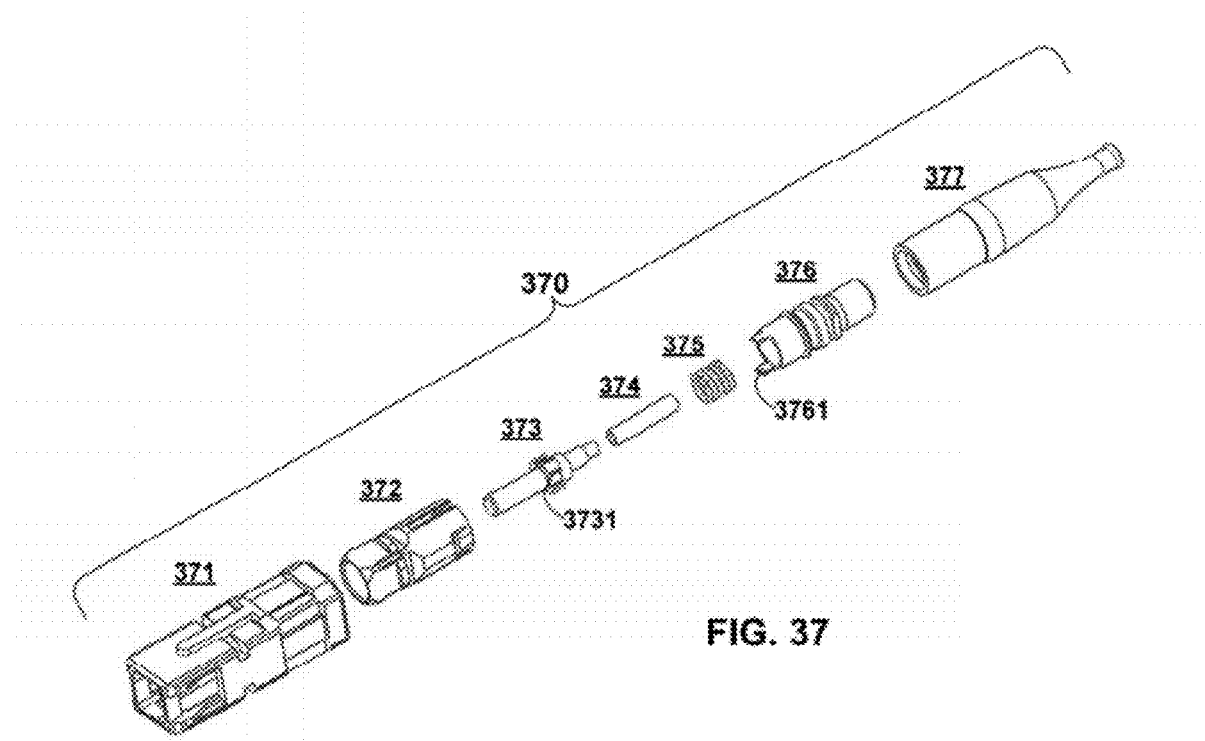
FIG. 37 contains an exploded view of a BTW SC connector according to a further aspect of the invention, incorporating a rotatable cable retention member that snaps into the back of the plug frame.

2.3. SC Connector with Rotatable Cable Retention Member 2.3.1. Rotatable Retention Member with Keys FIG. 37 contains an exploded view of a BTW SC connector 370 that features a rotatable cable retention member that snaps into the back of the plug housing. Connector 370 comprises the following elements, from left to right: grip 371 with key(s); plug housing 372; ferrule subassembly 373; tubing 374; spring 375; retention member 376; and buffer boot 377.

The ferrule subassembly 373, tubing, and spring 375 are captured within the plug housing 372 by the retention member 376.

Figure 38:
FIG. 38 shows a perspective view of the assembled ferrule subassembly and rotatable retention member from the connector shown in FIG. 37.

FIG. 38 shows a perspective view of a unit 380 comprising the following assembled components: ferrule subassembly 373, tubing 374, spring 375, and rotatable retention member 376. The retention member 376 has two keys 3761 extending from its forward end, which engage keyways 3731 on the ferrule flange 373. However, other embodiments, in which the retention member features only one key or several keys, are also feasible.

Figure 39:
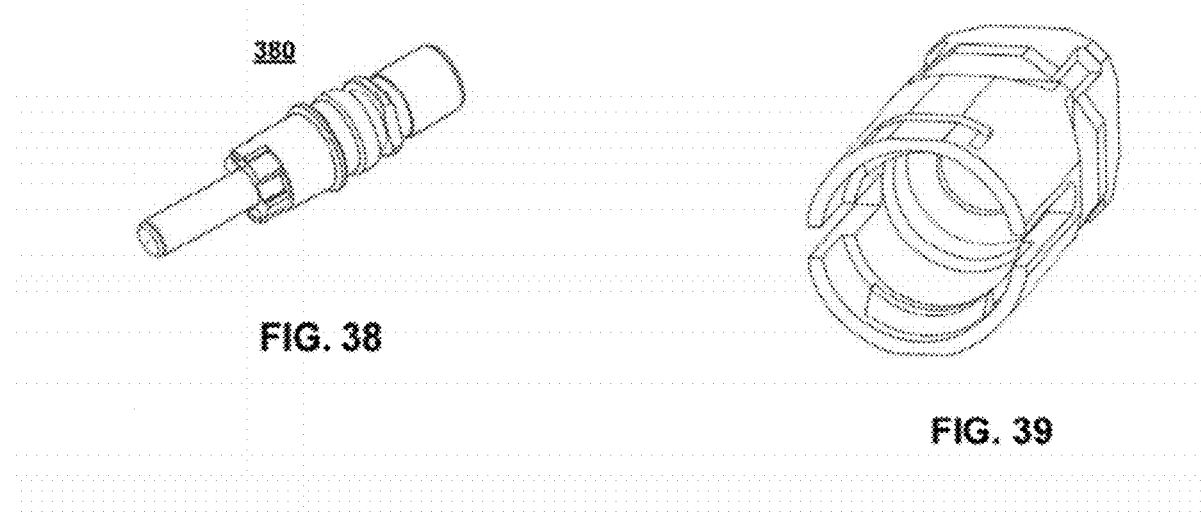
FIG. 39 shows a rear perspective view of a plug frame, according to a further aspect of the invention.

The plug housing 390 shown in FIG. 39, does not feature internal keys. Therefore, when the retention member is rotated relative to the plug housing, the ferrule subassembly 373 is free to rotate as well.

Figure 40:
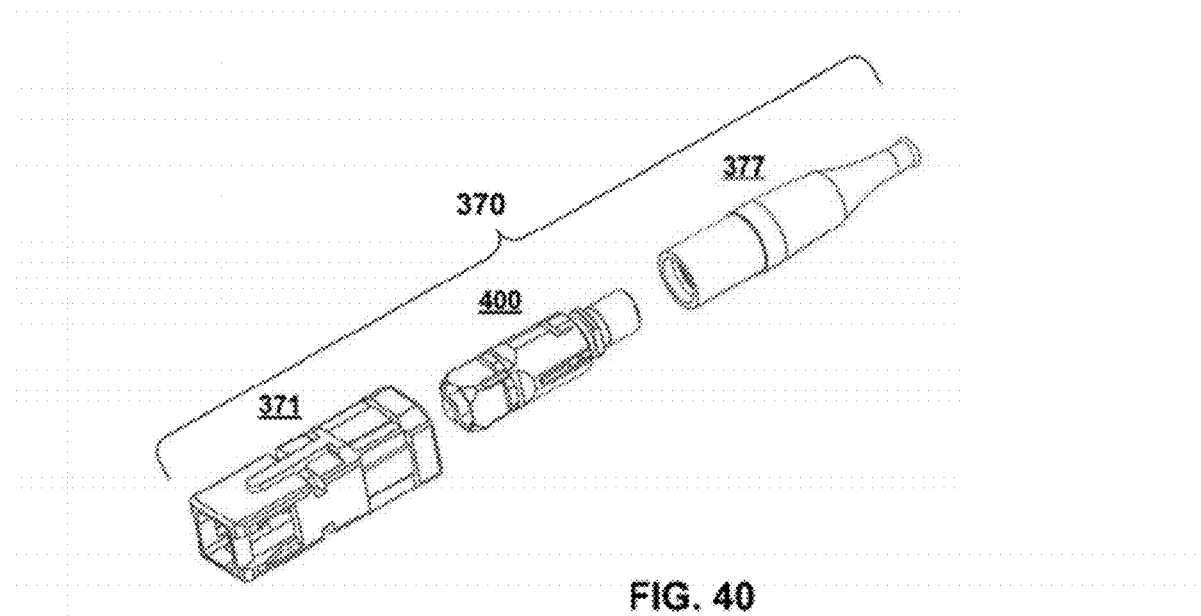
FIG. 40 shows an exploded view of the connector shown in FIG. 37, after assembly of the plug frame and the rotatable cable retention member.

FIG. 40 shows the partially assembled connector 370, including unit 400 formed by snapping unit 380 (FIG. 38) into place within plug housing 372. Once the fully assembled connector is installed onto a multicore fiber, the fiber cores can be oriented relative to the plug housing, by simply rotating the retention member relative to the plug housing 372. Once the fiber cores are in the desired position relative to the connector housing, the rotatable retention member can be held in position with epoxy, placed in the slots at the rear of the plug housing.

Figure 41:
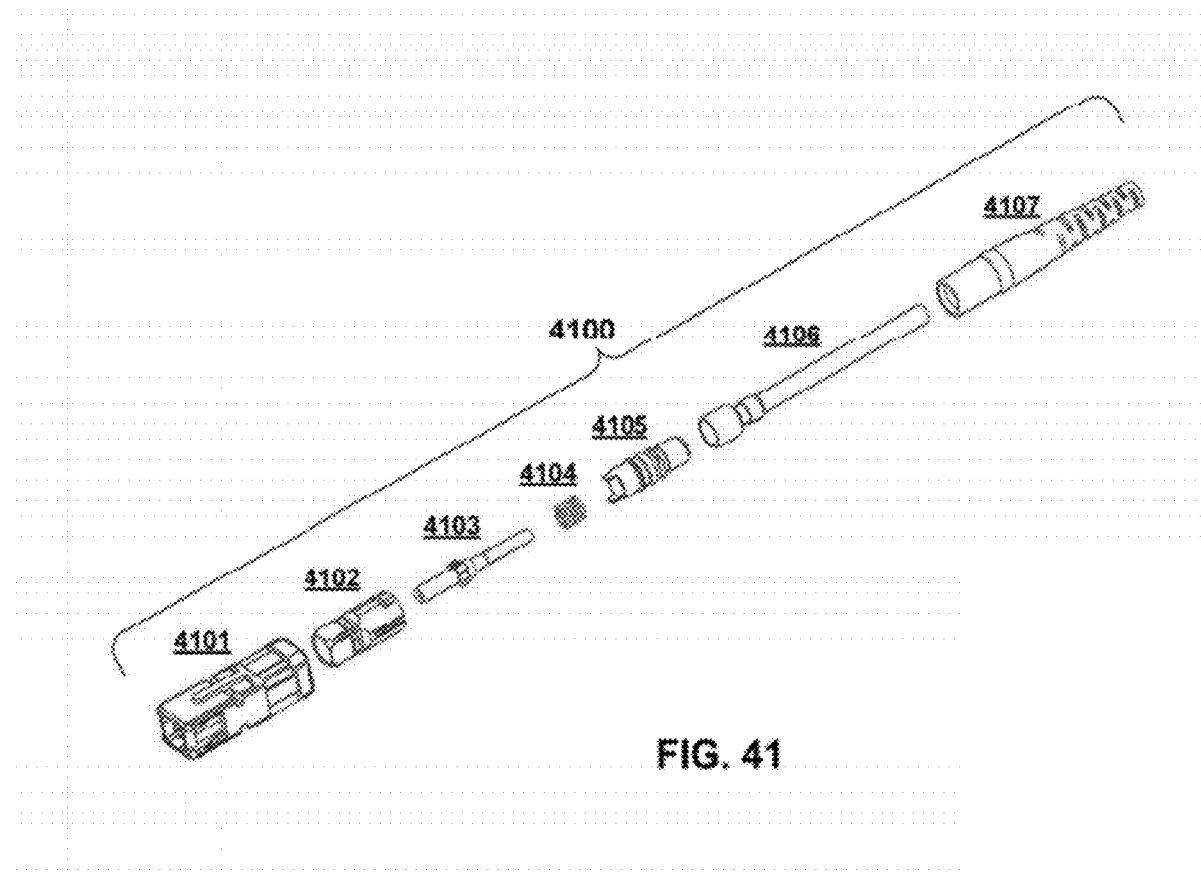
FIG. 41 shows an exploded view of a connector according to a further aspect of the invention, comprising a jumper version of the connector shown in FIG. 37.

FIG. 41 shows an exploded view of a connector 4100 comprising a jumper version of the rotatable retention member concept. Connector 4100 comprises the following components, left to right: grip 4101; plug housing 4102; ferrule subassembly 4103; spring 4104; rotatable cable retention member 4105; crimp/sleeve subassembly 4106; and strain-relief boot 4107.

Figure 42:
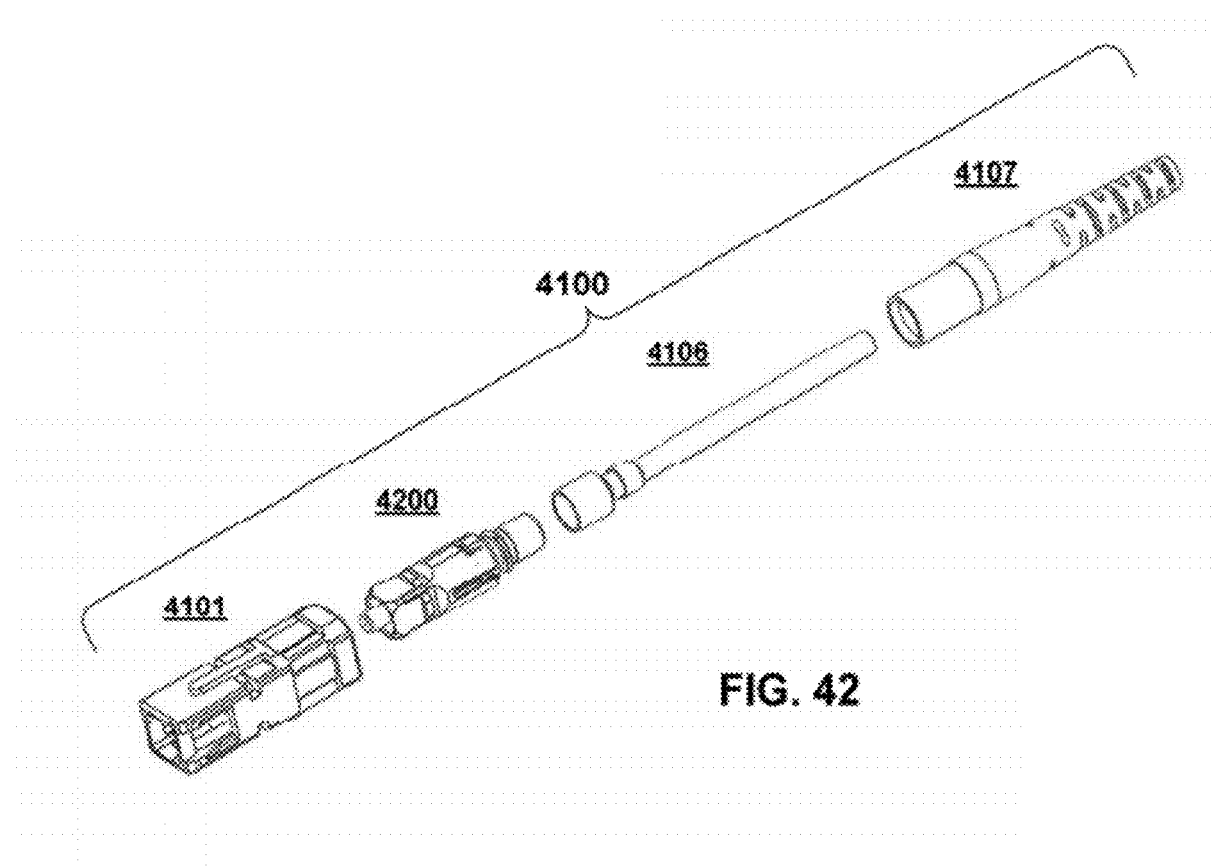
FIG. 42 shows an exploded view of the FIG. 41 connector, after assembly of the plug frame, ferrule subassembly, and rotatable retention member.

FIG. 42 shows the partially assembled connector 4100, including unit 4200 comprising ferrule subassembly 4103, spring 4104, and rotatable cable retention member 4105 snapped into place within housing 4102. The orientation method is the same as that employed for the BTW connector; however, SC jumper components are used.

3. General Techniques

Figure 43:
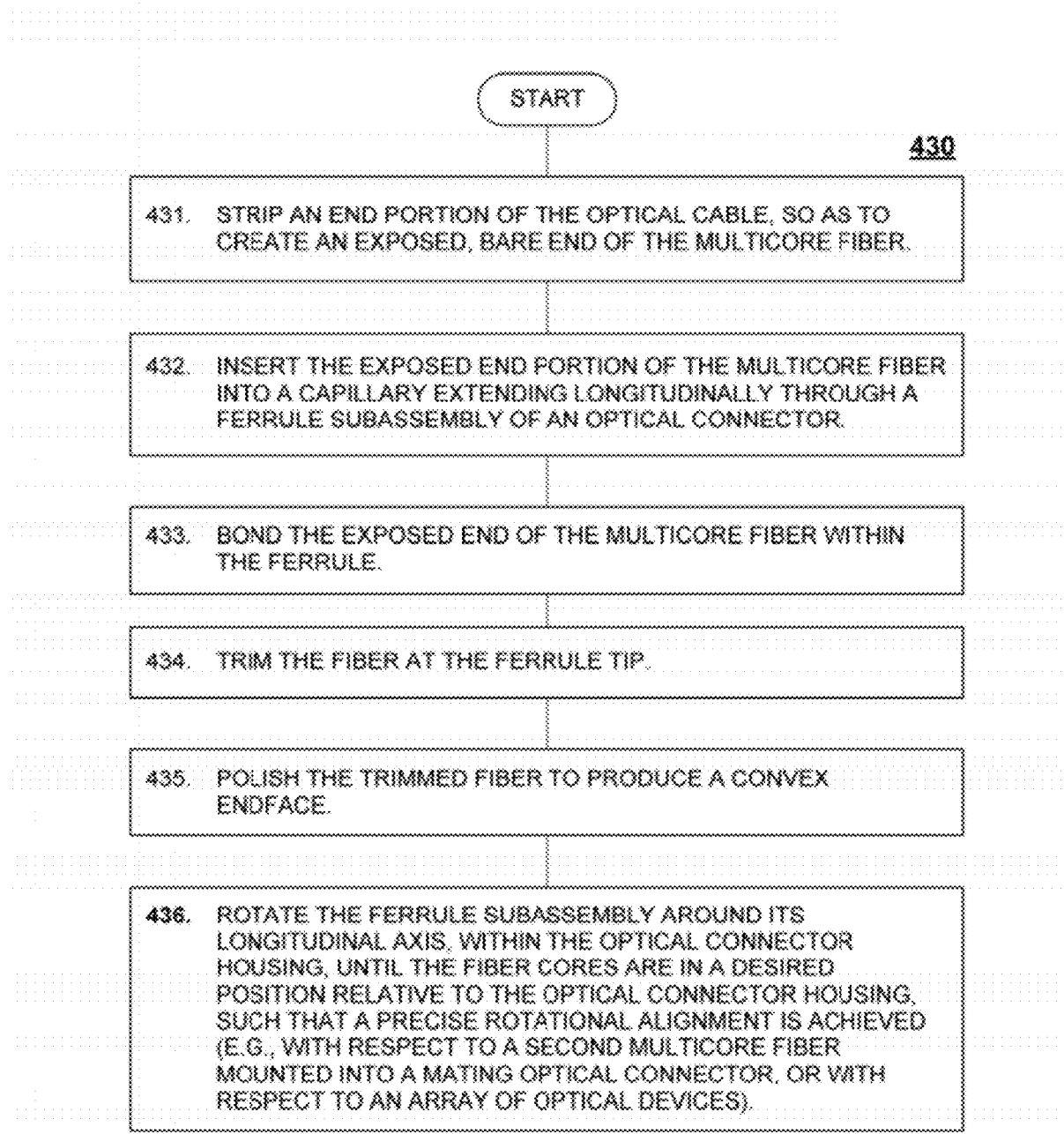
FIGS. 43 and 44 show flowcharts of general techniques according to aspects of the invention.
Figure 44:
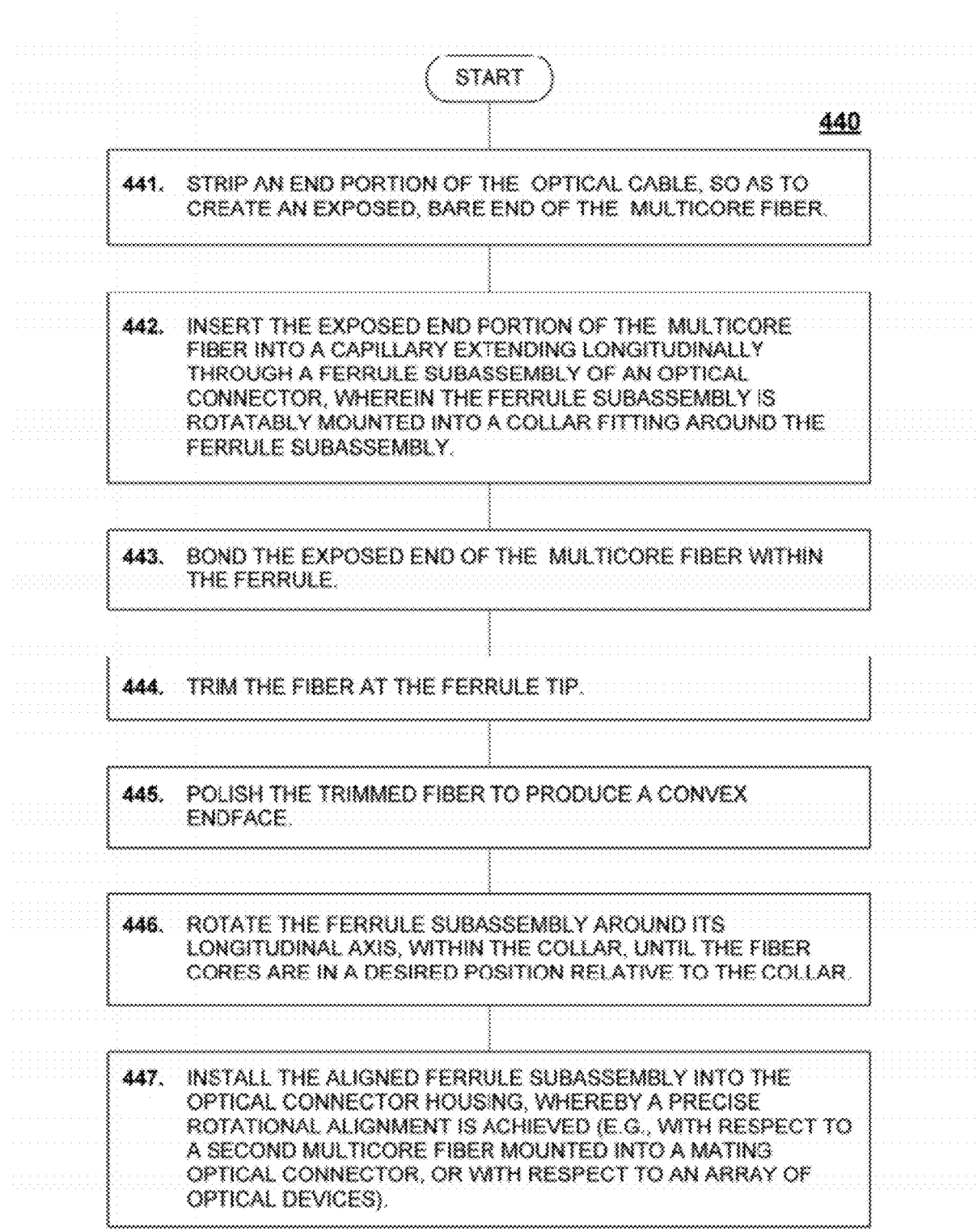

FIGS. 43 and 44 show flowcharts of general techniques 430, 440, according to aspects of the invention. It should be noted that FIGS. 43 and 44 are intended to be exemplary, rather than limiting. The present invention may be practiced in a number of different ways, using different combinations of some or all of the elements set forth in these drawings, as well as combinations including elements not explicitly set forth in these drawings.

FIG. 43 shows a flowchart of a technique 430 for providing aligned connectorization for an optical cable containing a multicore fiber.

Technique 430 comprises the following steps:

431: Strip an end portion of the optical cable, so as to create an exposed, bare end of the multicore fiber.

432: Insert the exposed end portion of the multicore fiber into a capillary extending longitudinally through a ferrule subassembly of an optical connector.

433: Bond the exposed end of the multicore fiber within the ferrule.

434: Trim the fiber at the ferrule tip.

435: Polish the trimmed fiber to produce a convex endface.

436: Rotate the ferrule subassembly around its longitudinal axis, within the optical connector housing, until the fiber cores are in a desired position relative to the optical connector housing, such that a precise rotational alignment is achieved.

In step 436, the precise rotational alignment may be achieved, for example, with respect to a second multicore fiber mounted into a mating optical connector, or with respect to an array of optical devices.

FIG. 44 shows a flowchart of a technique 440 providing aligned connectorization for an optical cable containing a multicore fiber.

Technique 440 comprises the following steps:

441: Strip an end portion of the optical cable, so as to create an exposed, bare end of the multicore fiber.

442: Insert the exposed end portion of the multicore fiber into a capillary extending longitudinally through a ferrule subassembly of an optical connector, wherein the ferrule subassembly is rotatably mounted into a collar fitting around the ferrule subassembly.

443: Bond the exposed end of the multicore fiber within the ferrule.

444: Trim the fiber at the ferrule tip.

445: Polish the trimmed fiber to produce a convex endface.

446: Rotate the ferrule subassembly around its longitudinal axis, within the collar, until the fiber cores are in a desired position relative to the collar.

447: Install the aligned ferrule subassembly into the optical connector housing, whereby a precise rotational alignment is achieved.

In step 447, the precise rotational alignment may be achieved, for example, with respect to a second multicore fiber mounted into a mating optical connector, or with respect to an array of optical devices.

Section B

Section B is directed to connector structures and techniques for use with flat-sided MCFs.

As used herein, the term "flat-sided MCF" generally refers to an MCF having a cross-sectional profile with one or more flat sides. Where all of the sides of the MCF are flat, the MCF has a polygonal profile, i.e., rectangular, hexagonal, or the like. A flat-sided MCF may also have a profile with one or more flat sides and one or more curved sides. Such profiles include, for example, D-shaped profiles, double D-shaped profiles, and the like. The term "round MCF" generally refers to an MCF having a substantially circular outer perimeter.

According to aspects of the invention described below, the one or more flat sides of a flat-sided MCF are used to provide alignment for the array of MCF cores. It is important to note that the structures and techniques described in Section B may be combined with structures and techniques disclosed in Section A. It will be appreciated that although the aspects of the invention discussed in Section A are described with respect to round MCFs, those structures and techniques do not require a particular shape for the MCF cross-sectional profile.

It is noted that exemplary flat-sided MCFs are described in U.S. patent application Ser. No. 13/049,794, of which the present application is a continuation-in-part, and which is incorporated herein by reference in its entirety. It will be appreciated that structures and techniques discussed in Section B may be practiced in combination with, or in addition to, the structures and techniques disclosed therein.

Figure 45A:
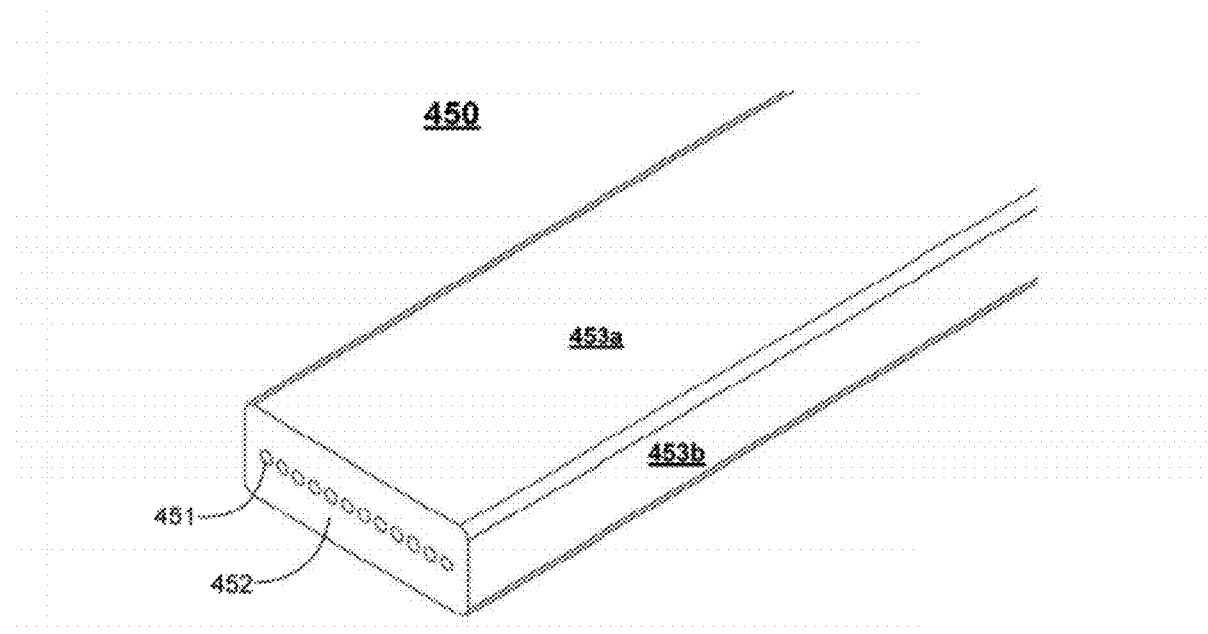
FIGS. 45A and 45B show, respectively, perspective and end views of an exemplary high-core-count, flat-sided multicore fiber for use in accordance with an exemplary practice of the invention.
Figure 45B:
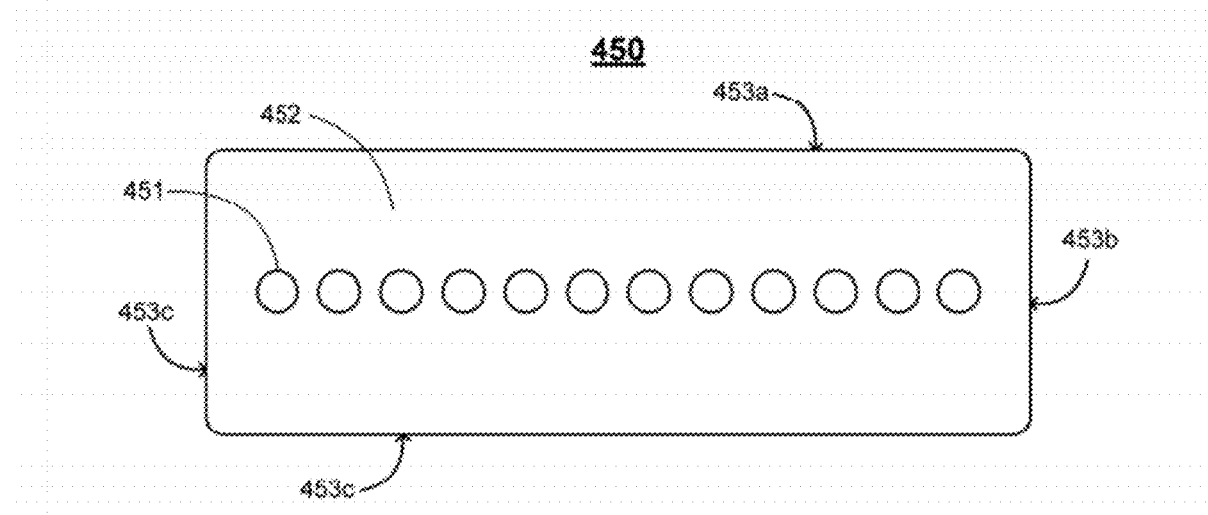

The present description is organized into the following sections:

B1. Exemplary Flat-Sided MCFs
B2. MT-Type Ferrule
B3. SC-Type Connector
B4. Transverse and Longitudinal Offset; Fiber Protrusion
B5. Alignment Housing
B6. General Techniques B1. Exemplary Flat-Sided MCFs FIGS. 45A and 45B show, respectively, perspective and end views of an exemplary high-core-count, flat-sided MCF 450 for use in accordance with an exemplary practice of the invention. MCF 450 comprises twelve individual cores 451 surrounded by a common cladding 452. Cores 451 are arranged in a one-dimensional (i.e., linear) 1×12 array.

MCF 450 has a rectangular outer profile comprising two "long" sides 453a/c, and two "short" sides 453b/d. It is noted that MCF 450 has substantially the same appearance in both "upside right" and "upside down" orientations. Accordingly, one or more markings may be added to MCF 450 to allow a user to readily distinguish between the two orientations.

As discussed above, proper alignment of an MCF is an essential component in providing a low-loss connection between the MCF and a second MCF, or other optical component. Thus, MCF 450 is configured such that there is a precise relationship between the array of MCF cores 451 and at least one of the MCF flat sides 453a-d, such that one or more of the flat sides provides a precise indication of the position and rotational orientation of MCF cores 451, and such that the position and rotational orientation of the array of the MCF cores 451 is achievable by aligning one or more of the MCF's flat sides 453a-d with a corresponding surface, or surfaces, presented by a ferrule or other connector structure.

Figure 46:
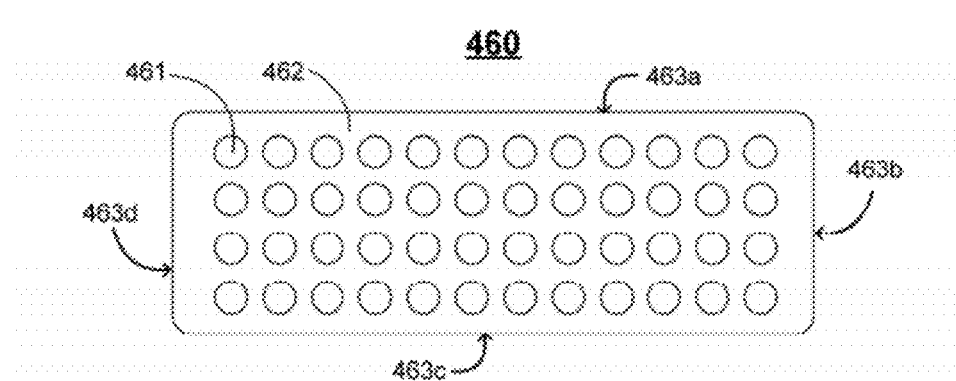
FIGS. 46 and 47 show end views of multicore fibers according to a further aspect of the invention.

FIG. 46 shows an end view of an MCF 460 according to a further aspect of the invention. MCF 460 comprises 48 individual cores 461 surrounded by a common cladding 462. Cores 462 are arranged in a regular 4×12 two-dimensional array. MCF 460 has a rectangular outer profile comprising two long sides 463a/c, and two short sides 463b/d, which are aligned with MCF cores 461, and which precisely indicate the position and rotational orientation of the MCF cores 461.

Figure 47:
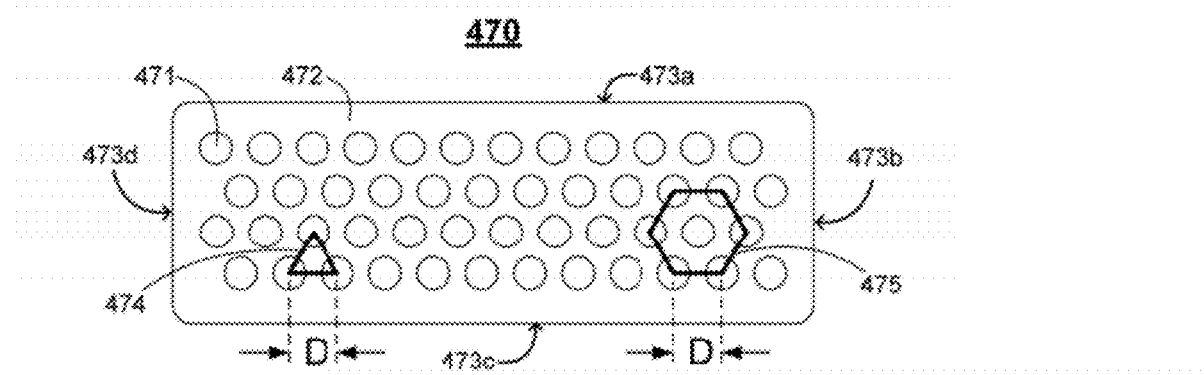

FIG. 47 shows an end view of an MCF 470 according to a further aspect of the invention. MCF 470 comprises 48 individual cores 471 surrounded by a common cladding 472. Cores 472 are arranged in a staggered 4×12 two-dimensional array. MCF 470 has a rectangular outer profile comprising two long sides 473a/c, and two short sides 473b/d, which are aligned with MCF cores 471, and which precisely indicate the position and rotational orientation of the MCF cores 471. The staggering of the array is configured such that the core-to-core distance D between neighboring cores 471 is substantially equal. The resulting core configuration approximates a series of equilateral triangles 474 or regular hexagons 475.

Other core patterns and counts are feasible. For instance, it would be possible to fabricate a single fiber body, having one or more flat sides, with 72 cores (e.g., configured as a 6×12 array, either staggered or not staggered). Also, the cores of the fibers can be single-mode, multimode, or some combination thereof.

Figure 48:
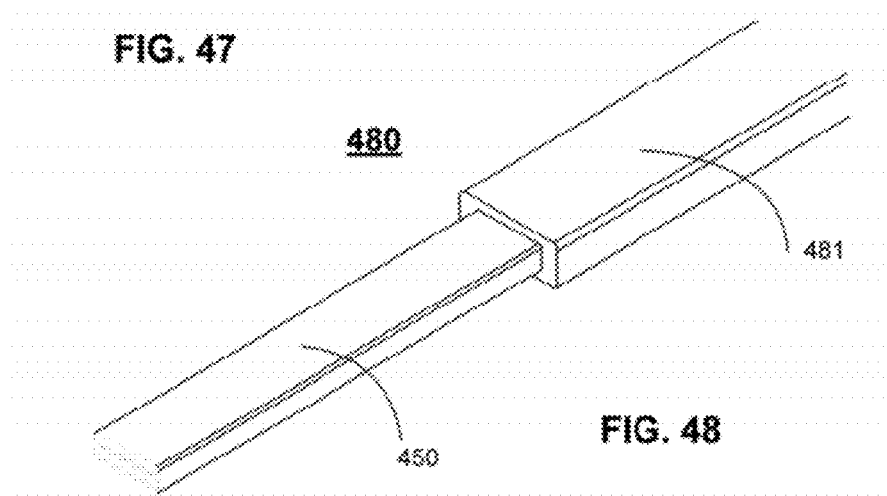
FIG. 48 shows a perspective view of a flat-sided multicore fiber packaged into a cable, an end of which has been stripped in preparation for connectorization.

FIG. 48 shows a perspective view of a fiber cable 480 comprising a length of MCF 450 surrounded by a protective enclosure 481. In the present example, enclosure 481 comprises a plurality of inner layers and an outer jacket; other types of protective enclosures may also be used. Cable 480 is prepared for connectorization by stripping away outer enclosure 481, including the underlying protective layers, to expose the bare fiber 450.

According to an aspect of the invention, a flat-sided MCF is used in conjunction with a ferrule, or like structure, that has been configured to take advantage of the flat-sided MCF geometry in order to provide precise alignment of the MCF cores with the cores of a second MCF or like optical element.

Each connector structure is discussed in turn.

B2. MT-Type Ferrule

Mechanical transfer (MT) ferrules and alignment techniques are described in U.S. patent application Ser. No. 13/049,794, of which the present application is a continuation-in-part, and which is incorporated by reference herein in its entirety. Also, as mentioned above, structures and techniques discussed in Section B may be combined with structures and techniques disclosed Section A, above.

Figure 49A:
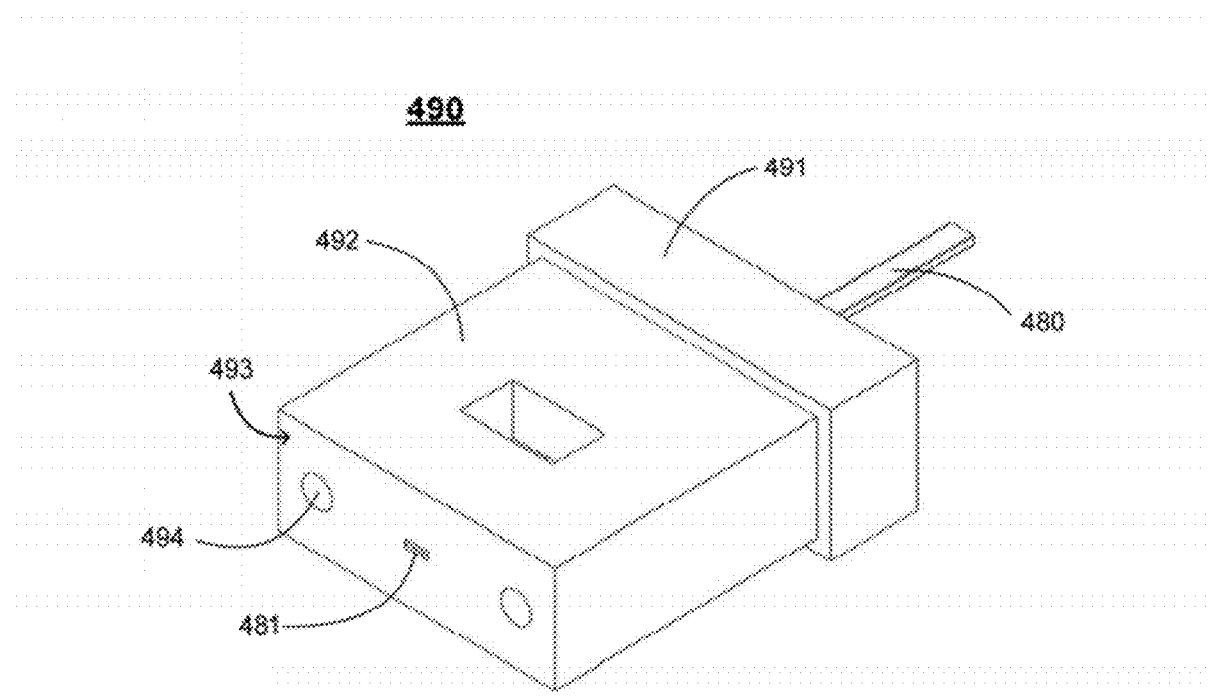
FIGS. 49A and 49B show, respectively, perspective and end views of a single-fiber mechanical transfer (MT) ferrule according to an aspect of the invention.

FIG. 49A shows a perspective view of a single-fiber mechanical transfer (MT) ferrule 490 according to an aspect of the invention. Ferrule 490 comprises a molded plastic body including two block-shaped sections: base 491, head 492, and endface 493.

Figure 49B:
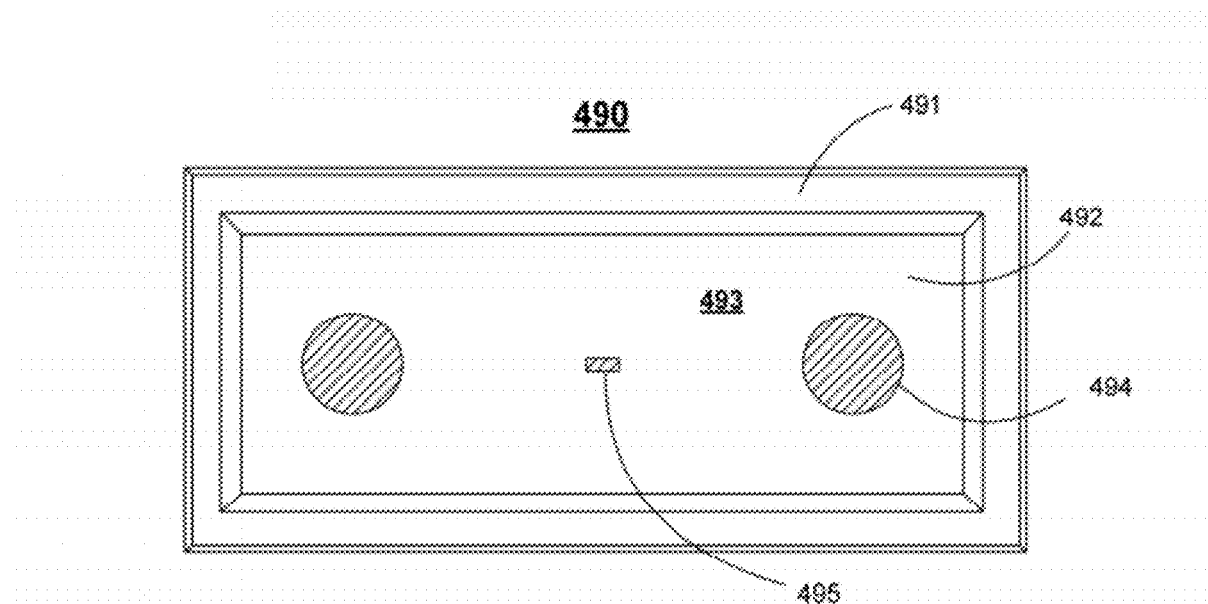

FIG. 49B shows a front view of ferrule endface 493, which includes a pair of alignment holes 494, which are configured to receive respective alignment pins in a mating structure (not shown) in order to help align ferrule 490 as it is seated therein. As shown in FIG. 49B, ferrule 490 includes a guide hole 495 for receiving a bare fiber, such as the exposed fiber 450 at the end of cable 480 (FIG. 48). Guide hole 495 extends along a longitudinal axis of ferrule 490, substantially perpendicular to endface 493. Fiber 450 is threaded through base 491 and head 492, and terminates at endface 493.

Figure 50A:
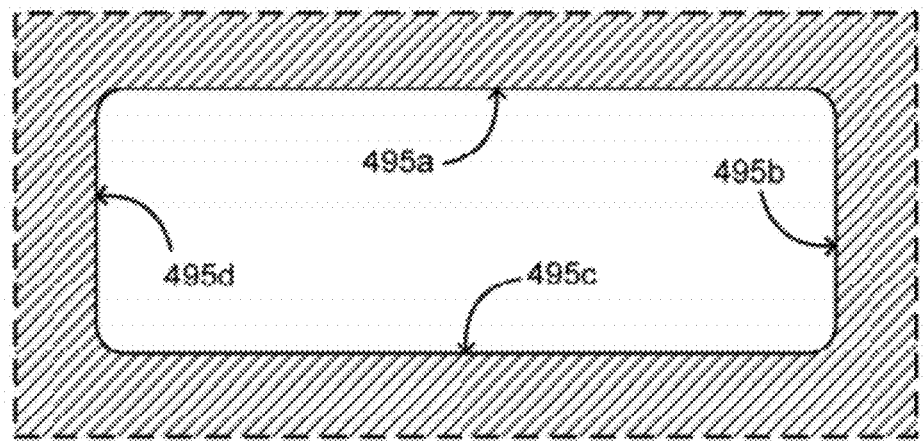
FIGS. 50A and 50B are a series of closeup views of a portion of the endface of the ferrule shown in FIGS. 49A and 49B, illustrating the ferrule guide hole.

FIG. 50A shows a closeup view of the guide hole 495 of ferrule 490. As shown in FIG. 50A, guide hole 495 is shaped to closely receive MCF 450. In particularly, guide hole 495 includes four flat side surfaces 495a-d, corresponding to MCF side surfaces 453a-d. It will be seen from FIGS. 50A-50B that installation of MCF 450 into guide hole 495 will cause MCF side surfaces 453a-d to butt up against guide hold side surfaces 495a-d, thus forcing MCF 450 into an aligned rotational orientation with guide hole 495, and therefore into an aligned rotational orientation with respect to ferrule 490.

Thus, by suitably configuring ferrule 490, guide hole 495, and MCF 450, it is possible to achieve a desired rotational orientation of the MCF cores 451 with ferrule 490. This arrangement allows ferrule 490 to provide aligned, core-to-core connection between MCF 450 and a second MCF, or other optical component.

MCF 450 is installed into guide hole 495 with some bare fiber extending beyond the ferrule endface. The MCF 450 is mounted firmly in position within the guide hole using epoxy, or other suitable material. The tip of the fiber is trimmed and polished to a desired length. Typically, a small amount of fiber will protrude from the ferrule endface. However, it would also be possible to trim and polish the fiber to be substantially flush with the ferrule endface, or to even be slightly recessed into the ferrule body.

B3. SC-Type Connector

Figure 50B:
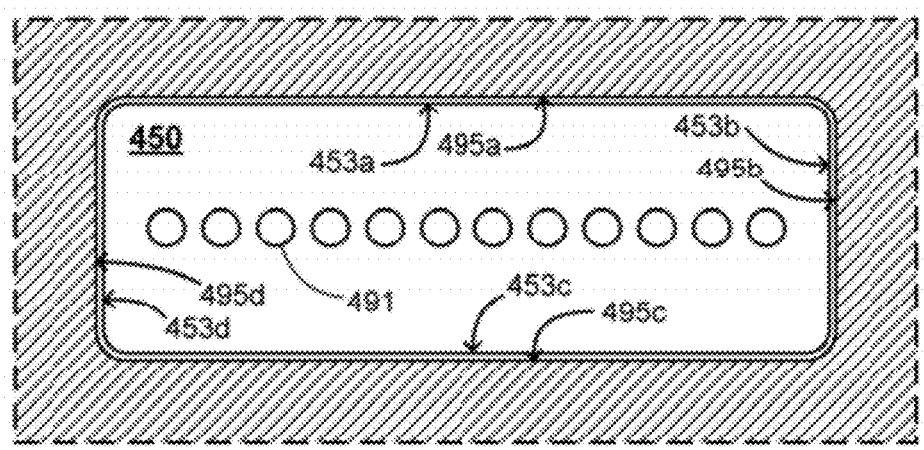
Figure 51A:
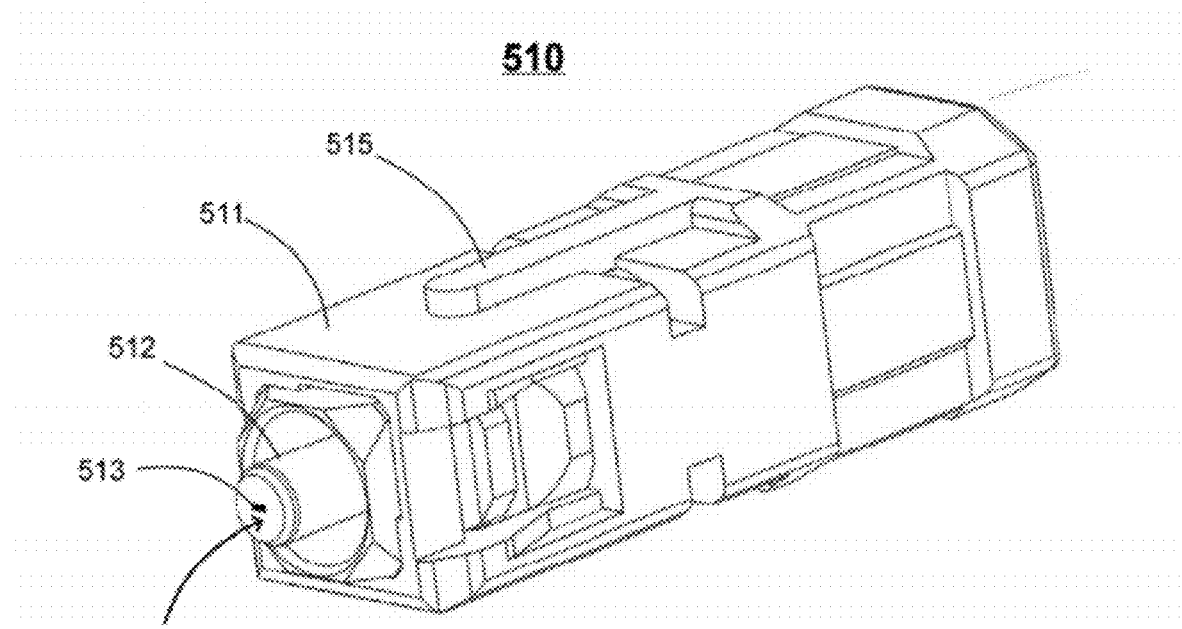
FIGS. 51A and 51B show, respectively, perspective and end views of an exemplary BTW SC connector according to a further aspect of the invention.
Figure 51B:
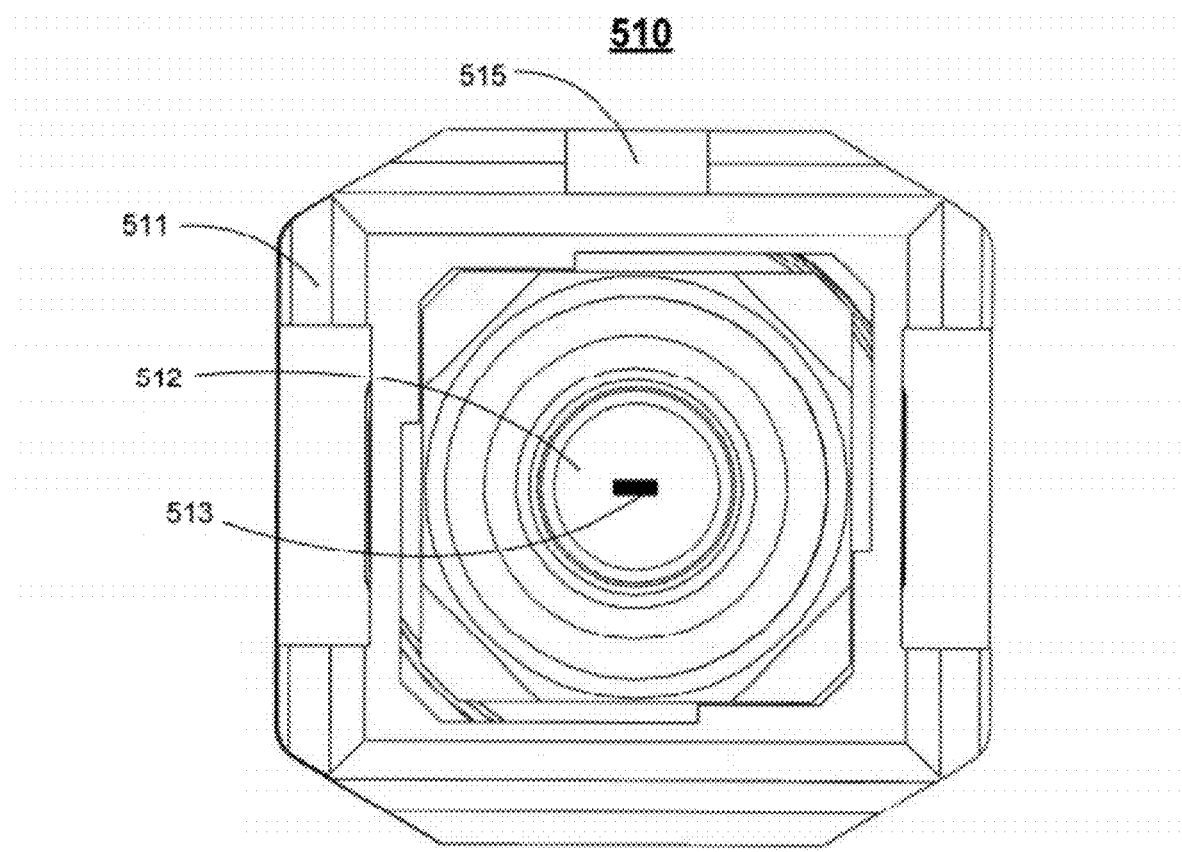

The guide hole concept illustrated in FIGS. 50A-50B can be applied in other contexts. FIGS. 51A and 51B show, respectively, perspective and end views of an exemplary SC connector 510 comprising a housing 511 into which is mounted a cylindrical ferrule 512. It is noted that the present description is applicable to other types of connectors, including, for example, connectors in which the ferrule and connector housing are configured as an LC connector.

It is noted that connector 510 is similar to the BTW SC connectors shown in FIGS. 29-42, discussed in Section A, above. The details provided in Section A with respect to those connectors are also applicable to connector 510. It will be appreciated in light of the following discussion that the use of a flat-sided MCF provides alignment capability both separately, and in conjunction with, the structures and techniques described in Section A.

Cylindrical ferrule 512 comprises a ferrule body having a guide hole 513 therein for guiding a multicore fiber at an end of an optical fiber cable. Guide hole 513 extends through the ferrule 512 terminating at ferrule endface 514. Similar to ferrule guide hole 495 illustrated in FIG. 50, guide hole 513 is shaped and dimensioned to closely receive a bare end of a flat-sided MCF, such as the MCFs 450, 460, and 470 shown in FIGS. 45A-B, 46, and 47, discussed above. Thus, in the depicted example, guide hole 513 has a rectangular profile with long and short sides corresponding to those of MCFs 450, 470, and 470. The ferrule 512 is oriented relative to the connector housing 511, such that when the connector is fully assembled, the flat sides of the guide hole in the ferrule are pre-aligned with one or more keying features 515 on the connector housing 511.

After a bare fiber end is installed into guide hole 512, it is firmly held in position within the guide hole by epoxy, or other suitable material. The tip of the fiber end is trimmed and polished, such that a desired amount of fiber protrudes from the ferrule. Alternatively, the fiber tip can be trimmed and polished to be substantially flush with the ferrule endface, or to even be slightly recessed into the ferrule body.

The ferrule 512 is manufactured to achieve a precise positioning of the guide hole 513 through the ferrule body. Thus, once an MCF is properly mounted into position within the guide hole 513, and the ferrule 512 is properly mounted into the connector housing 511, the array of MCF cores has a precise relationship with the keying features 515.

Therefore, when an MCF is installed, it is aligned with the connector keying feature. Thus, in the case of the depicted SC connector assembly, a flat side of the MCF is aligned with the key 515 on the grip. It will be appreciated that the described structures and techniques are also applicable to other connector configurations, including, for example: LC, FC, ST, MU, E2000, and the like.

Thus, connector 510 provides means for aligning the position and rotational orientation of the MCF cores with those of a second MCF or other optical element to which the MCF installed into connector 510 is to be connected.

As noted above, the structures and techniques from Section A, above, can be used in conjunction with the structures and techniques from Section B. Thus, connector 510 can be configured to include the rotatable ferrule subassemblies described in Section A. Such an arrangement would allow ferrule 511 to be rotationally oriented relative to the connector keying feature 515, after an MCF has been installed into the ferrule 511.

B4. Transverse and Longitudinal Offset; Fiber Protrusion

In both the MT-type and SC-type connectors discussed above, the endface of the aligned fiber must be positioned with respect to the endface of the assembled connector such that the transverse offset, resulting from rotational misalignment between the cores of the multicore fiber and the active optical device (e.g., source or detector) or the corresponding cores of an opposing fiber, is minimized, to ensure low-loss performance. For multimode fibers, the approximate relationship between rotational misalignment $\theta$, core radius r, core distance from the fiber center R, and loss is:

$$\theta \approx 2 \arcsin\{(0.1010 \times \text{Loss})^{2/3} r/R\}$$

For single-mode fibers, the approximate relationship between rotational misalignment $\theta$, mode field radius $\omega$, core distance from the fiber center R, and loss is:

$$\theta \approx 2 \arcsin\{(0.0576 \times \text{Loss})^{1/2} \omega/R\}$$

For example, if the maximum allowable loss contribution from rotational misalignment is 1.5 dB, for a multimode fiber with a 26 μm diameter core located 39 μm from the fiber center, the maximum allowable rotational misalignment is 10.9°, which potentially contributes 7.4 μm to the transverse offset between that core and the corresponding core in an opposing fiber.

Longitudinal offset between the multicore fiber cores is influenced by a number of factors, including: axial force on the multicore fiber endfaces (e.g., due to spring-loading), radius of curvature of the ferrules, apex offset of the spherical ferrule endfaces, and fiber protrusion or undercut from the ferrule endfaces. To ensure that all cores of the mated multicore connectors physically contact, assuming rotational alignment has been achieved, it is important that both the ferrule contact force and endface geometry of the connectors be controlled.

After polishing, the multicore fibers typically have a convex shape; therefore, the contact force must be sufficient to mate the cores with some minimal force. The radius of curvature of the cylindrical ferrule endfaces should typically be greater than 5 mm, with a preferred minimum of 7 mm, to help reduce fiber contact pressure and minimize fiber movement during temperature cycling. The fiber protrusion should typically range from −0.125 µm to +4.0 µm. The apex offset of the endface should typically be less than 70 µm, and the contact force on the ferrules should be greater than 4.1N, to ensure core-to-core contact is maintained during operation.

B5. Alignment Housing

Figure 52A:
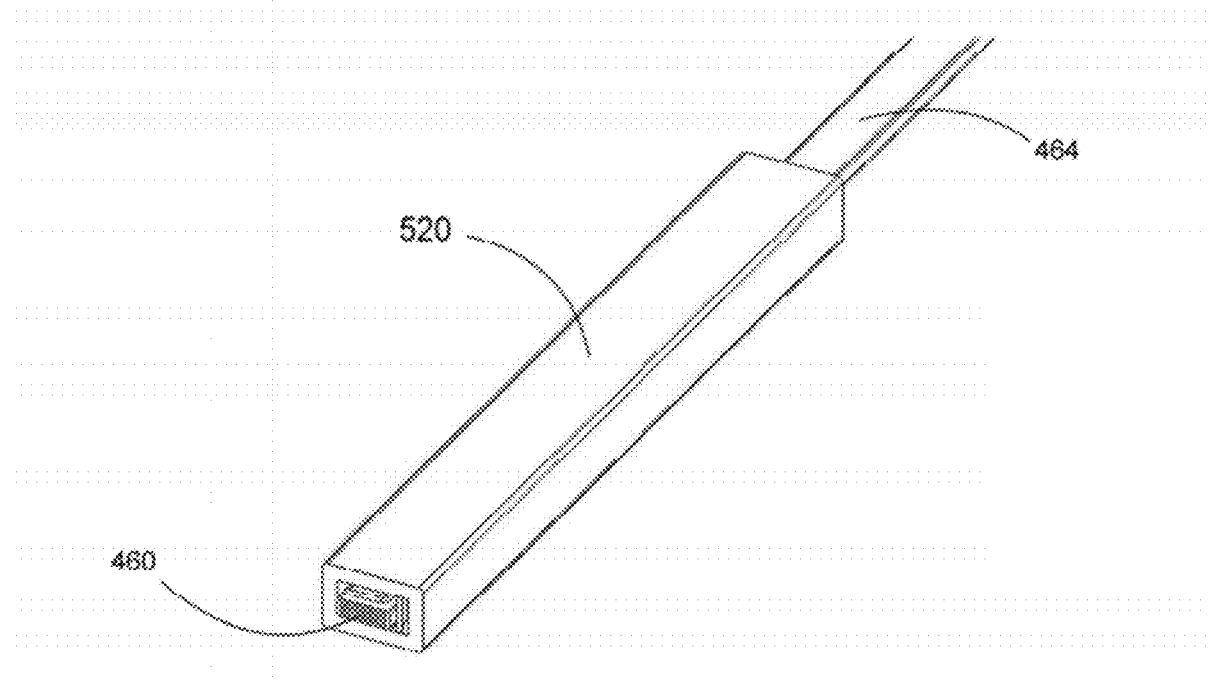
FIGS. 52A-52E are a series of diagrams illustrating an alignment housing according to a further aspect of the invention.
Figure 52B:
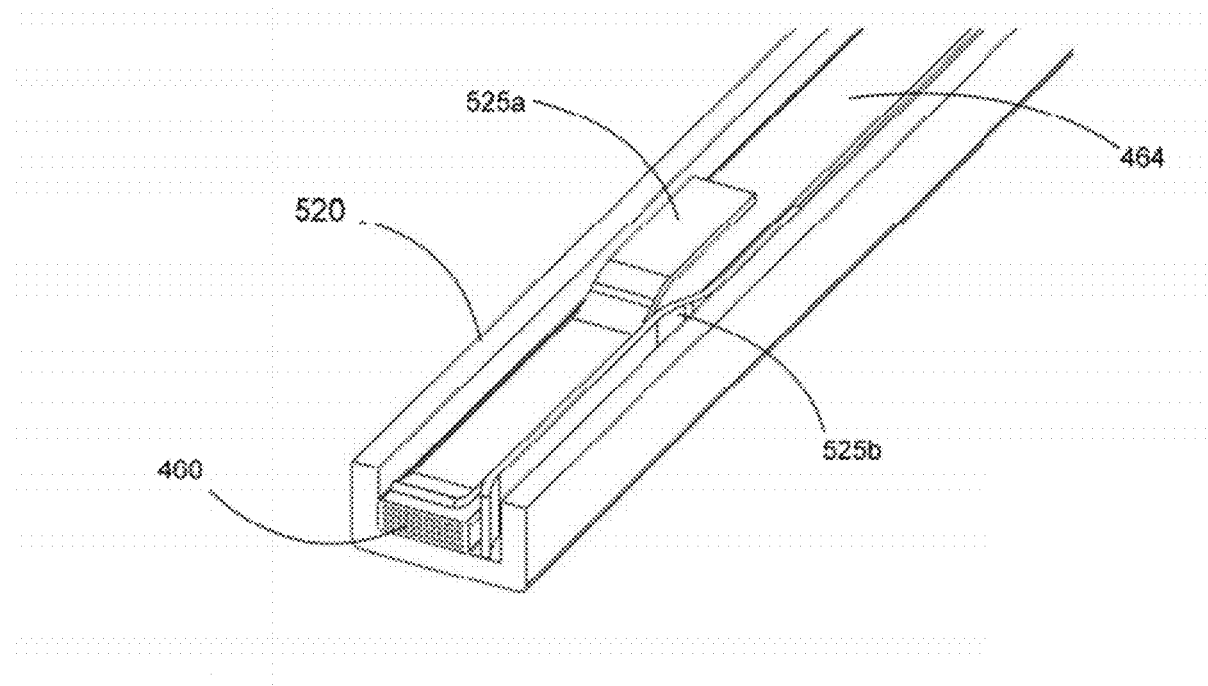

FIGS. 52A-E are a series of diagrams illustrating a spring-biased alignment housing 520 according to a further aspect of the invention for use with a flat-sided MCF to provide rotationally aligned connectorization for the MCF. FIG. 52A shows a perspective view of the assembled alignment housing 520 with an exemplary installed MCF 460 (FIG. 46) that has been packaged into an optical fiber cable 464. FIG. 52B shows a perspective view of the assembled alignment housing 520 with the upper panel removed to illustrate the interior of the alignment housing 520, including biasing springs 525a and 525b.

Figure 52C:
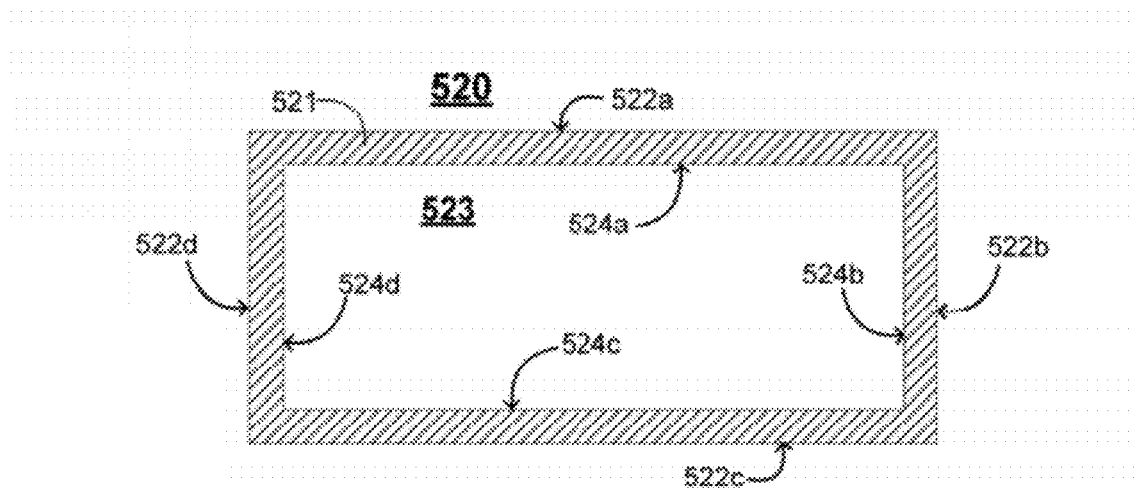
Figure 52D:
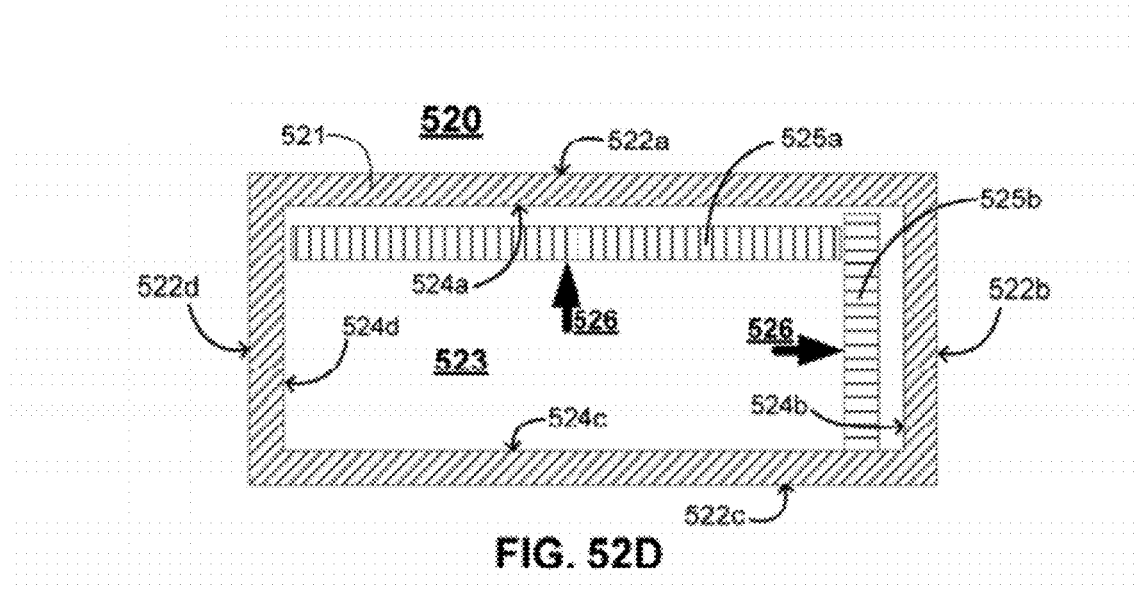
Figure 52E:
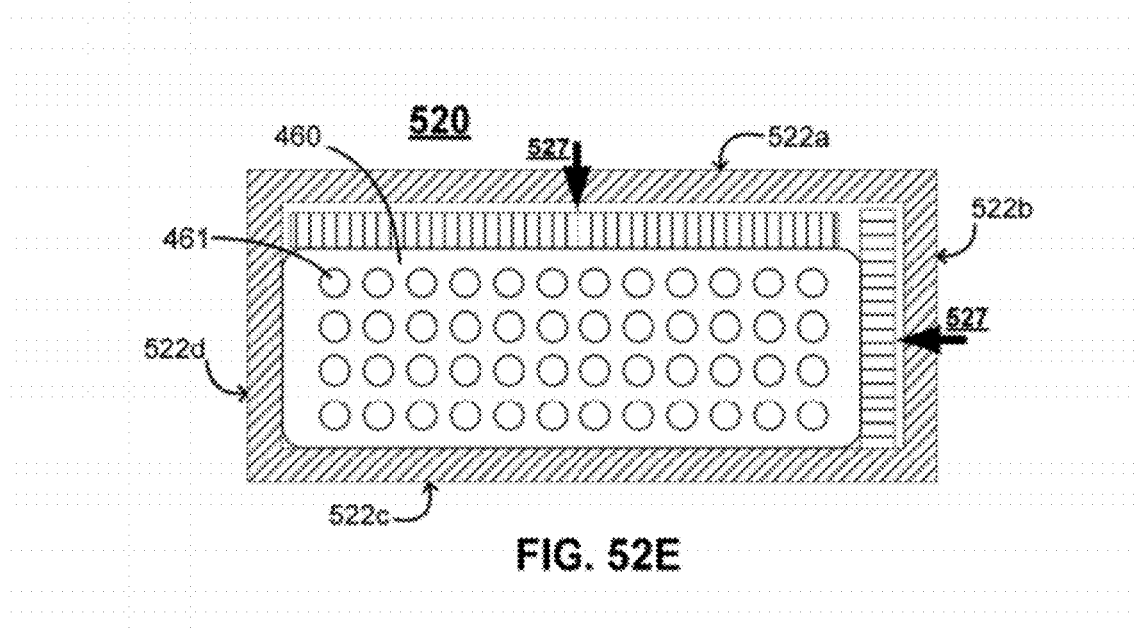

FIGS. 52C-52E show a series of cross sections of the alignment housing 520 illustrating the installation of MCF 460 into guide hole 523, and the operation of biasing springs 525a and 525b. FIG. 52C shows alignment housing 520, prior to installation of biasing springs 525a and 525b. As shown in FIG. 52C, alignment housing 520 comprises an enclosure 521 with four flat outer surfaces: top outer surface 522a, first side outer surface 522b, bottom outer surface 522c and second side surface 522d. A rectangular guide hole 523 extends through enclosure 521, defined by four flat inner surfaces corresponding to the four flat outer surfaces: top inner surface 524a, first side inner surface 524b, bottom inner surface 524c, and second side inner surface 524d.

The alignment housing 520 is fabricated such that there is a precise relationship between one or more "reference" inner surfaces and one or more "reference" outer surfaces. Thus, alignment of the cores of the MCF can be achieved by causing one or more flat sides of a flat-sided MCF to abut one or more corresponding reference inner surfaces 524a-d within the alignment housing guide hole 523.

In the depicted example, alignment housing 520 is configured such that the bottom inner surface 524c and second side inner surface 524d provide the described reference surfaces. Thus, MCF 460 is installed into the alignment housing 520 such that its bottom surface abuts the bottom inner surface 524c, and a side surface abuts second inner side surface 524d.

In order to ensure that bottom and side surfaces of MCF 460 properly abut the reference surfaces 524c and 524d, first and second biasing springs 525a and 525b are provided. As shown in FIG. 52D, first spring 525a is mounted to the top inner surface 524a, opposite the bottom reference surface 524c. Second spring 525b is mounted to the first side inner surface 524b, opposite the side reference surface 524d. As shown in FIG. 52D, springs 525a and 525b protrude slightly into the guide hole 523.

FIG. 52E shows a cross section view of alignment housing 520 after installation of MCF 460. As illustrated by arrows 526 in FIG. 52D, the loading of MCF 460 into guide hole 523 causes the springs 525a and 525b to be resiliently deflected, respectively, towards the top inner surface 524a and first side inner surface 524b of the alignment housing 520. As shown in FIG. 52E, when the fiber 460 is loaded into housing 520, the springs 525a and 525b will urge the fiber 460 in the direction of arrows 527.

Thus, MCF 460 will be held against reference surfaces 524c and 524d, resulting in a precise alignment of cores 461 relative to the flat outer surfaces 522a-d of housing 520. Thus, by loading an MCF into housing 520, it is possible to achieve the desired alignment of the cores 461 relative to other optical elements, such as a second fiber to which the first fiber 460 is to be connected.

FIGS. 53A-53C are a series of diagrams illustrating a further aspect of the invention, according to which a first alignment housing 530 is used to connectorize a first MCF 531, and a second alignment housing 532 is used to connectorize a second MCF 533.

For the purposes of illustration, FIG. 53A includes a second depiction of alignment housing 530', in a side-by-side alignment with alignment housing 532. As indicated by arrow 534 in FIG. 53A, the first alignment housing is rotated from configuration 530' into an endface-to-endface configuration 530 with respect to the second housing 532. As shown in FIG. 53B, a mating adapter 535 is then used to connect the two alignment housings 530, 532 together.

As shown in FIG. 53C, the mating adapter 535 is a sleeve having openings at first and second ends that are shaped to receive the first and second alignment housings. The mating adapter 535 is configured such that the first and second MCFs 530, 532 lock into defined positions within the first and second adapter openings, with their respective endfaces in contact with each other with sufficient force to provide a snug, aligned connection between the two MCFs 531 and 533.

In order to ensure that bottom and side surfaces of each alignment housing 530 and 532 properly abut the reference surfaces within the mating adapter 535, first and second sets of biasing springs 536, 537 are provided. The first set of opposing springs 536 is mounted to the top inner surface, opposite the bottom surface. The second set of opposing springs 537 is mounted to the second inner surface, opposite the first side surface.

B6. General Techniques

FIGS. 54-57 are a series of flowcharts illustrating general techniques according to aspects of the invention. It should be noted that FIGS. 54-57 are intended to be exemplary, rather than limiting. The present invention may be practiced in a number of different ways, using different combinations of some or all of the elements set forth in these drawings, as well as combinations including elements not explicitly set forth in these drawings.

Figure 54:
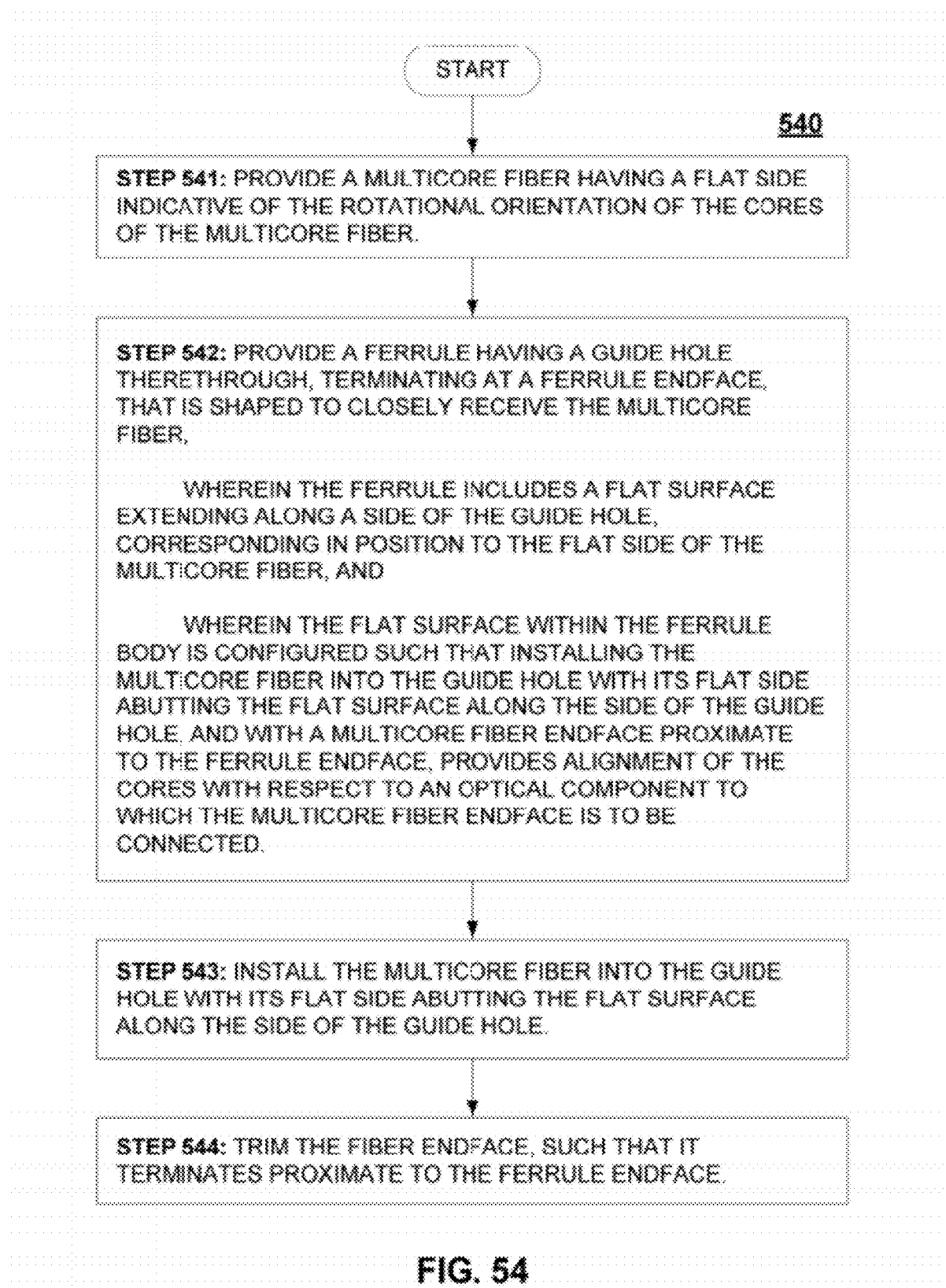
FIGS. 54-57 are a series of flowcharts illustrating techniques according to various aspects of the invention.

FIG. 54 is a flowchart illustrating a technique 540 according to the present invention for using an MT ferrule, or like device, in conjunction with a flat-sided MCF to provide aligned connectorization for the MCF.

Technique 540 includes the following steps:

Step 541: Provide a multicore fiber having a flat side indicative of the rotational orientation of the cores of the multicore fiber.

Step 542: Provide a ferrule having a guide hole therethrough, terminating at a ferrule endface, that is shaped to closely receive the multicore fiber,
  wherein the ferrule includes a flat surface extending along a side of the guide hole, corresponding in position to the flat side of the multicore fiber, and wherein the flat surface within the ferrule body is configured such that installing the multicore fiber into the guide hole with its flat side abutting the flat surface along the side of the guide hole, and with a multicore fiber endface proximate to the ferrule endface, provides alignment of the cores with respect to an optical component to which the multicore fiber endface is to be connected.

Step 543: Install the multicore fiber into the guide hole with its flat side abutting the flat surface along the side of the guide hole.

Step 544: Trim the fiber endface, such that it terminates proximate to the ferrule endface.

Figure 55:
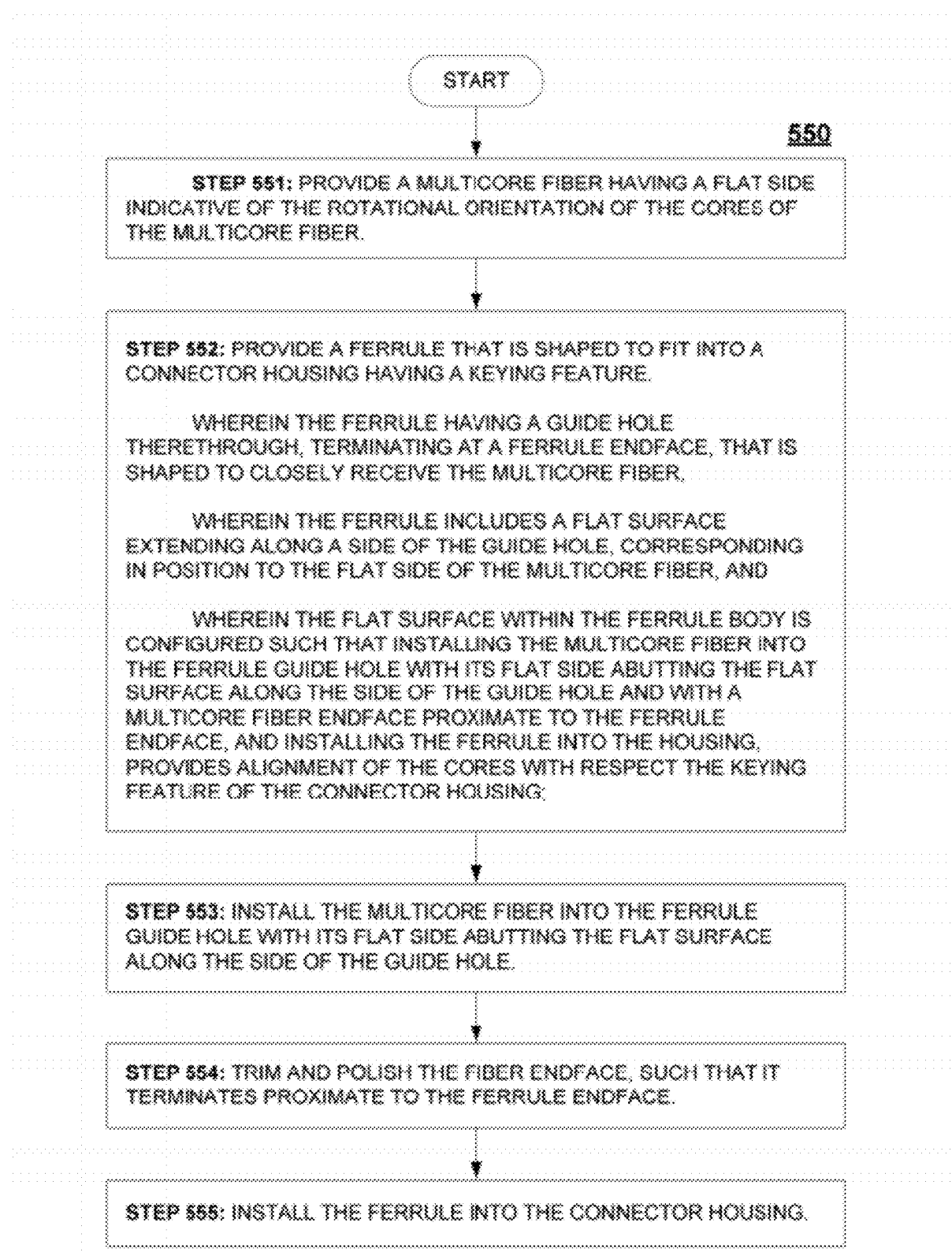

FIG. 55 is a flowchart illustrating a technique 550 according to the present invention for using an SC ferrule, or like device, in conjunction with a flat-sided MCF to provide aligned connectorization for the MCF.

Technique 550 includes the following steps:

Step 551: Provide a multicore fiber having a flat side indicative of the rotational orientation of the cores of the multicore fiber.

Step 552: Provide a ferrule that is shaped to fit into a connector housing having a keying feature.
wherein the ferrule having a guide hole therethrough, terminating at a ferrule endface, that is shaped to closely receive the multicore fiber,
wherein the ferrule includes a flat surface extending along a side of the guide hole, corresponding in position to the flat side of the multicore fiber, and
wherein the flat surface within the ferrule body is configured such that installing the ferrule into the housing, and installing the multicore fiber into the ferrule guide hole with its flat side abutting the flat surface along the side of the guide hole and with a multicore fiber endface proximate to the ferrule endface, provides alignment of the cores with respect to the keying feature of the connector housing;

Step 553: Install the multicore fiber into the ferrule guide hole with its flat side abutting the flat surface along the side of the guide hole.

Step 554: Trim and polish the fiber endface, such that it terminates proximate to the ferrule endface.

Step 555: Install the ferrule into the connector housing.

Figure 56:
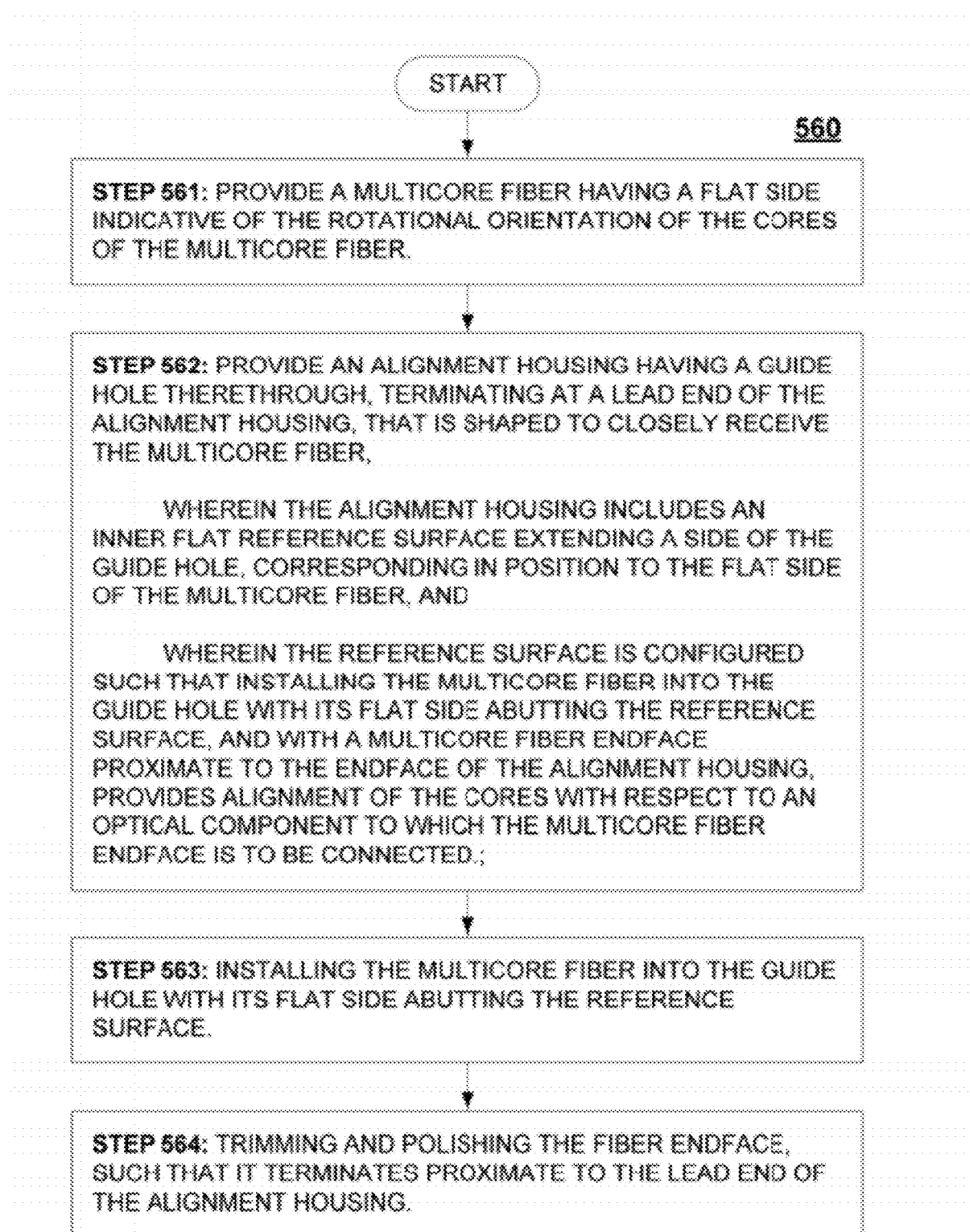

FIG. 56 is a flowchart illustrating a technique 560 according to the present invention for using an alignment housing in conjunction with a flat-sided MCF to provide aligned connectorization for the MCF.

Technique 560 includes the following steps:

Step 561: Provide a multicore fiber having a flat side indicative of the rotational orientation of the cores of the multicore fiber, Step 562: Provide an alignment housing having a guide hole therethrough, terminating at a lead end of the alignment housing, that is shaped to closely receive the multicore fiber,
wherein the alignment housing includes an inner flat reference surface extending a side of the guide hole, corresponding in position to the flat side of the multicore fiber, and
wherein the reference surface is configured such that installing the multicore fiber into the guide hole with its flat side abutting the reference surface, and with a multicore fiber endface proximate to the endface of the alignment housing, provides alignment of the cores with respect to an optical component to which the multicore fiber endface is to be connected.

Step 563: Install the multicore fiber into the guide hole with its flat side abutting the reference surface.

Step 564: Trim and polish the fiber endface, such that it terminates proximate to the lead end of the alignment housing.

Figure 57:
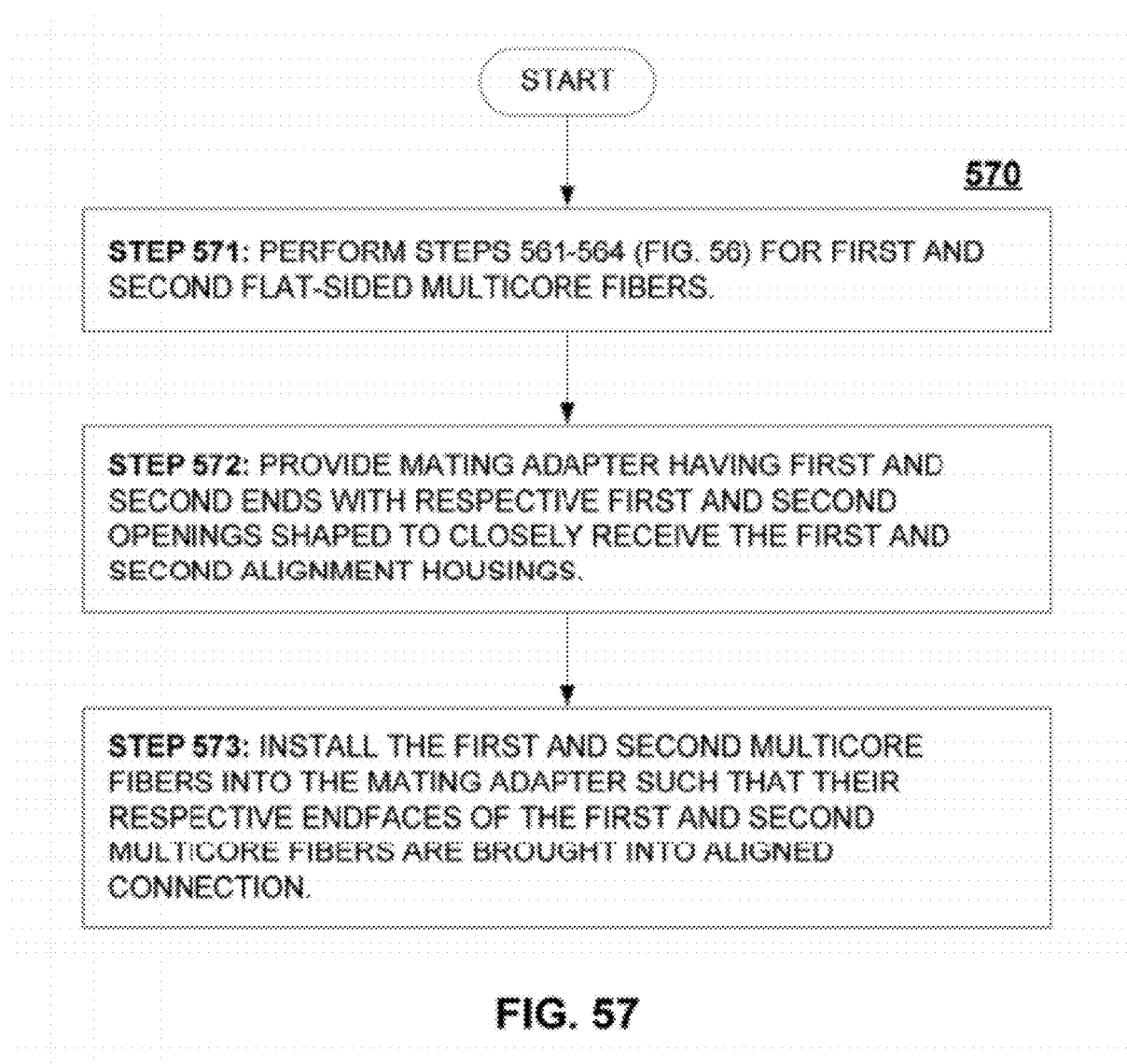

FIG. 57 is a flowchart illustrating a technique 570 according to the present invention for using an alignment housing in conjunction with a flat-sided MCF to provide aligned connectorization for the MCF.

Technique 570 includes the following steps:

Step 571: Perform steps 561-564 (FIG. 56) for first and second flat-sided multicore fibers.

Step 572: Provide mating adapter having first and second ends with respective first and second openings shaped to closely receive the first and second alignment housings.

Step 573: Install the first and second multicore fibers into the mating adapter such that the respective endfaces of the first and second multicore fibers are brought into aligned connection.

4. Conclusion

While the foregoing description includes details which will enable those skilled in the art to practice the invention, it should be recognized that the description is illustrative in nature and that many modifications and variations thereof will be apparent to those skilled in the art having the benefit of these teachings. It is accordingly intended that the invention herein be defined solely by the claims appended hereto and that the claims be interpreted as broadly as permitted by the prior art.

What is claimed is:

1. An optical fiber cable connector, comprising:
a ferrule that is shaped to fit into a connector housing having a keying feature,
wherein the ferrule includes a guide hole therethrough, terminating at a ferrule endface, that is shaped to closely receive a multicore fiber having a flat side indicative of the rotational orientation of the cores of the multicore fiber,
wherein the ferrule includes a flat surface extending along a side of the guide hole, corresponding in position to the flat side of the multicore fiber,
wherein the flat surface within the ferrule body is configured such that installing the ferrule into the housing and installing the multicore fiber into the guide hole with its flat side abutting the flat surface along the side of the guide hole and with a multicore fiber endface proximate to the ferrule endface, provides alignment of the cores with respect to the keying feature of the connector housing, and
wherein the ferrule is rotatable within the connector housing to provide alignment of the rotational orientation of the multicore fiber cores.

2. An optical fiber cable connector, comprising:
a ferrule that is shaped to fit into a connector housing having a keying feature,
wherein the ferrule includes a guide hole therethrough, terminating at a ferrule endface, that is shaped to closely receive a multicore fiber having a flat side indicative of the rotational orientation of the cores of the multicore fiber,
wherein the ferrule includes a flat surface extending along a side of the guide hole, corresponding in position to the flat side of the multicore fiber,
wherein the flat surface within the ferrule body is configured such that installing the ferrule into the housing and installing the multicore fiber into the guide hole with its flat side abutting the flat surface along the side of the guide hole and with a multicore fiber endface proximate to the ferrule endface, provides alignment of the cores with respect to the keying feature of the connector housing, and wherein the ferrule and connector housing are configured as an LC connector.

3. An optical fiber cable connector, comprising:, a ferrule that is shaped to fit into a connector housing having a keying feature, wherein the ferrule includes a guide hole therethrough, terminating at a ferrule endface, that is shaped to closely receive a multicore fiber having a flat side indicative of the rotational orientation of the cores of the multicore fiber, wherein the ferrule includes a flat surface extending along a side of the guide hole, corresponding in position to the flat side of the multicore fiber, wherein the flat surface within the ferrule body is configured such that installing the ferrule into the housing and installing the multicore fiber into the guide hole with its flat side abutting the flat surface along the side of the guide hole and with a multicore fiber endface proximate to the ferrule endface, provides alignment of the cores with respect to the keying feature of the connector housing, and wherein the ferrule and connector housing are configured as an LC connector.

4. An optical fiber cable connector, comprising an alignment housing, wherein the alignment housing includes a guide hole therethrough, terminating at a lead end of the alignment housing, that is shaped to closely receive a multicore fiber having a flat side indicative of the rotational orientation of the cores of the multicore fiber, wherein the alignment housing includes an inner flat reference surface extending along a side of the guide hole, corresponding in position to the flat side of the multicore fiber, wherein the reference surface is configured such that installing the multicore fiber into the guide hole with its flat side abutting the reference surface, and with a multicore fiber endface proximate to the endface of the alignment housing, provides alignment of the cores with respect to an optical component to which the multicore fiber endface is to be connected, and wherein the alignment surface further includes biasing means for urging an installed fiber against the reference surface.

5. The connector of claim 4, wherein the biasing means comprises a bias spring mounted to an inner surface of the alignment housing opposite the reference surface.

6. The connector of claim 4, wherein the alignment housing includes a guide hole having a rectangular profile, wherein the alignment housing includes four flat inner surfaces along the sides of the guide hole, and wherein the alignment housing has first and second reference surfaces comprising first and second adjoining flat inner surfaces.

7. The connector of claim 6, wherein the alignment housing comprises first and second biasing springs attached respective to first and second adjoining flat inner surfaces opposite the first and second reference surfaces.

8. An optical fiber connector assembly, comprising:

a first alignment housing according to claim 4 for holding a first multicore fiber, a second alignment housing according to claim 4 for holding a second multicore fiber, and a mating adapter having first and second ends with respective first and second openings therein, wherein the mating adapter is configured such that the first and second alignment housings are installable respectively in the first and second openings with respective endfaces of the first and second multicore fibers brought into aligned connection.

9. A method for providing aligned connectorization for a multicore fiber, comprising:

(a) providing a multicore fiber having a flat side indicative of the rotational orientation of the cores of the multicore fiber, (b) providing a ferrule that is shaped to fit into a connector housing having a keying feature, wherein the ferrule has a guide hole therethrough, terminating at a ferrule endface, that is shaped to closely receive the multicore fiber, wherein the ferrule includes a flat surface extending along a side of the guide hole, corresponding in position to the flat side of the multicore fiber, and wherein the flat surface within the ferrule body is configured such that installing the ferrule into the housing and installing the multicore fiber into the ferrule guide hole with its flat side abutting the flat surface along the side of the guide hole and with a multicore fiber endface proximate to the ferrule endface, provides alignment of the cores with respect to the keying feature of the connector housing;

(c) installing the multicore fiber into the ferrule guide hole with its flat side abutting the flat surface along the side of the guide hole;

(d) trimming and polishing the fiber endface, such that it terminates proximate to the ferrule endface; and (e) installing the ferrule into the connector housing.

10. A method for providing aligned connectorization for a multicore fiber, comprising:

(a) providing a multicore fiber having a flat side indicative of the rotational orientation of the cores of the multicore fiber, (b) providing an alignment housing having a guide hole therethrough, terminating at a lead end of the alignment housing, that is shaped to closely receive the multicore fiber, wherein the alignment housing includes an inner flat reference surface extending along a side of the guide hole, corresponding in position to the flat side of the multicore fiber, and wherein the reference surface is configured such that installing the multicore fiber into the guide hole with its flat side abutting the reference surface, and with a multicore fiber endface proximate to the endface of the alignment housing, provides alignment of the cores with respect to an optical component to which the multicore fiber endface is to be connected;

(c) installing the multicore fiber into the guide hole with its flat side abutting the reference surface;

(d) trimming and polishing the fiber endface, such that it terminates proximate to the lead end of the alignment housing;

(e) repeating steps (a)-(d) for a second multicore fiber; and (f) installing the first and second multicore fibers into a mating adapter such that respective endfaces of the first and second multicore fibers are brought into aligned connection.

* * * * *

UNITED STATES PATENT AND TRADEMARK OFFICE
CERTIFICATE OF CORRECTION

| | | |
|---|---|---|
| PATENT NO. | : 8,858,089 B2 | Page 1 of 1 |
| APPLICATION NO. | : 13/468495 | |
| DATED | : October 14, 2014 | |
| INVENTOR(S) | : Kelvin B. Bradley et al. | |

It is certified that error appears in the above-identified patent and that said Letters Patent is hereby corrected as shown below:

In the Claims,

Column 23, line 5 - "as an LC connector" should read --as an SC connector--.

Signed and Sealed this
Tenth Day of February, 2015

Michelle K. Lee
*Deputy Director of the United States Patent and Trademark Office*